(12) United States Patent
Mucignat et al.

(10) Patent No.: US 8,627,127 B2
(45) Date of Patent: Jan. 7, 2014

(54) POWER-PRESERVING COMMUNICATIONS ARCHITECTURE WITH LONG-POLLING PERSISTENT CLOUD CHANNEL FOR WIRELESS NETWORK-CONNECTED THERMOSTAT

(75) Inventors: Andrea Mucignat, San Francisco, CA (US); Oliver Steele, Amherst, MA (US); Senthil Supramaniam, Sunnyvale, CA (US); Osborne Hardison, Palo Alto, CA (US); Richard J. Schultz, Mountain View, CA (US); Daniel A. Warren, San Francisco, CA (US); Hugo Fiennes, Palo Alto, CA (US); Jonathan A. Dutra, Saratoga, CA (US); David Bell, Los Altos Hill, CA (US); Anthony M. Fadell, Portola Valley, CA (US); Matthew L. Rodgers, Los Gatos, CA (US); Ian C. Smith, Palo Alto, CA (US); Grant M. Erickson, Sunnyvale, CA (US); Edwin H. Satterthwaite, Palo Alto, CA (US); Joseph E. Palmer, San Jose, CA (US)

(73) Assignee: Nest Labs, Inc., Palo Alto, CA (US)

( * ) Notice: Subject to any disclaimer, the term of this patent is extended or adjusted under 35 U.S.C. 154(b) by 46 days.

(21) Appl. No.: 13/530,901

(22) Filed: Jun. 22, 2012

(65) Prior Publication Data
US 2012/0267089 A1      Oct. 25, 2012

Related U.S. Application Data

(63) Continuation of application No. 13/466,815, filed on May 8, 2012, which is a continuation-in-part of application No. 13/275,307, filed on Oct. 17, 2011, and a continuation-in-part of application No. 13/267,871, filed on Oct. 6, 2011, and a continuation-in-part of application No. 13/267,877, filed on Oct. 6, 2011, and a continuation-in-part of application No. 13/034,674, filed on Feb. 24, 2011, and a continuation-in-part of application No. 13/034,678, filed on Feb. 24, 2011.

(60) Provisional application No. 61/627,996, filed on Oct. 21, 2011.

(51) Int. Cl.
*G06F 1/26* (2006.01)
*G06F 1/32* (2006.01)

(52) U.S. Cl.
USPC .......................... 713/320; 713/323; 713/324

(58) Field of Classification Search
USPC ........................................ 713/320, 323, 324
See application file for complete search history.

(56) References Cited

U.S. PATENT DOCUMENTS

| | | |
|---|---|---|
| 4,049,973 A | 9/1977 | Lambert |
| 4,157,506 A | 6/1979 | Spencer |
| 4,174,807 A | 11/1979 | Smith et al. |
| 4,308,991 A | 1/1982 | Peinetti et al. |
| 4,528,459 A | 7/1985 | Wiegel |
| 4,656,835 A | 4/1987 | Kidder et al. |
| 4,657,179 A | 4/1987 | Aggers et al. |
| 4,695,246 A | 9/1987 | Beilfuss et al. |
| 4,742,475 A | 5/1988 | Kaiser et al. |
| 4,842,510 A | 6/1989 | Grunden et al. |
| 4,872,828 A | 10/1989 | Mierzwinski et al. |
| 4,948,044 A | 8/1990 | Cacciatore |
| 4,955,806 A | 9/1990 | Grunden et al. |
| 5,107,918 A | 4/1992 | McFarlane et al. |
| 5,158,477 A | 10/1992 | Testa et al. |
| 5,175,439 A | 12/1992 | Haerer et al. |
| 5,224,648 A | 7/1993 | Simon et al. |
| 5,251,813 A | 10/1993 | Kniepkamp |
| 5,255,179 A | 10/1993 | Zekan et al. |
| 5,347,982 A | 9/1994 | Binzer et al. |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,506,569 A | 4/1996 | Rowlette |
| 5,544,036 A | 8/1996 | Brown, Jr. et al. |
| 5,570,837 A | 11/1996 | Brown et al. |
| 5,595,342 A | 1/1997 | McNair et al. |

| | | | |
|---|---|---|---|
| 5,611,484 A | 3/1997 | Uhrich | |
| 5,635,896 A | 6/1997 | Tinsley et al. | |
| 5,644,173 A | 7/1997 | Elliason et al. | |
| 5,655,709 A | 8/1997 | Garnett et al. | |
| 5,697,552 A | 12/1997 | McHugh et al. | |
| 5,736,795 A | 4/1998 | Zuehlke et al. | |
| 5,742,833 A * | 4/1998 | Dea et al. ................... | 713/323 |
| 5,761,083 A | 6/1998 | Brown, Jr. et al. | |
| 5,802,467 A | 9/1998 | Salazar et al. | |
| 5,903,139 A | 5/1999 | Kompelien | |
| 5,926,776 A | 7/1999 | Glorioso et al. | |
| 5,957,374 A | 9/1999 | Bias et al. | |
| 6,060,719 A | 5/2000 | DiTucci et al. | |
| 6,084,518 A | 7/2000 | Jamieson | |
| 6,098,893 A | 8/2000 | Berglund et al. | |
| 6,116,512 A | 9/2000 | Dushane et al. | |
| 6,213,404 B1 | 4/2001 | Dushane et al. | |
| 6,222,719 B1 | 4/2001 | Kadah | |
| 6,275,160 B1 | 8/2001 | Ha | |
| 6,315,211 B1 | 11/2001 | Sartain et al. | |
| 6,356,038 B2 | 3/2002 | Bishel | |
| 6,385,510 B1 | 5/2002 | Hoog et al. | |
| 6,509,838 B1 | 1/2003 | Payne et al. | |
| 6,513,723 B1 | 2/2003 | Mueller et al. | |
| 6,566,768 B2 | 5/2003 | Zimmerman et al. | |
| 6,574,581 B1 | 6/2003 | Bohrer et al. | |
| 6,604,023 B1 | 8/2003 | Brown et al. | |
| 6,619,055 B1 | 9/2003 | Addy | |
| 6,619,555 B2 | 9/2003 | Rosen | |
| 6,622,115 B1 | 9/2003 | Brown et al. | |
| 6,622,925 B2 | 9/2003 | Carner et al. | |
| 6,657,418 B2 | 12/2003 | Atherton | |
| 6,743,010 B2 | 6/2004 | Bridgeman et al. | |
| 6,794,771 B2 | 9/2004 | Orloff | |
| 6,798,341 B1 | 9/2004 | Eckel et al. | |
| 6,886,754 B2 | 5/2005 | Smith et al. | |
| 6,891,838 B1 | 5/2005 | Petite et al. | |
| 6,956,463 B2 | 10/2005 | Crenella et al. | |
| 6,975,958 B2 | 12/2005 | Bohrer et al. | |
| 7,167,079 B2 | 1/2007 | Smyth et al. | |
| 7,174,239 B2 | 2/2007 | Butler et al. | |
| 7,289,887 B2 | 10/2007 | Rodgers | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,571,865 B2 | 8/2009 | Nicodem et al. | |
| 7,605,714 B2 | 10/2009 | Thompson et al. | |
| 7,648,077 B2 | 1/2010 | Rossi et al. | |
| D614,976 S | 5/2010 | Skafdrup et al. | |
| 7,748,640 B2 | 7/2010 | Roher et al. | |
| 7,755,220 B2 | 7/2010 | Sorg et al. | |
| 7,775,452 B2 | 8/2010 | Shah et al. | |
| 7,832,465 B2 | 11/2010 | Zou et al. | |
| 7,837,128 B2 | 11/2010 | Helt et al. | |
| 7,841,542 B1 | 11/2010 | Rosen | |
| 7,900,849 B2 | 3/2011 | Barton et al. | |
| 8,131,207 B2 | 3/2012 | Hwang et al. | |
| 8,161,302 B2 * | 4/2012 | Woo ................... | 713/310 |
| D660,732 S | 5/2012 | Bould et al. | |
| 8,195,313 B1 | 6/2012 | Fadell et al. | |
| D677,180 S | 3/2013 | Plitkins et al. | |
| 2002/0074865 A1 | 6/2002 | Zimmerman et al. | |
| 2003/0064335 A1 | 4/2003 | Canon | |
| 2003/0231001 A1 | 12/2003 | Bruning | |
| 2004/0095237 A1 | 5/2004 | Chen et al. | |
| 2004/0209209 A1 | 10/2004 | Chodacki et al. | |
| 2004/0245349 A1 | 12/2004 | Smith | |
| 2005/0043907 A1 | 2/2005 | Eckel et al. | |
| 2005/0194456 A1 | 9/2005 | Tessier et al. | |
| 2005/0195757 A1 | 9/2005 | Kidder et al. | |
| 2005/0270151 A1 * | 12/2005 | Winick ................... | 340/539.1 |
| 2006/0009863 A1 | 1/2006 | Lingemann | |
| 2006/0105697 A1 | 5/2006 | Aronstam et al. | |
| 2006/0124759 A1 | 6/2006 | Rossi et al. | |
| 2006/0149395 A1 | 7/2006 | Archacki, Jr. et al. | |
| 2006/0186214 A1 | 8/2006 | Simon et al. | |
| 2007/0045432 A1 | 3/2007 | Juntunen | |
| 2007/0114295 A1 | 5/2007 | Jenkins | |
| 2007/0131787 A1 | 6/2007 | Rossi et al. | |
| 2007/0228183 A1 | 10/2007 | Kennedy et al. | |
| 2007/0241203 A1 * | 10/2007 | Wagner et al. ................ | 236/1 C |
| 2008/0015742 A1 | 1/2008 | Kulyk et al. | |
| 2008/0048046 A1 | 2/2008 | Wagner et al. | |
| 2008/0054082 A1 | 3/2008 | Evans | |
| 2008/0054084 A1 | 3/2008 | Olson | |
| 2008/0147242 A1 | 6/2008 | Roher et al. | |
| 2009/0045263 A1 | 2/2009 | Mueller et al. | |
| 2009/0099697 A1 | 4/2009 | Li et al. | |
| 2009/0140057 A1 | 6/2009 | Leen | |
| 2009/0140060 A1 | 6/2009 | Stoner et al. | |
| 2009/0195349 A1 | 8/2009 | Frader-Thompson et al. | |
| 2009/0236433 A1 | 9/2009 | Mueller et al. | |
| 2010/0006660 A1 | 1/2010 | Leen et al. | |
| 2010/0070099 A1 | 3/2010 | Watson et al. | |
| 2010/0084482 A1 * | 4/2010 | Kennedy et al. ................ | 236/51 |
| 2010/0106305 A1 | 4/2010 | Pavlak et al. | |
| 2010/0106322 A1 | 4/2010 | Grohman | |
| 2010/0168924 A1 * | 7/2010 | Tessier et al. ................. | 700/278 |
| 2010/0182743 A1 | 7/2010 | Roher | |
| 2010/0193592 A1 | 8/2010 | Simon et al. | |
| 2010/0211224 A1 | 8/2010 | Keeling et al. | |
| 2010/0305771 A1 | 12/2010 | Rodgers | |
| 2010/0318227 A1 * | 12/2010 | Steinberg et al. ............. | 700/278 |
| 2011/0025257 A1 | 2/2011 | Weng | |
| 2011/0054699 A1 | 3/2011 | Imes et al. | |
| 2011/0253796 A1 | 10/2011 | Posa et al. | |
| 2011/0290893 A1 * | 12/2011 | Steinberg ................ | 236/49.3 |
| 2012/0065783 A1 | 3/2012 | Fadell et al. | |
| 2012/0066168 A1 | 3/2012 | Fadell et al. | |
| 2012/0125559 A1 | 5/2012 | Fadell et al. | |
| 2012/0125592 A1 | 5/2012 | Fadell et al. | |
| 2012/0126019 A1 | 5/2012 | Warren et al. | |
| 2012/0126020 A1 | 5/2012 | Filson et al. | |
| 2012/0126021 A1 | 5/2012 | Warren et al. | |
| 2012/0128025 A1 | 5/2012 | Huppi et al. | |
| 2012/0130546 A1 | 5/2012 | Matas et al. | |
| 2012/0130547 A1 | 5/2012 | Fadell et al. | |
| 2012/0130548 A1 | 5/2012 | Fadell et al. | |
| 2012/0130679 A1 | 5/2012 | Fadell et al. | |
| 2012/0131504 A1 | 5/2012 | Fadell et al. | |
| 2012/0179300 A1 | 7/2012 | Warren et al. | |
| 2012/0186774 A1 | 7/2012 | Matsuoka et al. | |
| 2012/0191257 A1 | 7/2012 | Corcoran et al. | |
| 2012/0199660 A1 | 8/2012 | Warren et al. | |
| 2012/0203379 A1 | 8/2012 | Sloo et al. | |
| 2012/0229521 A1 | 9/2012 | Hales, IV et al. | |
| 2012/0232969 A1 | 9/2012 | Fadell et al. | |
| 2012/0233478 A1 | 9/2012 | Mucignat et al. | |
| 2012/0239221 A1 | 9/2012 | Mighdoll et al. | |
| 2012/0248210 A1 | 10/2012 | Warren et al. | |
| 2012/0248211 A1 | 10/2012 | Warren et al. | |
| 2012/0256009 A1 | 10/2012 | Mucignat et al. | |
| 2012/0273580 A1 | 11/2012 | Warren et al. | |

FOREIGN PATENT DOCUMENTS

| | | |
|---|---|---|
| EP | 207295 A1 | 1/1987 |
| EP | 0 510 807 A2 | 10/1992 |
| EP | 0 660 287 A1 | 6/1995 |
| EP | 0 690 363 A2 | 1/1996 |
| EP | 1 275 037 B1 | 2/2006 |
| EP | 2 302 326 A1 | 3/2011 |
| JP | 09298780 A | 11/1997 |
| WO | 2008/054938 A2 | 5/2008 |
| WO | 2010/078459 A1 | 7/2010 |
| WO | 2012068436 A1 | 5/2012 |
| WO | 2012068437 A2 | 5/2012 |
| WO | 2012068447 A2 | 5/2012 |
| WO | 2012068453 A1 | 5/2012 |
| WO | 2012068459 A2 | 5/2012 |
| WO | 2012068495 A1 | 5/2012 |
| WO | 2012068503 A1 | 5/2012 |
| WO | 2012068507 A2 | 5/2012 |
| WO | 2012068517 A1 | 5/2012 |
| WO | 2012068526 A1 | 5/2012 |
| WO | 2012068591 A2 | 5/2012 |

| | | | |
|---|---|---|---|
| WO | 2012092622 | A2 | 7/2012 |
| WO | 2012092625 | A2 | 7/2012 |
| WO | 2012092627 | A1 | 7/2012 |

OTHER PUBLICATIONS

Arens, E., et al., "Demand Response Enabling Technology Development—Phase I Report: Jun. 2003-Nov. 2005," University of California Berkeley, Apr. 4, 2006, 108 pages.

Matty, T., "Advanced Energy Management for Home Use," IEEE Transactions on Consumer Electronics, Aug. 1989, vol. 35, No. 3, pp. 584-588.

International Search Report and Written Opinion of PCT/US2012/030084 mailed on Jul. 6, 2012, 7 pages.

Power Stealing Thermostats, Honeywell, Technical Publication No. 50-8433, 1997, 6 pages.

* cited by examiner

*Primary Examiner* — Vincent Tran

(74) *Attorney, Agent, or Firm* — Kilpatrick Townsend & Stockton LLP

(57) ABSTRACT

Provided according to one or more embodiments herein are methods, systems and related architectures for facilitating network communications between a wireless network-connected thermostat and a cloud-based management server in a manner that promotes reduced power usage and extended service life of a rechargeable battery of the thermostat, while at the same time accomplishing timely data transfer between the thermostat and the cloud-based management server for suitable and time-appropriate control of an HVAC system. The thermostat further comprises powering circuitry configured to: extract electrical power from one or more HVAC control wires in a manner that does not require a "common" wire; supply electrical power for thermostat operation; recharge the rechargeable battery (if needed) using any surplus extracted power; and discharge the rechargeable battery to assist in supplying electrical power for thermostat operation during intervals in which the extracted power alone is insufficient for thermostat operation.

20 Claims, 22 Drawing Sheets

POWER-PRESERVING COMMUNICATIONS ARCHITECTURE WITH LONG-POLLING PERSISTENT CLOUD CHANNEL FOR WIRELESS NETWORK-CONNECTED THERMOSTAT

CROSS-REFERENCES TO RELATED APPLICATIONS

This patent application claims the benefit of U.S. Provisional Application No. 61/627,996 filed Oct. 21, 2011.

This application is also a continuation of U.S. Ser. No. 13/466,815 filed on May 8, 2012 (Ref No. NES0179-US), which is a continuation-in-part of the following commonly-assigned applications: U.S. patent application Ser. No. 13/275,307, filed Oct. 17, 2011; U.S. patent application Ser. No. 13/267,871 filed Oct. 6, 2011; PCT Application No. PCT/US11/61437 filed Nov. 18, 2011; S. patent application Ser. No. 13/267,877, filed Oct. 6, 2011; U.S. Ser. No. 13/034,674 filed Feb. 24, 2011; and U.S. Ser. No. 13/034,678 filed Feb. 24, 2011.

Each of the above-listed applications is hereby incorporated by reference in their entireties.

TECHNICAL FIELD

This patent specification relates to system monitoring and control for property and/or environmental control systems. More particularly, this patent specification relates to systems and methods for using a network enabled, battery powered thermostat to monitor and control an HVAC system while conserving the use of energy.

BACKGROUND OF THE INVENTION

Substantial effort and attention continue toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment.

As is known, for example as discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two external connections required.

When electronics began to be used in thermostats the fact that the thermostat was not directly wired to both sides of the transformer for its power source created a problem. This meant either the thermostat had to have its own independent power source, such as a battery, or be hardwired directly from the system transformer. Direct hardwiring a "common" wire from the transformer to the electronic thermostat may be very difficult and costly. However, there are also disadvantages to using a battery for providing the operating power. One primary disadvantage is the need to continually check and replace the battery. If the battery is not properly replaced and cannot provide adequate power, the electronic thermostat may fail during a period of extreme environmental conditions.

Because many households do not have a direct wire from the system transformer (such as a "common" wire), some thermostats have been designed to derive power from the transformer through the equipment load. The method for powering an electronic thermostat from the transformer with a single direct wire connection to the transformer is called "power stealing" or "power sharing." The thermostat "steals," "shares" or "harvests" its power during the "OFF" periods of the heating or cooling system by allowing a small amount of current to flow through it into the load coil below its response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing or must use disposable batteries.

Additionally, microprocessor controlled "intelligent" thermostats may have more advanced environmental control capabilities that can save energy while also keeping occupants comfortable. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Issues arise in relation to providing microprocessor-controlled, network-connected thermostats, one or more such issues being at least partially resolved by one or more of the embodiments described herein below. On the one hand, it is desirable to provide a thermostat having advanced functionalities such as those associated with relatively powerful microprocessors and reliable wireless communications chips, while also providing a thermostat that has an attractive, visually pleasing electronic display that users will find appealing to behold and interact with. On the other hand, it is desirable to provide a thermostat that is compatible and adaptable for installation in a wide variety of homes, including a substantial percentage of homes that are not equipped with the "common" wire discussed above. It is still further desirable to provide such a thermostat that accommodates easy do-it-yourself installation such that the expense and inconvenience of arranging for an HVAC technician to visit the premises to install the thermostat can be avoided for a large number of users. It is still further desirable to provide a thermostat having such processing power, wireless communications capabilities, visually pleasing display qualities, and other advanced functionalities, while also being a thermostat that, in addition to not requiring a "common" wire, likewise does not require to be plugged into household line current or a so-called "power brick," which can be inconvenient for the particular location of the thermostat as well as unsightly.

BRIEF SUMMARY OF THE INVENTION

Described herein are advanced, multi-sensing, microprocessor-controlled intelligent or "learning" control units for which one or more of the embodiments is particularly suitable, the control units providing a rich combination of processing capabilities, intuitive and visually pleasing user interfaces, and network connectivity, while at the same time not requiring a C-wire (or line power from a household 110V source such as a wall plug) even though the requisite underlying control unit hardware can require greater instantaneous power than power-stealing can safely provide. The described control unit achieves these goals at least by virtue of the use of a rechargeable battery (or equivalently capable onboard power storage medium) that may recharge during time intervals in which the hardware power usage is less than what power stealing can safely provide, and that will discharge to provide the needed extra electrical power during time intervals in which the hardware power usage is greater than what power stealing can safely provide. Provided according to one or more embodiments herein are methods, systems and related architectures for facilitating network communications between the control unit and a cloud-based management server in a manner that promotes reduced power usage and extended service life of the rechargeable battery, while at the same time accomplishing timely data transfer between the thermostat and the cloud-based management for suitable and time-appropriate control of a system.

According to one embodiment, a thermostat is presented. The thermostat may include a plurality of heating, ventilation, and air conditioning (HVAC) connectors, a rechargeable battery, and a battery charging circuit configured to charge the rechargeable battery at least in part by harvesting power from an HVAC system through the plurality of HVAC connectors without requiring a common wire. The thermostat may also include a processor powered at least in part by the rechargeable battery. In one embodiment, the processor may be configured to operate in a low-power state, and a high-power state. The thermostat may further include a wireless communication module operatively coupled to the processor and configured to establish and maintain wireless communications with a router, including receiving transmissions from the router; and process the transmissions from the router by discriminating between a first type of transmission and a second type of transmission. In one embodiment, the first type of transmission may include keep-alive messages associated with a communication channel between a remote thermostat-controller server and the thermostat, and the second type of transmission may include information associated with controlling the HVAC system. The wireless communication module may be further configured to, in response to identifying a transmission of the second type during a time period in which the processor is operating in the low-power state, cause the processor to transition from the low-power state to the high-power state, whereby the processor can operate in the low-power state for an extended period of time while a Natural Address Translation (NAT) table entry in the router that is associated with the communication channel between the processor and the remote thermostat-controller server remains maintained during said extended period of time.

According to another embodiment, a method of controlling an environmental condition may be presented. The method may include charging a power supply using a first power harvested from an external power source; and powering a circuit with energy from the power supply. In one embodiment, the circuit may be configured to operate in a plurality of modes, and the plurality of modes may include a low-power mode where the circuit uses less power than the first power, and an operating mode where the circuit uses more power than the first power. The method may also include establishing one or more communication channels with a server through a gateway; and communicating with the server using a protocol. In one embodiment, the protocol may include a time interval that represents a time that the gateway is expected to maintain the one or more communication channels between transmissions; a first type of transmission sent from the server at least in part to maintain one of the one or more communication channels at the gateway, and a second type of transmission comprising data for controlling the environmental condition. The method may additionally include discriminating between transmissions of the first type and transmissions of the second type, and in response to identifying a transmission of the first type during a time period in which the circuit is operating in the low-power mode; allowing the circuit to continue operating in the low-power mode. The method may further include, in response to identifying a transmission of the second type during a time period in which the circuit is operating in the low-power mode, causing the circuit to transition from the low-power mode to the operating mode, and initiating a change in the environmental condition according to the transmission of the second type.

According to yet another embodiment, a system for controlling one or more property functions may be presented. The system may include a power manager including a power-storage module configured to provide a first power; and a power input configured to provide energy to the power-storage module by harvesting a second power from an external source, wherein the second power is less than the first power. The system may further include a processing function configured to control the one or more property functions and operate in a plurality of modes including a first mode where the processing function uses a third power and the third power is less than the second power, and a second mode where the processing function uses a fourth power that is higher than the second power and not greater than the first power. The system may additionally include a network-communication module configured to establish one or more communication channels to a controller server through a gateway; utilize a communication protocol with the controller server, where the communication protocol may include a time interval that represents a time that the gateway is expected to maintain the one or more communication channels between transmissions; receive a first transmission from the controller server through the one or more communication channels while the processing function operates in the first mode; determine that the first transmission was sent from the controller server to maintain one of the one or more communication channels, and that the first transmission does not require the processing function to operate in the second mode; receive a second transmission from the controller server through the one or more communication channels, wherein the second transmission includes information for controlling the one or more property functions; and cause the processing function to operate in the second mode after receiving the second transmission.

Many other embodiments, features, and aspects are disclosed further herein.

DETAILED DESCRIPTION OF THE INVENTION

Figure 1:
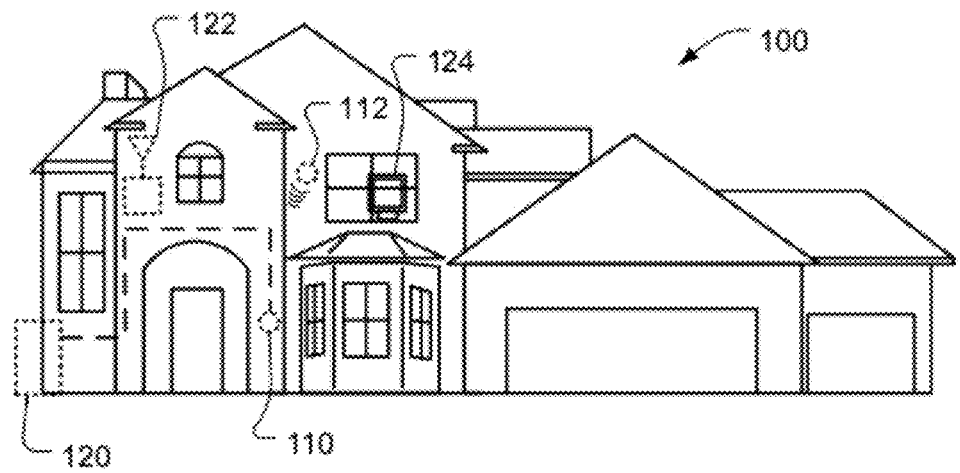
FIG. 1 illustrates an environment in which an embodiment of a controller may be used.

The subject matter of this patent specification relates to the subject matter of the following commonly assigned applications, each of which is incorporated by reference herein: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; U.S. Prov. Ser. No. 61/627,996 filed Oct. 21, 2011; PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; PCT/US11/61503 filed Nov. 18, 2011; U.S. Ser. No. 13/342,156 filed Jan. 2, 2012; PCT/US12/00008 filed Jan. 3, 2012; PCT/US12/20088 filed Jan. 3, 2012; PCT/US12/20026 filed Jan. 3, 2012; PCT/US12/00007 filed Jan. 3, 2012; U.S. Ser. No. 13/351,688 filed Jan. 17, 2012; U.S. Ser. No. 13/356,762 filed Jan. 24, 2012; PCT/US12/30084 filed Mar. 22, 2012; U.S. Ser. No. 13/434,573 filed Mar. 29, 2012; U.S. Ser. No. 13/434,560 filed Mar. 29, 2012; U.S. Ser. No. 13/440,907 filed Apr. 5, 2012; and U.S. Ser. No. 13/440,910 filed Apr. 5, 2012. The above-referenced patent applications are collectively referenced herein as "the commonly assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

In addition to controlling HVAC systems, the embodiments described herein may also be used in the context of controlling any function related to property. As used herein, the term "property controller," or commonly just "controller" may encompass HVAC controllers, thermostats, and many other types of controllers. For example, in addition to controlling an HVAC system, a controller may be used to control other property functions, such as sprinkler systems, light systems, security systems, entertainment systems, medical equipment, pet-care systems, emergency systems, distributed sensor networks, transportation systems, food-preservation systems, and/or any other type of system amenable to automated or interactive control. According to one embodiment, a property controller may be used to control an environmental condition, such as temperature, humidity, air flow, volume, and/or the like.

FIG. 1 is a diagram illustrating an exemplary enclosure using a thermostat 110 implemented in accordance with the present invention for controlling one or more environmental conditions. For example, enclosure 100 illustrates a single-family dwelling type of enclosure using a learning thermostat 110 (also referred to for convenience as "thermostat 110") for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 and readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input.

As used herein, a "primary" thermostat refers to a thermostat that is electrically connected to actuate all or part of an HVAC system, such as by virtue of electrical connection to HVAC control wires (e.g. W, G, Y, etc.) leading to the HVAC system.

As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat.

In one scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Each device is assigned a private network address from the integrated router 122 either dynamically through a service like Dynamic Host Configuration Protocol (DHCP) or statically through actions of a network administrator. These private network addresses may be used to allow the devices to communicate with each directly over the LAN. Other embodiments may instead use multiple discrete switches, routers and other devices (not shown) to perform more other networking functions in addition to functions as provided by integrated router 122.

Integrated router 122 further provides network devices access to a public network, such as the Internet, provided enclosure 100 has a connection to the public network generally through a cable-modem, DSL modem and an Internet service provider or provider of other public network service.

Public networks like the Internet are sometimes referred to as a Wide-Area Network or WAN. In the case of the Internet, a public address is assigned to a specific device allowing the device to be addressed directly by other devices on the Internet. Because these public addresses on the Internet are in limited supply, devices and computers on the private network often use a router device, like integrated router 122, to share a single public address through entries in Network Address Translation (NAT) table. The router makes an entry in the NAT table for each communication channel opened between a device on the private network and a device, server, or service on the Internet. A packet sent from a device on the private network initially has a "source" address containing the private network address of the sending device and a "destination" address corresponding to the public network address of the server or service on the Internet. As packets pass from within the private network through the router, the router replaces the "source" address with the public network address of the router and a "source port" that references the entry in the NAT table. The server on the Internet receiving the packet uses the "source" address and "source port" to send packets back to the router on the private network which in turn forwards the packets to the proper device on the private network doing a corresponding lookup on an entry in the NAT table.

Entries in the NAT table allow both the computer device 124 and the thermostat 110 to establish individual communication channels with a thermostat management system (not shown) located on a public network such as the Internet. In accordance with some embodiments, a thermostat management account on the thermostat management system enables a computer device 124 in enclosure 100 to remotely access thermostat 110. The thermostat management system passes information from the computer device 124 over the Internet and back to thermostat 110 provided the thermostat management account is associated with or paired with thermostat 110. Accordingly, data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network where the thermostat management system and thermostat management account may be accessed. Further details on accessing the public network, such as the Internet, and remotely accessing a thermostat like thermostat 110 in accordance with embodiments of the present invention is described in further detail later herein.

In some embodiments, thermostat 110 may wirelessly communicate with remote thermostat 112 over the private network or through an adhoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

Figure 2:
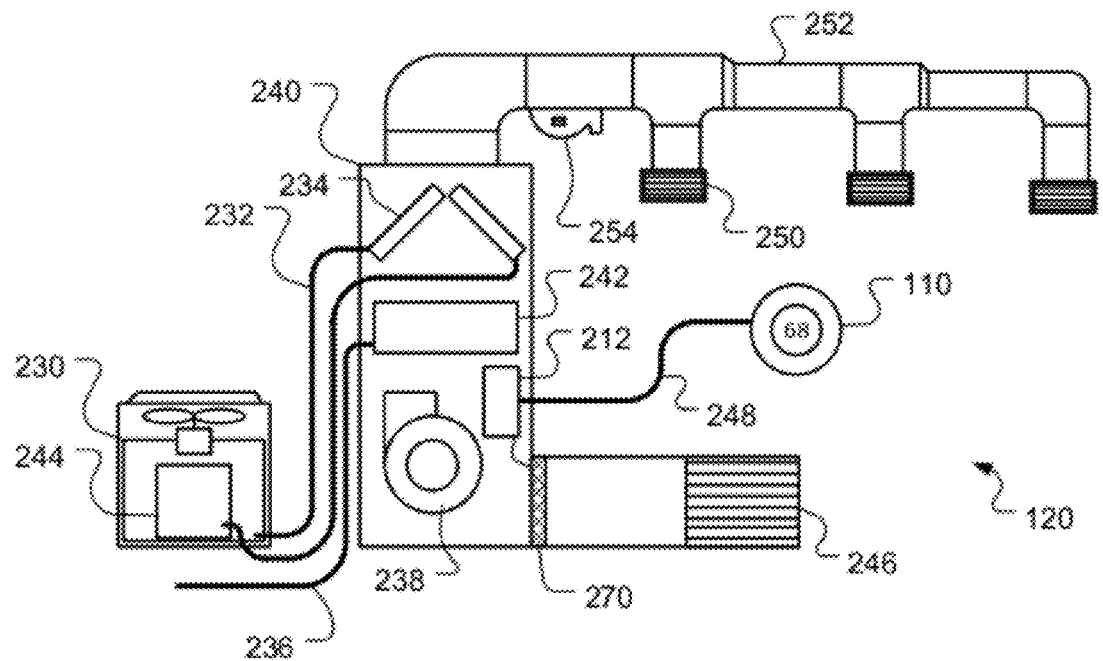
FIG. 2 illustrates a heating, ventilation, and air conditioning system.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
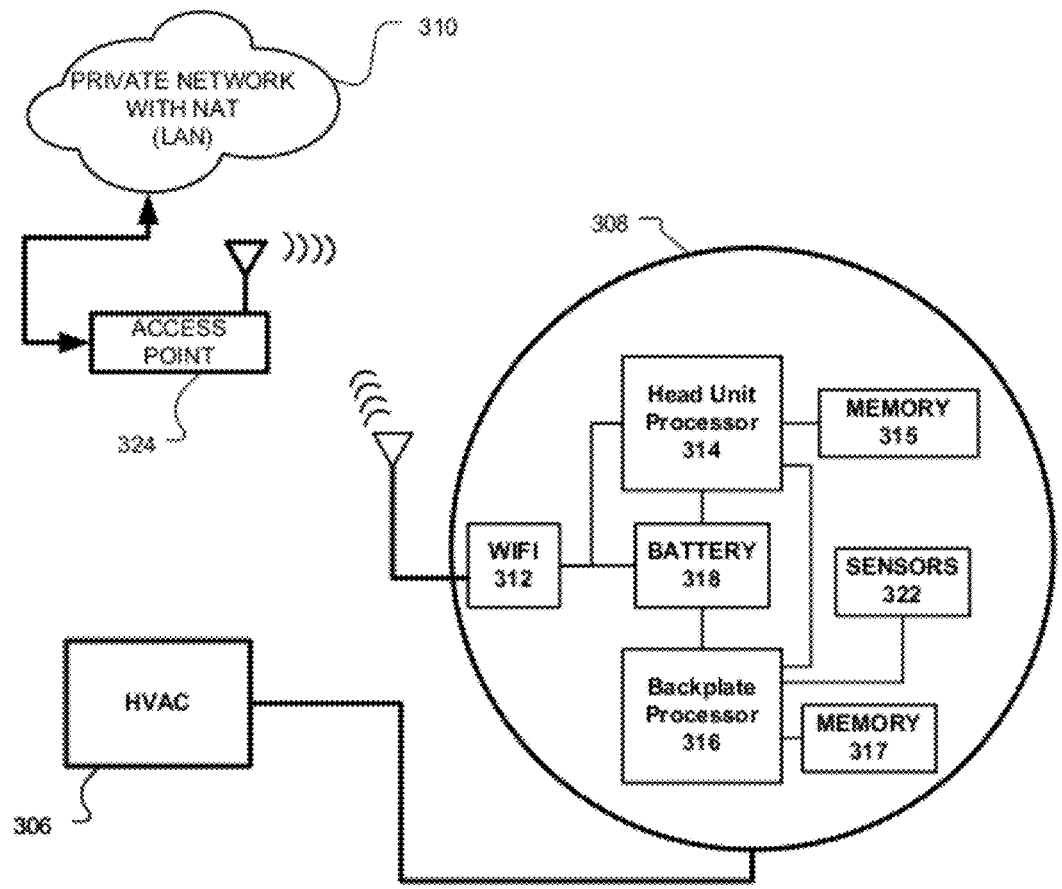
FIGS. 3A-3B illustrate an embodiment of a controller.

Referring to FIG. 3A, a schematic block diagram provides an overview of some components inside a thermostat in accordance with embodiments of the present invention. Thermostat 308 is similar to thermostat 112 in FIG. 1 except that thermostat 308 also illustrates and highlights selected internal components including a Wi-Fi module 312 and antenna, a head unit processor 314 with associated memory 315, a backplate processor 316 with associated memory 317, and sensors 322 (e.g., temperature, humidity, motion, ambient light, proximity). In one embodiment, head unit processor 314 can be a Texas Instruments AM3703 Sitara ARM microprocessor while backplate processor 316, which may be more specifically referenced to as a "microcontroller", can be a Texas Instruments MSP430F microcontroller. Further details regarding the physical placement and configuration of the thermostat head unit, backplate, and other physical elements are described in the commonly assigned U.S. Ser. No. 13/199,108, supra. Both the head unit processor 314 and the backplate processor 316 may be considered "processing functions," or more generally "circuits." Although the embodiment of FIG. 3 includes two processors, the processing function of the thermostat may encompass many other forms of hardware and/or software. By way of example, the processing function may include microprocessors, microcontrollers, field-programmable gate arrays (FPGAs), look-up tables, digital or analog circuit configurations, and/or the like. A processing function or circuit may also include multiple individual hardware components, such as a microprocessor and analog circuitry, two or more microprocessors, a microprocessor and one or more FPGAs, and/or other such arrangements.

For some embodiments, the backplate processor 316 is a very low-power device that, while having some computational capabilities, is substantially less powerful than the head unit processor 314. The backplate processor 316 is coupled to, and responsible for polling on a regular basis, most or all of the sensors 322 including the temperature and humidity sensors, motion sensors, ambient light sensors, and proximity sensors. For sensors 322 that may not be located on the backplate hardware itself but rather are located in the head unit, ribbon cables or other electrical connections between the head unit and backplate are provided for this purpose. Notably, there may be other sensors (not shown) for which the head unit processor 314 is responsible, with one example being a ring rotation sensor that senses the user rotation of an outer ring of the thermostat. Each of the head unit processor 314 and backplate processor 316 is capable of entering into a "sleep" state, and then "waking up" to perform various tasks.

The backplate processor 316, which in some embodiments will have a low-power sleep state that corresponds simply to a lower clock speed, generally enters into and out of its sleep mode substantially more often than does the more powerful head unit processor 314. The backplate processor 316 is capable of waking up the head unit processor 314 from its sleep state. For one embodiment directed to optimal battery conservation, the head unit processor 314 is allowed to sleep when its operations are not being called for, while the backplate processor 316 performs polling of the sensors 322 on an ongoing basis, maintaining the sensor results in memory 317. The backplate processor 316 will wake up the head unit processor 314 in the event that (i) the sensor data indicates that an HVAC operation may be called for, such as if the current temperature goes below a currently active heating setpoint, or (ii) the memory 317 gets full and the sensor data needs to be transferred up to the head unit processor 314 for storage in the memory 315. The sensor data can then be pushed up to the cloud server (thermostat management server) during a subsequent active communication session between the cloud server and the head unit processor 314.

By way of example, the head unit processor 314 can draw on the order of 250 mW when awake and processing. Other controller functions, such as an LCD module, can draw on the order of 250 mW when active. Moreover, the Wi-Fi module 312 can draw 250 mW when active, and needs to be active on a consistent basis such as at a consistent 2% duty cycle in some scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios. Table 1 shows how the total system power consumption of an example embodiment might be calculated.

TABLE 1

| Mode | Power | Time in mode | Timer per day | % | Ave. Power per 24 h |
|---|---|---|---|---|---|
| Interactive | 300 mW | 60 s | 4 | 0.28% | 0.83 mW |
| Active | 200 mW | 10 s | 192 | 2.22% | 4.44 mW |
| Standby | 11 mW | 84,240 s | 1 | 97.50% | 10.73 mW |
| | | | | Ave Power: | 16 mW |

As can be seen from Table 1, the dominant power is that of standby, though waking the head unit 8 times per hour (192 times per day) is also not insignificant. Switching each HVAC zone also takes power, estimated at ~1 mA @ 3.3v. One embodiment may be likely to be switching multiple circuits concurrently. This can significantly increase the power consumption and hence should also be optimized appropriately. In one embodiment, the processing functions may use more than 250 mW in the operating mode. In another embodiment, the processing functions may use more than 200 mW in the operating mode. In another embodiment, the processing functions may use more than 150 mW in the operating mode. In another embodiment, the processing functions may use less than 150 mW in the sleep mode. In another embodiment, the processing functions may use less than 100 mW in the sleep mode. Finally, in another embodiment, the processing functions may use less than 75 mW in the sleep mode.

As used herein, the term "network-communication module" may include all forms of hardware and software used to communicate between the controller and a network. For example, a network-communication module may include the Wi-Fi module 312 in this embodiment, as well as a cellular network interface, an Ethernet adapter, a LAN adapter, a Bluetooth interface, and/or any other type of wired or wireless interface with a network. In the case of Wi-Fi module 312, one embodiment may be implemented using Murata Wireless Solutions LBWA19XSLZ module, which is based on the Texas Instruments WL1270 chipset supporting the 802.11b/g/n WLAN standard. Embodiments of the present invention configure and program Wi-Fi module 312 to allow thermostat 308 to enter into a low power or "sleep" mode to conserve energy until one or several events occurs. For example, in some embodiments the Wi-Fi module 312 may leave this low power mode when a user physically operates thermostat 308, which in turn may also cause activation of both head-unit processor 314 and backplate processor 316 for controlling functions in head-unit and backplate portions of thermostat 110.

It is also possible for Wi-Fi module 312 to wake from a low power mode at regular intervals in response to a beacon from wireless access point 324. To conserve energy, Wi-Fi module 312 may briefly leave the low power mode to acknowledge the beacon as dictated by the appropriate wireless standard and then return to a low power mode without activating the processors or other components of thermostat 308 in FIG. 3A. In an alternative embodiment, Wi-Fi module 312 may also respond to the beacon by awaking briefly and then activating backplate processor 316, head unit processor 314, or other portions of thermostat 308 to gather data through sensors 322 and store the results in a data log 326 with a time stamp, event type and corresponding data listed for future reference. In accordance with one embodiment, backplate processor 316 may collect data in data log 326 and store in memory 320 for a period of time or until the log reaches a maximum predetermined size. At that point, the backplate processor 316 may wake head unit processor 314 to coordinate an upload of the data log 326 stored in memory 320 over a public network, such as the Internet, to cloud-based management server 516. Uploading data log 326 less frequently saves time and energy associated with more frequent transmission of individual records or log entries.

In yet another embodiment, Wi-Fi module 312 may selectively filter an incoming data packet to determine if the header is merely an acknowledgement packet (i.e., a keep-alive packet) or contains a payload that needs further processing. If the packet contains only a header and no payload, the Wi-Fi module 312 may be configured to either ignore the packet or send a return acknowledgement to the thermostat management system or other source of the packet received.

In further embodiments, Wi-Fi module 312 may be used to establish multiple communication channels between thermostat 112 and a cloud-based management server as will be described and illustrated later in this disclosure. As previously described, thermostat 112 uses the multiple communication channels to receive different types of data classified with different levels of priority. In one embodiment, Wi-Fi module 312 may be programmed to use one or more filters and a wake-on-LAN feature to then selectively ignore or discard data arriving over one or more of these communication channels. For example, low-priority data arriving over a port on Wi-Fi module 312 may be discarded by disabling the corresponding wake-on-LAN feature associated with the port. This allows the communication channel to continue to operate yet conserves battery power by discarding or ignoring the low-priority packets.

Operation of the microprocessors 314, 316, Wi-Fi module 312, and other electronics may be powered by a rechargeable battery (not shown) located within the thermostat 110. In some embodiments, the battery is recharged directly using 24 VAC power off a "C" wire drawn from the HVAC system or an AC-DC transformer coupled directly into the thermostat 110. Alternatively, one or more different types of energy harvesting may also be used to recharge the internal battery if these direct methods are not available as described, for example, in U.S. Ser. No. 13/034,678, supra, and U.S. Ser. No. 13/267,871, supra. Embodiments of the present invention communicate and operate the thermostat 110 in a manner that promotes efficient use of the battery while also keeping the thermostat operating at a high level of performance and responsiveness controlling the HVAC system. Some embodiments may use the battery-level charge and the priority or relative importance of a communication to determine when a thermostat management system located on a public network such as the Internet may communicate with the thermostat 110. Further details on the communication methods and system used in accordance with these embodiments are described in detail later herein.

Figure 3B:
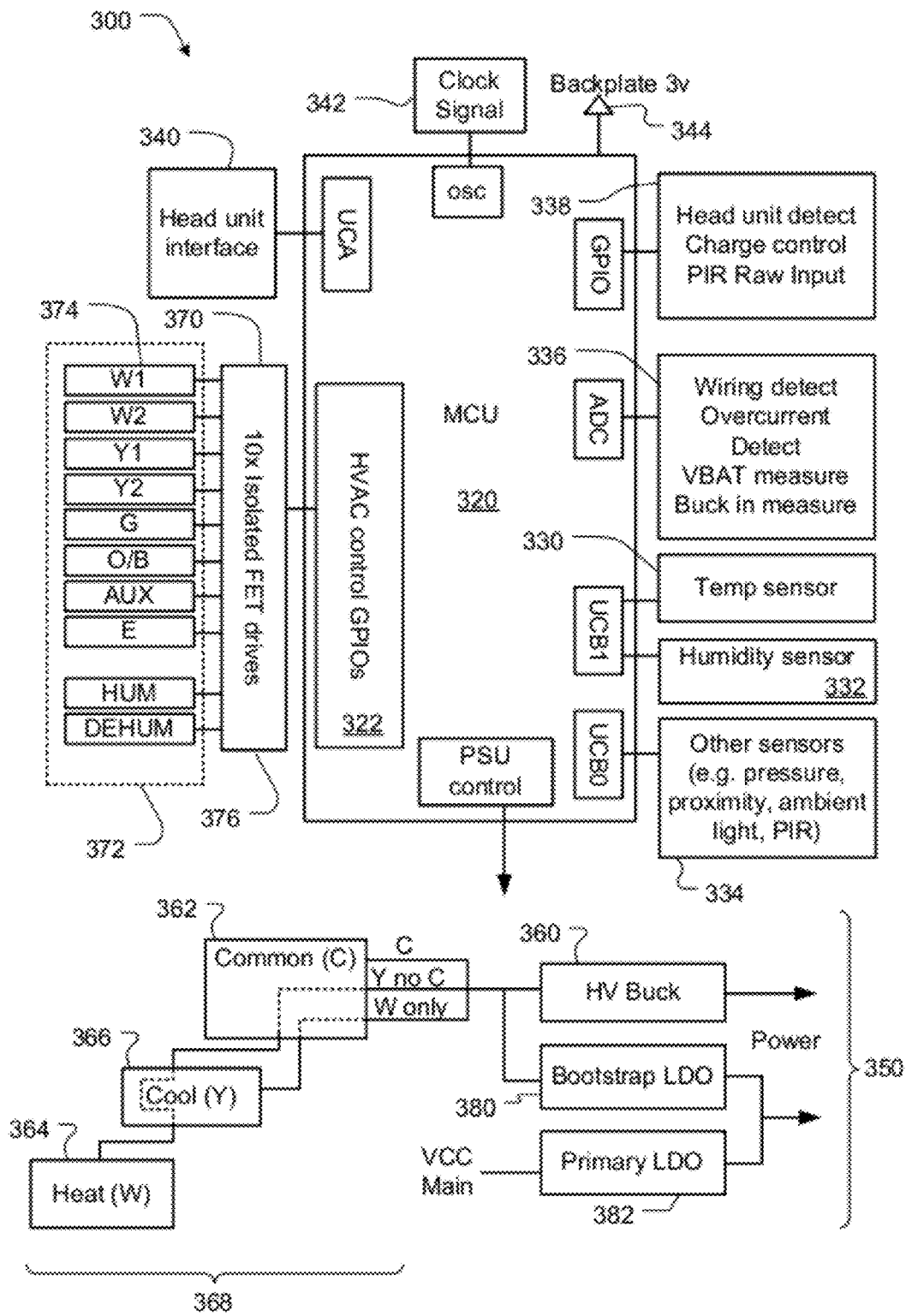

Turning now to power harvesting methods and systems, FIG. 3B is a block diagram of some circuitry of a thermostat, according to some embodiments. Circuitry 300, according to some embodiments, is a backplate of a thermostat. A number of HVAC wires can be attached using HVAC terminals 372. One example of which is the W1 terminal 374. Each terminal is used to control an HVAC function. According to some embodiments, each of the wires from the terminals W1, W2, Y1, Y2, G, O/B, AUX and E is connected to separate isolated FET drives 370. The common HVAC functions for each of the terminals are: W1 and W2 heating; Y1 and Y2 for cooling; G for fan; O/B for heatpumps; and E for emergency heat. Note that although the circuitry 300 is able control 8 functions using the isolated FET drives 370, according to some embodiments, other functions, or fewer functions can be controlled. For example circuitry for a more simply equipped HVAC system may only have a single heating (W), and single cooling (Y) and a fan (G), in which case there would only be three isolated FET drives 370. According to an embodiment, 5 FET drives 370 are provided, namely heating (W), cooling (Y), fan (G), auxiliary (AUX) and compressor direction (O/B). Not shown are the circuit returns such as RH (return for heat) and RC (return for cooling). According to some embodiments the thermostat can control a humidifier and/or de-humidifier. Further details relating to isolated FET drives 370 are described in co-pending U.S. patent application Ser. No. 13/034,674, entitled "Thermostat Circuitry for Connection to HVAC Systems," supra, which is incorporated herein by reference.

The HVAC functions are controlled by the HVAC control general purpose input/outputs (GPIOs) 322 within microcontroller (MCU) 320. MCU 320 is a general purpose microcontroller such as the MSP430 16-bit ultra-low power MCU available from Texas Instruments. MCU 320 communicates with the head unit via Head Unit Interface 340. The head unit together with the backplate make up the thermostat. The head unit has user interface capability such that it can display information to a user via an LCD display and receive input from a user via buttons and/or touch screen input devices. According to some embodiments, the head unit has network capabilities for communication to other devices either locally or over the internet. Through such network capability, for example, the thermostat can send information and receive commands and setting from a computer located elsewhere inside or outside of the enclosure. The MCU detects whether the head unit is attached to the backplate via head unit detect 338.

Clock 342 provides a low frequency clock signal to MCU 320, for example 32.768 kHz. According to some embodiments there are two crystal oscillators, one for high frequency such as 16 MHz and one for the lower frequency. Power for MCU 320 is supplied at power input 344 at 3.0 V. Circuitry 336 provides wiring detection, battery measurement, and buck input measurement. A temperature sensor 330 is provided, and according to some embodiments and a humidity sensor 332 are provided. According to some embodiments, one or more other sensors 334 are provided such as: pressure, proximity (e.g. using infrared), ambient light, and pyroelectric infrared (PIR).

Power circuitry 350 is provided to supply power. According to some embodiments, when the thermostat is first turned on with insufficient battery power, a bootstrap power system is provided. A high voltage low dropout voltage regulator (LDO) 380 provides 3.0 volts of power for the bootstrap of the MCU 320. The bootstrap function can be disabled under MCU control but according to some embodiments the bootstrap function is left enabled to provide a "safety net" if the head unit supply vanishes for any reason. For example, if the head-unit includes the re-chargeable battery 384 and is removed unexpectedly, the power would be lost and the bootstrap function would operate. The input to this Bootstrap LDO 380 is provided by connectors and circuitry 368 that automatically selects power from common 362 (highest priority), cool 366 (lower priority); or heat (lowest priority) 364.

In normal operation, a 3.0 volt primary LDO 382 powers the backplate circuitry and itself is powered by VCC Main. According to some embodiments, high voltage buck 360 is provided as a second supply in the backplate. The input to this supply is the circuitry 368. According to some embodiments, the high voltage buck 380 can supply a maximum of 100 mA at 4.5v. According to some embodiments, the VCC main and the Primary LDO 382 can be powered by a rechargeable battery (shown in FIG. 7) in cases where there is no alternative power source (such as the high voltage buck or USB power, for example).

Figure 4A:
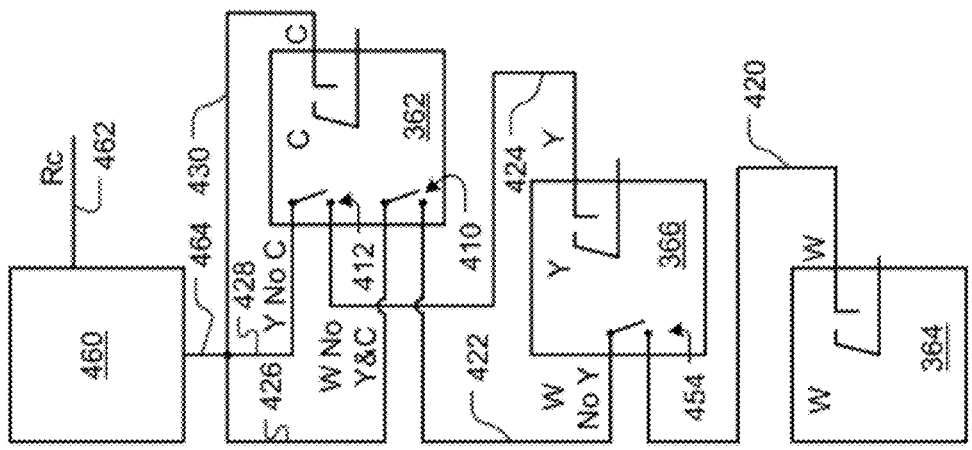
FIGS. 4A-4C illustrate auto-switching connectors, according to one embodiment.
Figure 4B:
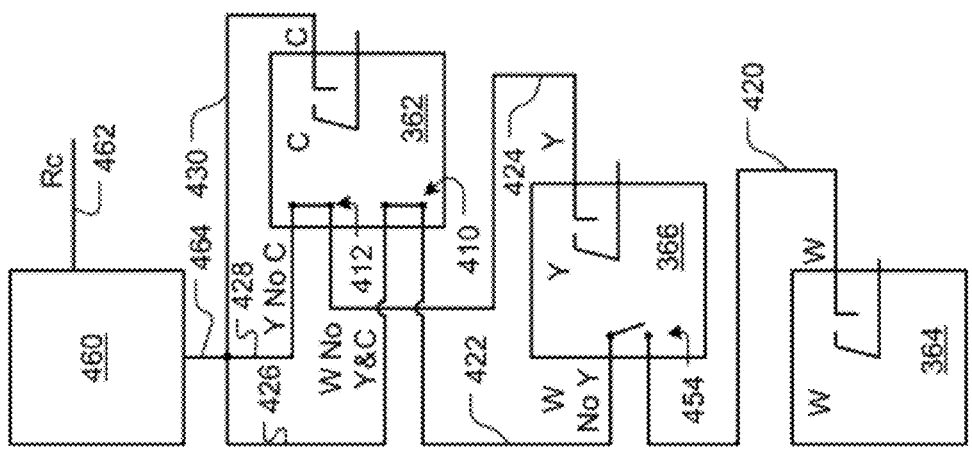
Figure 4C:
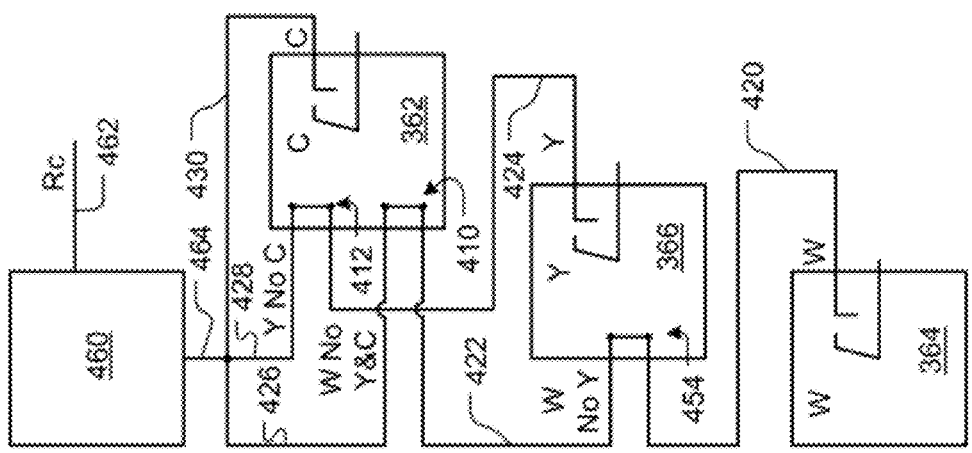

FIGS. 4A-4C schematically illustrate the use of auto-switching connectors being used to automatically select a source for power harvesting, according to some embodiments. The connectors 362, 364, and 366 are connectors as shown in FIG. 3. For further details regarding automatically switching connectors, see co-pending U.S. patent application Ser. No. 13/034,666, entitled "Thermostat Wiring Connector" incorporated herein by reference. The connector 362 is used for connection to an HVAC "C" (common) wire and includes two switched pairs of normally closed secondary conductors 410 and 412. The connector 366 is used for connection to an HVAC "Y" (cooling) wire and includes one switched pair of normally closed secondary conductors 454. The connector 364 is used for connection to an HVAC "W" (heating) wire. Note that although not shown in FIGS. 4A-C, one or more additional pairs of switched secondary conductors can be provided with any of the connectors 362, 366 and 365, such as could be used for the purpose of electronically detecting the presence of an HVAC system wire to the connector. Power harvesting circuitry 460 is used to supply power to the thermostat and is also connected to the Rc wire 462 (or according to other embodiment the Rh wire). For example, the power harvesting circuitry 460 can include the HV buck 360 and Bootstrap LDO 380 as shown in and described with respect to FIGS. 3 and 6A-B.

FIG. 4A shows the case of the switches 454, 410 and 412 when no C wire and no Y wire is attached. In this case all of the switches 454, 410 and 412 are closed and the power harvesting circuitry 460 is connected at input 464 with the W wire via circuit paths 420, 422 and 426. FIG. 4B shows the case of the switches 454, 410 and 412 when no C wire is attached but there is a Y wire attached. In this case switches 410 and 412 are closed but switch 454 is opened due to the presence of the Y wire. In this case the power harvesting circuitry 460 is connected at input 464 with the Y wire via circuit paths 424 and 428. FIG. 4C shows the case of the switches 454, 410 and 412 when both C and Y wires are attached. In this case all the switches 454, 410 and 412 are open and the power harvesting circuitry 460 is connected at input 464 with the C wire via circuit path 430. Note that the case of a connection of C and W wires and no Y wire is not shown but that in this case the W wire would not be connected to circuitry 420 since switch 410 would be open. Thus, through the use of circuitry and the connectors shown, the power harvesting circuitry is automatically switched so as to use connections to C, Y and W wires in decreasing order of priority. In one embodiment, the C wire is the highest priority as this ordinarily provides the best power source, if available. Note that according to some embodiments, the Y and W priorities are reversed to make W higher priority than Y.

Figure 5:
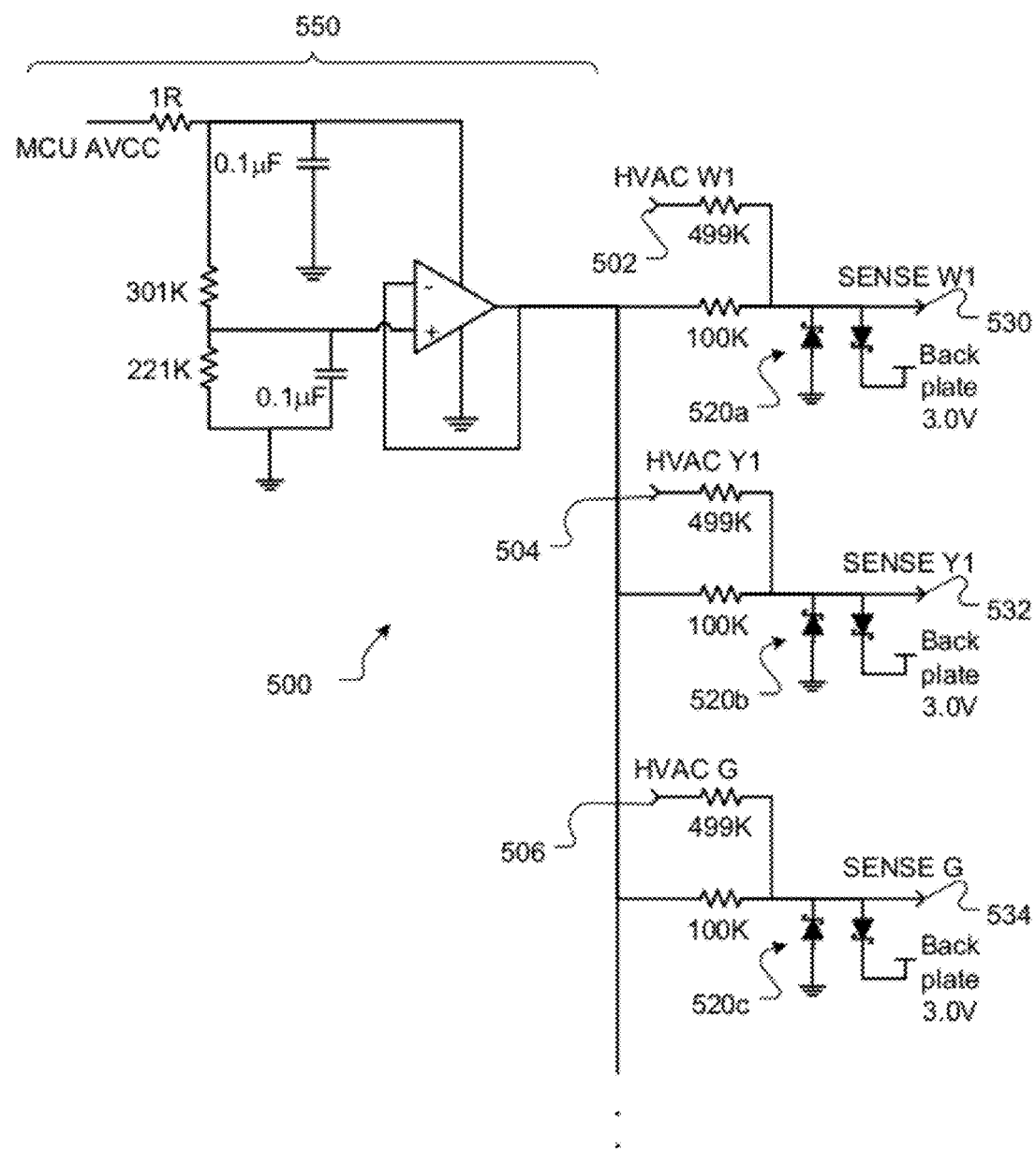
FIG. 5 illustrates a sense circuit.

FIG. 5 is a schematic of a half-bridge sense circuit, according to some embodiments. Circuit 500 provides voltage sensing, clipped to 3.0 volts, for presence detection and current sensing. At inputs 502, 504 and 506 are the 24 VAC waveforms from three of the HVAC circuits. In the case shown in FIG. 5, inputs 502, 504 and 506 are for HVAC W1, HVAC Y1 and HVAC G, respectively. The sense input bias buffer 550 is provided as shown. Note that a voltage divider is used in each case that takes the voltage from 24 volts to approximately 4 volts. Clamp diodes 520a, 520b and 520c ensure that the voltage goes no higher or lower than the range of the microcontroller 320 (shown in FIG. 3). The Sense outputs 530, 532 and 534 are connected to the microcontroller 320 so that the microcontroller 320 can sense the presence of a signal on the HVAC lines. The circuits are repeated for the other HVAC lines so that the microcontroller can detect signals on any of the HVAC lines.

Figure 6A:
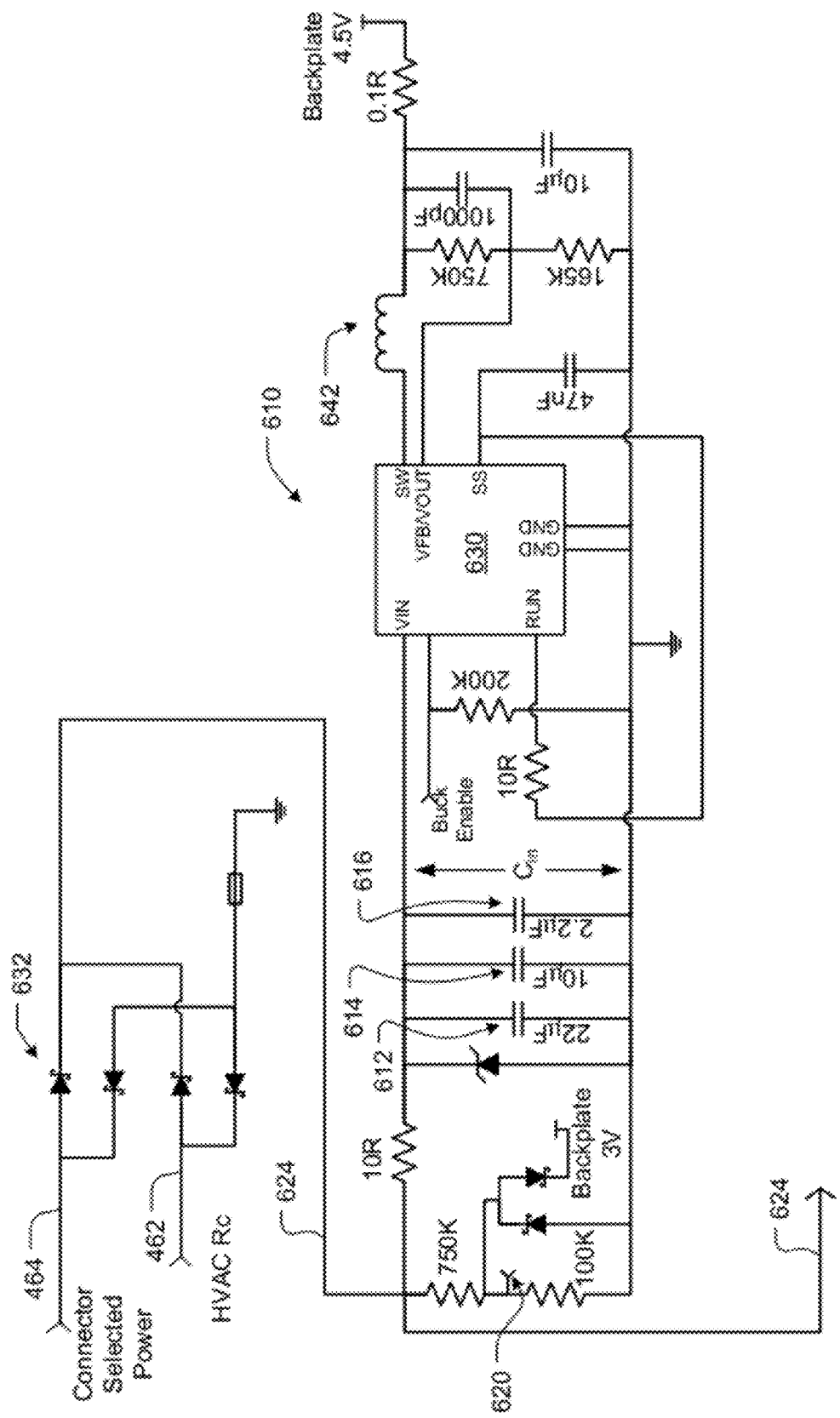
FIGS. 6A-6C illustrate power-supply systems and circuits according to one embodiment.
Figure 6B:
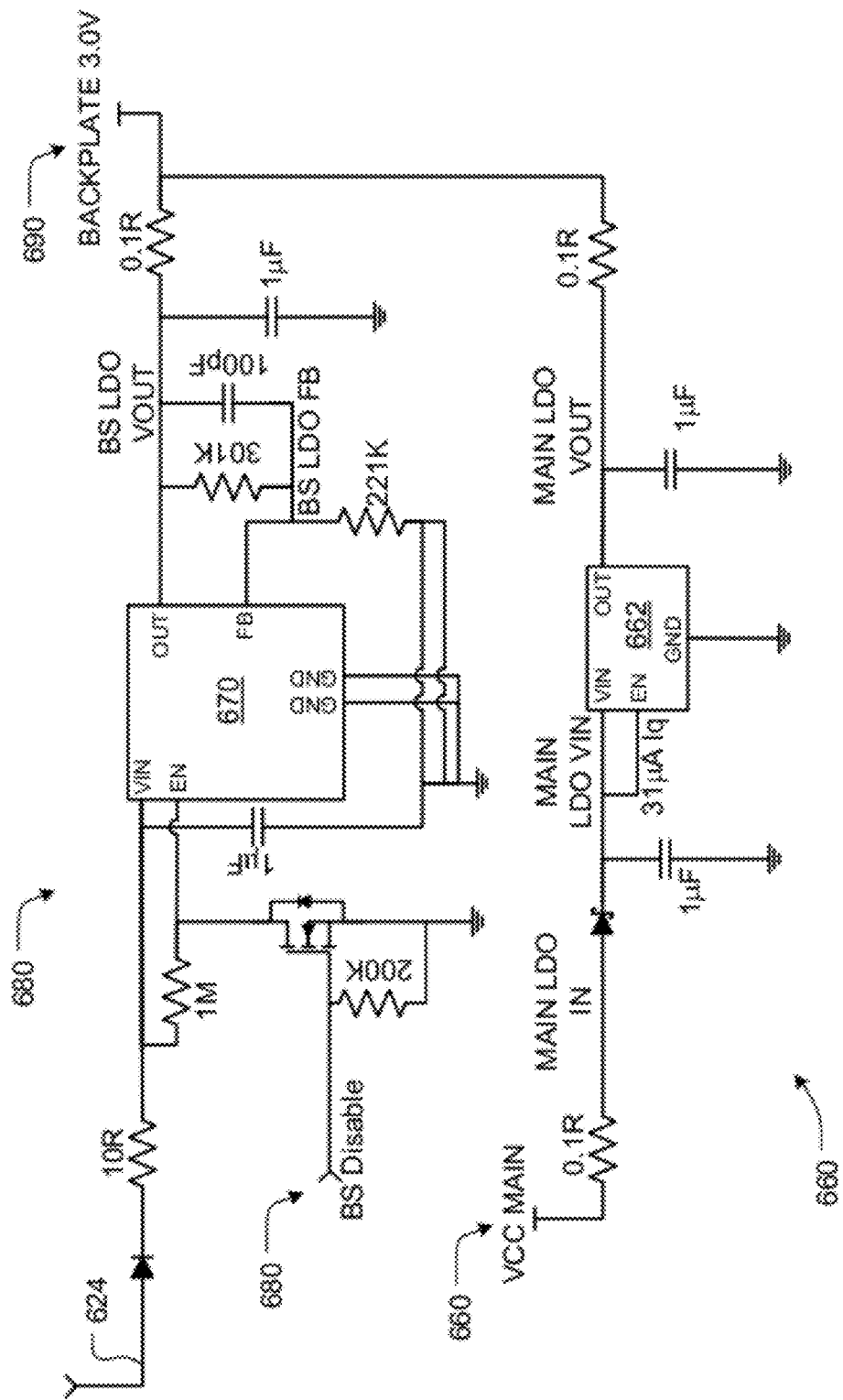

FIGS. 6A-B are schematics showing the high voltage buck, bootstrap LDO and battery LDO power circuitry, according to some embodiments. The circuitry in FIG. 6A-FIG. 6B may be part of a power manager. As used herein, the term "power manager" may include any systems, subsystems, circuitry, inputs, connections, and/or devices that may be used to manage the power supplied to the rest of the controller. FIG. 6A shows the input 464 from the connector selected power, which corresponds to input 464 to power circuitry 460 in FIG. 4. The diodes 632 are used to rectify the AC power signal from the HVAC power transformer wire that is selected by the connector circuitry shown in FIG. 4. When the thermostat is installed in a building having two HVAC power transformers, such as may be the case when an existing HVAC heating-only system is upgraded to add an HVAC cooling system. In such cases, there are two power wires from the HVAC system, often called "Rh" the power wire directly from the heating system transformer, and "Rc" the power wire directly from the cooling transformer. Input 462 is from a terminal connected to the Rc wire. According to some embodiments, the Rc and Rh terminals are switched using automatic switching or other jumperless design, as shown and described in co-pending U.S. patent application Ser. No. 13/034,674, entitled "Thermostat Circuitry for Connection to HVAC Systems," filed on even date herewith and which is incorporated herein by reference.

Rectified input 624 is input to the high voltage buck circuit 610, according to some embodiments. In buck circuit 610, which corresponds to high voltage buck 360 in FIG. 3, the voltage on the input capacitors 612, 614 and 616 of high voltage buck 610 can be measured by the MCU 320 (of FIG. 3) at node 620, allowing the MCU to momentarily open the W1 or Y1 contacts during an "enabled" or "on" phase in order to recharge the buck input capacitors 612, 614 and 616 and continue power harvesting. According to some embodiments, the same HVAC circuit (e.g. heating or cooling) is used for power harvesting, whether or not there is more than one HVAC function in the system. According to some other embodiments, when the thermostat is used with an HVAC system having two circuits (e.g. heating and cooling), the system will power harvest from the non-activated circuit. In cases where a common wire is available from the HVAC power transformer, the system might not power harvest at all from the heating and cooling circuits. According to some embodiments, the step down converter 630 is a high efficiency, high voltage 100 mA synchronous step-down converter such as the LTC3631 from Linear Technology. According to some embodiments, inductor 642 is a 100 uH power inductor such as the MOS6020 from Coilcraft. According to some embodiments, one or more other types of elements in addition to or instead of input capacitors 612, 614 and 616 are used to store electrical energy during power harvesting when the HVAC function is active (or "on"). For example, magnetic elements such as inductors and/or transformers can be used.

In order to control the HVAC functions, the HVAC function wire is shorted to the return or power wire. For example, in the case of heating, the W wire is shorted to the Rh (or R or Rc depending on the configuration). In the case of cooling the Y wire is shorted to the Rc (or R or Rh depending on the configuration). By shorting these two wires, the 24 VAC transformer is placed in series with a relay that controls the HVAC function. However, for power harvesting, a problem is that when these wires are shorted, there is no voltage across them, and when open, there is no current flow. Since power equals voltage multiplied by current, if either quantity is zero the power that can be extracted is zero. According to some embodiments, the power harvesting circuitry allows power to be taken from the two wires in both the states of HVAC—the HVAC "on" and the HVAC "off".

In the HVAC "off" state, some energy can be harvested from these two wires by taking less energy than would cause the of the relay to turn on, which would cause the HVAC function to erroneously turn on. Based on testing, it has been found that HVAC functions generally do not turn on when (0.040 A*4.5V)=0.180 watts is extracted at the output. So after the input diodes, capacitors, and switching regulator, this allows us to take 40 mA at 4.5 volts from these wires without turning on the HVAC system.

In the HVAC "on" state, the two wires must be connected together to allow current to flow, which turns on the HVAC relay. This, however, shorts out the input supply, so our system does not get any power when the HVAC "on" switch is closed. To get around this problem, the voltage is monitored on the capacitors 612, 614 and 616 at the input switching power supply node 620. When the voltage on these capacitors "$C_{in}$" drops close to the point at which the switching power supply would "Drop out" and lose output regulation, for example at about +8 Volts, the HVAC "on" switch is turned off and $C_{in}$ is charged. During the time that $C_{in}$ is charging, current is still flowing in the HVAC relay, so the HVAC relay stays on. When the $C_{in}$ capacitor voltages increases some amount, for example about +16 Volts, the HVAC "on" switch is closed again, $C_{in}$ begins to discharge while it feeds the switching regulator, and current continues to flow in the HVAC relay. Note that $C_{in}$ is not allowed to discharge back to the HVAC "on" switch due to input diodes 632. When the voltage on $C_{in}$ drops to about +8 Volts the HVAC "on" switch is turned off and the process repeats. This continues until the system tells the HVAC "on" switch to go off because HVAC is no longer needed. According to some embodiments, the ability of the HVAC "on" switch to turn on and off relatively quickly is provided by circuitry 450 as shown in and described with respect to FIG. 4 of co-pending U.S. patent application Ser. No. 13/034,674, entitled "Thermostat Circuitry for Connection to HVAC Systems," supra, which is incorporated herein by reference.

According to some embodiments, one or more alternative power harvesting techniques are used. For example, rather than having the HVAC "on" switch turn on when the voltage on $C_{in}$ reaches a certain point, the system might turn off the "HVAC "on" switch for a predetermined period of time instead. According to some embodiments, power harvesting is enhanced by synchronizing the power harvesting with the AC current waveform.

FIG. 6B is a schematic of high voltage low dropout voltage regulators used to provide bootstrap power and battery, according to some embodiments. The bootstrap LDO circuitry 680, and battery LDO circuitry correspond to the bootstrap LDO 380 and battery LDO 382 in FIG. 3 respectively. Rectified input 624 is input to bootstrap circuit 680. According to some embodiments, regulator 670 is low-dropout linear regulator such as the TPS79801 from Texas Instruments. The output power 690 is provided to the backplate at 3.0V. The bootstrap disable signal 680 can be used to disable the bootstrap power unit, as shown. The input 660 comes from VCC main, which can be, for example, from the rechargeable battery. According to some embodiments, the low dropout regulator 662 is a low quiescent current device designed for power-sensitive applications such as the TLV70030 from Texas Instruments.

Figure 6C:
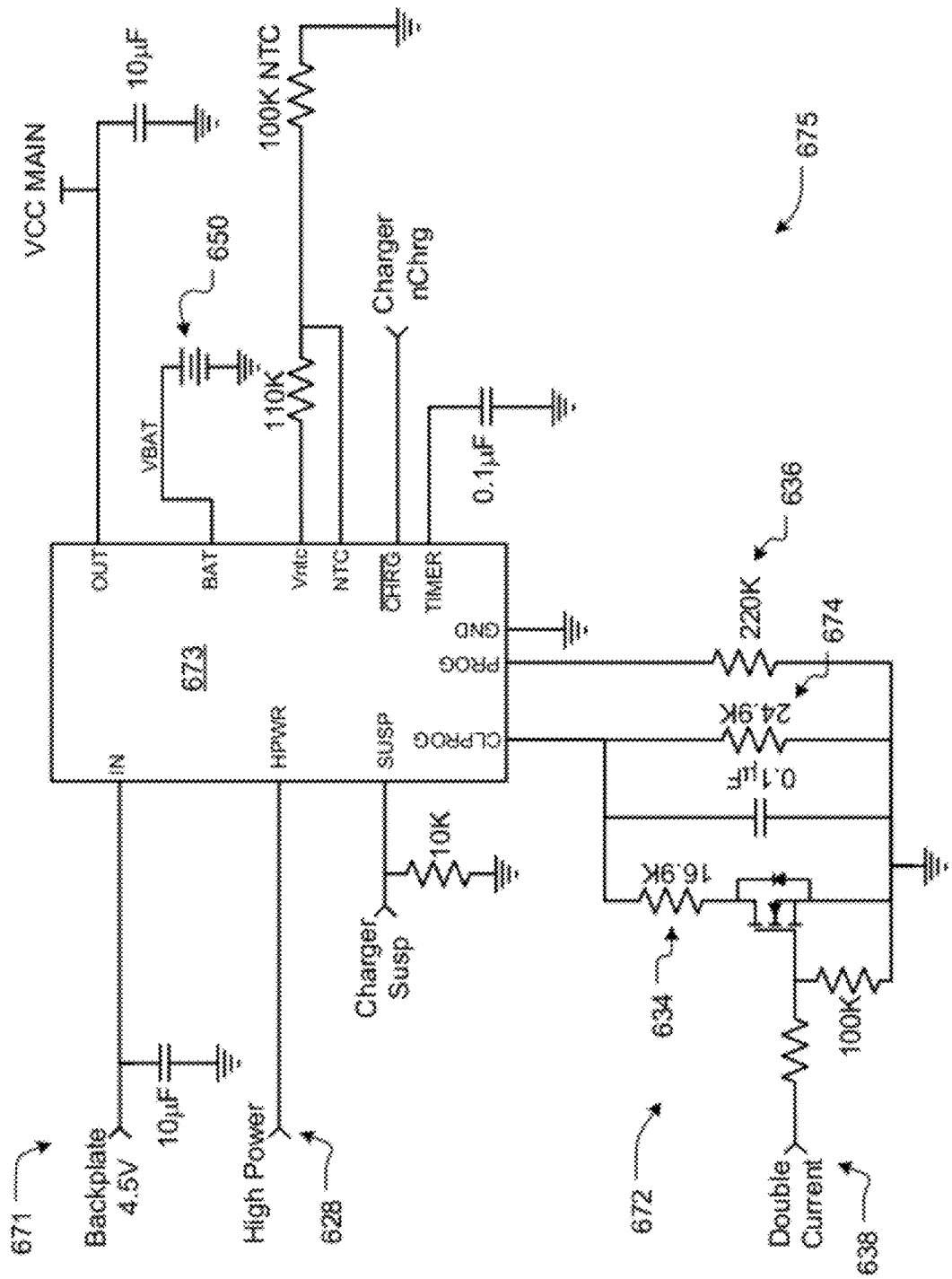

FIG. 6C shows a battery charging circuit 675 and rechargeable battery, according to some embodiments. The charger 673 is used to charge the lithium-ion battery 650. In general, li-ion battery capacity depends on what voltage the battery is charged to, and the cycle life depends on the charged voltage, how fast the battery is charged and the temperature during which the battery is charged. Ordinarily, Li-ion batteries are charged at about 4.2V. In some cases the charging voltage is even higher in an attempt to gain greater capacity, but at the expense of decreased cycle life. However, in the case of the rechargeable battery 650 for use with a wall-mounted thermostat, a greater cycle life may be preferred over capacity. High capacity is generally not needed since charging power is available via the power harvesting circuitry, and greater cycle life may be preferred since user replacement may be difficult or unavailable. Thus, according to some embodiments, a low charging speed, low final float voltage and reduced charging temperature range may be preferred. According to some embodiments, a final float voltage of between 3.9V and 4.1V is used. According to some embodiments a final float voltage of less than 4.0V is used, such as 3.95V. According to some embodiments, the ratio of charge current to total capacity "C" is also controlled, such as charging the battery to 0.2C (0.2 times the rated capacity) to provide better cycle life than a higher ratio. According to some embodiments, using a lower charging current aids in avoiding unintended tripping of the HVAC relay.

Although the embodiment illustrated in FIG. 6C uses a lithium-ion battery 750 as a power supply, other embodiments are not so limited. Other embodiments may use various power-storage modules that may be configured to store energy and provide energy to the rest of the controller. As used herein, the terms "power-storage module" and "power supply" may include many different configurations for providing and storing energy. By way of example, a power-storage module or power supply may include lithium-ion batteries and other forms of primary and secondary cell batteries, inductors, capacitors, and other energy-storage circuit elements.

Generally, the power supply or power-storage module may receive energy from another source and then store that energy for use by the controller. This process of providing energy to the power supply or power-storage module may be called "charging" or "recharging;" however, it may also include all forms of providing energy, such as providing charge to capacitors, charging a secondary cell battery, or providing current to an inductor. This energy may be stored in the form of a magnetic or electric field, and/or in a battery cell. The source of the energy provided to the power supply or power-storage module may be sourced from any external power supply. The embodiment in FIG. 6C illustrates harvesting electrical power from an HVAC system; however, it will be understood that any source of energy may be used by a power manager, whether internal or external.

According to some embodiments, charger 673 is a USB power manager and li-ion battery charger such as the LTC4085-3 from Linear Technology. Backplate voltage 671 is input to charger 673. The circuitry 672 is used to select the charging current. In particular the value of resistor 674 (24.9 k) in parallel with resistor 634 (16.9 k) in combination with the inputs Double Current 638 and High Power 628 are used to select the charging current. If High Power 628 and Double Current 638 are both set to 0, then the charging current is 8.0 mA; if the High Power 628 is set to 0 and Double Current 638 is set to 1, then the charging current is 19.9 mA; if the High Power 628 is set to 1 and Double Current 638 is set to 0, then the charging current is 40.1 mA; and if the High Power 628 and Double Current 638 are both set to 1, then the charging current is 99.3 mA. Resistor 636 is used to set the default charge current. In the case shown, a 220 k resistor set the default charge current to 227 mA. According to some embodiments, a charge temperature range of 0-44 degrees C. is set via the Thermistor Monitoring Circuits.

According to some embodiments, the thermostat is capable of being powered by a USB power supply. This could be supplied by a user, for example, by attaching the thermostat via a USB cable to a computer or another USB power supply. In cases there a USB power supply is available, it is selected as the preferred power source for the thermostat and can be used to recharge the rechargeable battery. According to some embodiments, a charge current of about 227 mA is used when a USB supply source is available; a charge current of about 100 mA is used when an HVAC common wire is present; and a charge current of between about 20-40 mA is used when power is harvested from an HVAC heating and/or cooling circuit.

Figure 7:
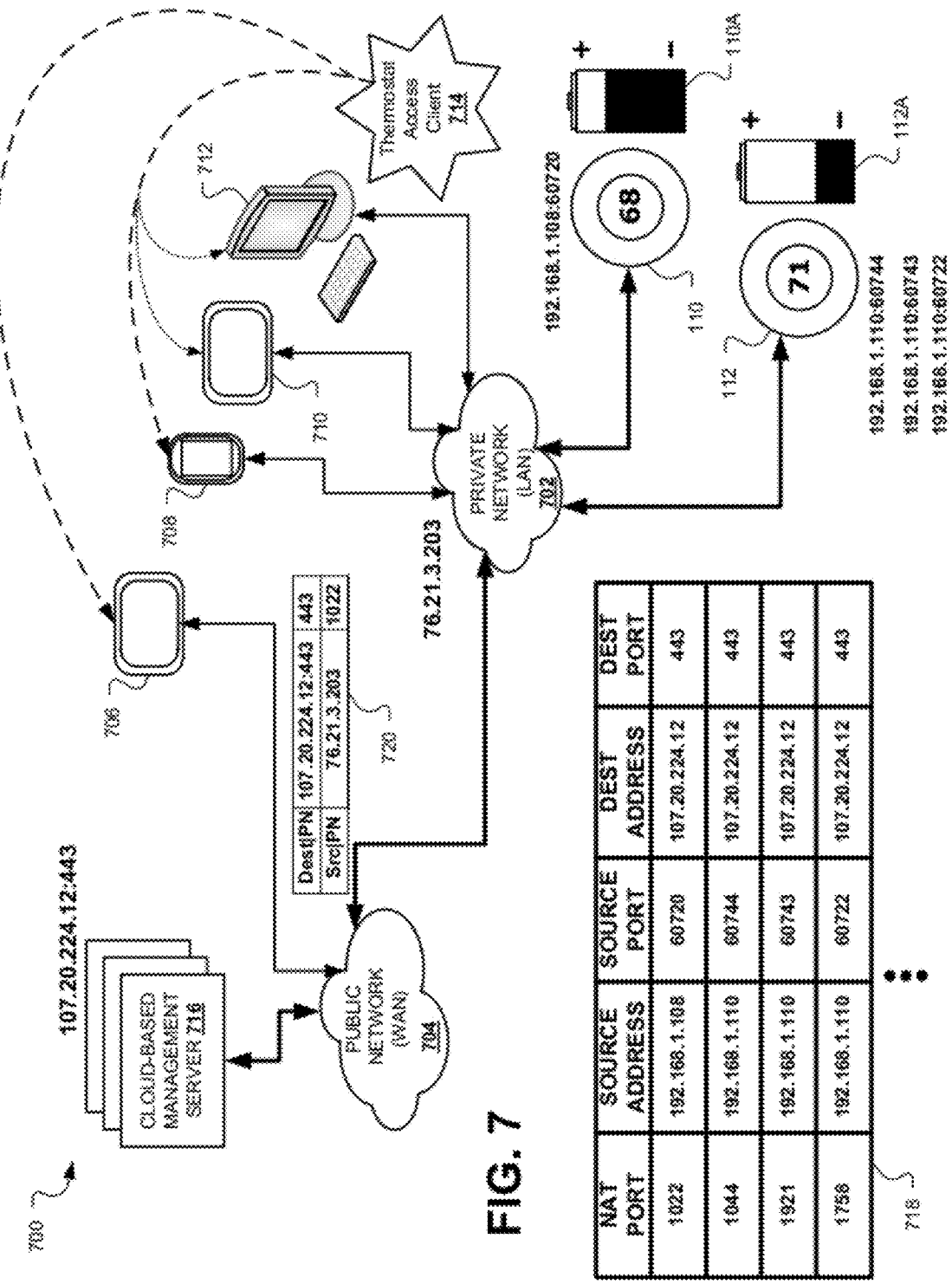
FIG. 7 illustrates thermostats and computers on a private network connected to a cloud-based management server, according to one embodiment.

FIG. 7 illustrates thermostats and computers on a private network 702 connected to a cloud-based management server 716 designed in accordance with aspects of the present invention. In one embodiment, private network 702 is designed to provide network connectivity primarily within and near an enclosure, such as enclosure 100 in FIG. 1, connecting various devices together such a Smartphone 708, tablet 710, computer 712, thermostat 110 and remote thermostat 112. A router (not shown) in private network 702, such as integrated router 122 in FIG. 1, provides wired and wireless connectivity between these devices using a network protocol such as TCP/IP. In one embodiment, thermostat 110 and remote thermostat 112 are connected wirelessly to private network 702 as a wired connection in the vicinity of the thermostats may not available and/or it is undesirable to include a wired connection socket on thermostat 110 or remote thermostat 112.

Thermostat access client 714 is a client application designed in accordance with aspects of the present invention to access a cloud-based management server 716 over public network 704. The term "thermostat management system" can be interchangeably referenced as a "cloud-based management server" for the thermostats, or more simply "cloud server", in various descriptions hereinabove and hereinbelow. Because thermostat access client 714 is designed to execute on different devices, multiple client applications may be developed using different technologies based on the requirements of the underlying device platform or operating system. For some embodiments, thermostat access client 714 is implemented such that end users operate their Internet-accessible devices (e.g., desktop computers, notebook computers, Internet-enabled mobile devices, cellphones having rendering engines, or the like) that are capable of accessing and interacting with the cloud-based management server 716. The end user machine or device has a web browser (e.g., Internet Explorer, Firefox, Chrome, Safari) or other rendering engine that, typically, is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XML HttpRequest object (an API used by a scripting language) to transfer XML and other text data asynchronously to and from a server using HTTP), and use of XML or JSON (Javascript Object Notation, a lightweight data interchange format) as a format to transfer data between the server and the client. In a web environment, an end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). The server side of the system may comprise conventional hosting components, such as IP switches, web servers, application servers, administration servers, databases, and the like. Where AJAX is used on the client side, client side code (an AJAX shim) executes natively in the end user's web browser or other rendering engine. Typically, this code is served to the client machine when the end user accesses the site, although in the alternative it may be resident on the client machine persistently. Finally, while a web-based application over Internet Protocol (IP) is described, this is not a limitation, as the techniques and exposed user interface technologies may be provided by a standalone application in any runtime application, whether fixed line or mobile. It is to be appreciated that although the TCP/IP protocol is set forth as the network protocol used for communications among the cloud-based management server 716, the thermostat access client 714, and other devices for some embodiments, it is set forth by way of example and not by way of limitation, with the use of any other suitable protocol, such as UDP over IP in particular, may be used without departing from the scope of the present teachings. In yet another embodiment, thermostat access client 714 may be a stand-alone application or "app" designed to be downloaded and run on a specific device such Smartphone 708 or table 710 device running the Apple iOS operating system, Google Android operating system or others.

It is to be appreciated that the embodiments described herein, while advantageously providing battery-conscious methods for reliable communication of thermostatically related data between the thermostats 110/112 and the cloud-based management server 716, are also advantageously configured to be compatible with a large variety of conventional integrated routers that service a large population of homes and businesses. Thus, by way of example only and not by way of limitation, the router (not shown) that services the private network 702 can be, for example, a D-Link DIR-655 Extreme N Wireless Router, a Netgear WNDR3700 RangeMax Dual Band Wireless USB Gigabit Router, a Buffalo Technology Nfiniti WZR-HP-G300NH Wireless-N Router, an Asus RT-N16 Wireless Router, Cisco Linksys E4200 Dual Band Wireless Router, or a Cisco Linksys E4200 Dual Band Wireless Router.

In one embodiment, cloud-based management server 716 illustrated in FIG. 7 may be accessed over public network 704 by computer devices on private network 702 running thermostat access client 714. Thermostat access client 714 may also execute or run on a computer device such as tablet 706 directly connected to the public network 704. In one embodiment, each thermostat access client 714 has access to a thermostat management account (not illustrated) on cloud-based management server 716 which allows thermostat access client 714 to interact with thermostat 110 or remote thermostat 112 in a variety of different ways. In some embodiments, thermostat access client 714 may be used to access sensor data previously collected from thermostat 110 and remote thermostat 112 then stored on cloud-based management server 716. In other embodiments, for example, thermostat access client 714 may be used to either remotely control or remotely configure thermostat 110. Thermostat access client 714 may also gather other information on thermostat 110 or remote thermostat 112 including a battery-level readings, firmware update levels, diagnostic data, or any other data exposed by the thermostats to thermostat access client 714.

Each of the thermostat 110 and remote thermostat 112 also communicate with cloud-based management server 716 through one or several communication channels established through public network 704. Like other devices on the private network 702, thermostat 110 and remote thermostat 112 do not have a public network address and therefore cannot communicate directly on the Internet or other public network without the assistance of the router and corresponding entries in NAT table 718. In the example in FIG. 7, thermostat 110 has a private network address of 192.168.1.108 and a private port number of 60720 while remote thermostat 112 has been configured with a private network address of 192.168.1.110 and three different port numbers 60744, 60743, and 60722. In this example, thermostat 110 initiates the establishment of a communication channel with cloud-based management server 716 having a public network address 107.20.224.12 and public port number 443. Accordingly, the router (not shown) on private network 702 creates an entry in a NAT table 718 identified by NAT PORT 1022 for communications between SOURCE ADDRESS 192.168.1.108 and SOURCE PORT 60720 of thermostat 110 and DESTINATION ADDRESS 107.20.224.12 and DESTINATION PORT 443 of cloud-based management server 716.

As described above, one embodiment uses a router to connect the Public Network 704 to the Private Network 702. However, other embodiments may use many other devices and methods for connecting two networks. As used herein, the term "gateway" may be interpreted to encompass any device implementing a method of connecting one network to another network. Many embodiments discussed herein use gateways that perform address translation between multiple networks, such as the NAT table examples discussed above. However, it should be understood that a gateway may use any method of translating addresses between multiple networks.

In an alternative configuration, thermostats 110 and 112 may be configured with multiple communication channels to cloud-based management server 716 rather than a single connection as depicted with thermostat 110. As an example, thermostat 112 initiates the establishment of communication channels over three ports 60744, 60743, and 60722, causing the router to make three more entries in the NAT table 718 identified by NAT PORTs 1044, 1921 and 1758. The additional corresponding entries in NAT table 718 identified as NAT PORT 1044, 1921, and 1758 include SOURCE ADDRESS 192.168.1.110 and SOURCE PORTS 60744, 60744, 60722 each associated with DESTINATION ADDRESS 107.20.224.12 and DESTINATION PORT 443 of cloud-based management server 716. In various embodiments of the present invention, communications between cloud-based management server 716 and other thermostats may take place over a single communication channel as configured on remote thermostat 110 while other embodiments may use multiple communications channels as provided with thermostat 112.

As data is transferred using a protocol such as TCP/IP, the router in private network 702 modifies the addresses in packets of data passing over the communication channels between the private network and a server or device on the public network such as cloud-based management server 716. In one example, the router may receive a packet from remote thermostat 110 having a SOURCE ADDRESS field of 192.168.1.108 and a SOURCE PORT of 60720 combined with a DEST ADDRESS of 107.20.224.12 and DEST PORT 443 of cloud-based management server 716. Before placing this packet on the Internet, the router references NAT table 718 and replaces the SOURCE ADDRESS field and SOURCE PORT field values with the public address 76.21.3.203 assigned to the router and the corresponding NAT port 1022 respectively. A resulting modified packet header 720 in FIG. 7 sent over the public network has the original destination address and destination port but the source address and port are changed to the public address of the router and port number from NAT table 718. As long as the entries in NAT table 718 are present, thermostats 110 and 112 may communicate over their respective communication channels on the public network 704 to cloud-based management server 716.

During these communications, embodiments of the present invention take into consideration battery-levels of the thermostats and the impact on the performance of the thermostat. If a battery-level on a thermostat is low, further communications with a thermostat may impact the ability of the thermostat to perform essential functions such as controlling the HVAC system or communicating over the network. As illustrated in FIG. 7., an enlarged battery image 110A next to thermostat 110 shows schematically a battery-level of the battery inside of thermostat 110. The battery image 110A, in this example, appears about 80% charged thus representing the battery-level inside thermostat 110 to be almost fully charged. In a similar manner, an enlarged battery image 112A adjacent to remote thermostat 112 appears about 20% charged thus indicating that the battery inside of thermostat 112 has a low battery-level. To accommodate for these different and fluctuating battery-levels, embodiments of the present invention may incorporate one or multiple different strategies in communicating and operating a thermostat.

The battery levels may be monitored by the thermostat 110 and/or by the cloud-based management server 716 in order to regulate the power used by any of the processing functions or processing circuits in the thermostat, such as head unit processor 314 and/or backplate processor 316. Oftentimes, as discussed above, the energy harvested from the HVAC system may provide less energy than may be required when the processing functions are operating in various modes. Therefore, the sleep state, or low power state of the processing functions may be configured such that the energy used during the sleep state by the processing functions is less than what is harvested from the HVAC system. Generally, a first power may be provided by the power-storage module that is higher than a second power that may be harvested from the HVAC system. Because of this configuration, the processing function may operate in a first mode, i.e., a sleep mode, which uses less power than the second power harvested from the HVAC system. This may allow for the power harvested from the HVAC system to both provide power to the power-supply module and to the processing functions while the processing functions are operating in the sleep mode (first mode). This may also enable the processing functions to operate in a second mode, i.e., an operating mode, which may require more instantaneous power than the HVAC harvesting may provide. The second mode may use a fourth power that is less than the first power that may be provided by the power-supply module, but it may also be more than the second power harvested from the HVAC system.

Figure 8A:
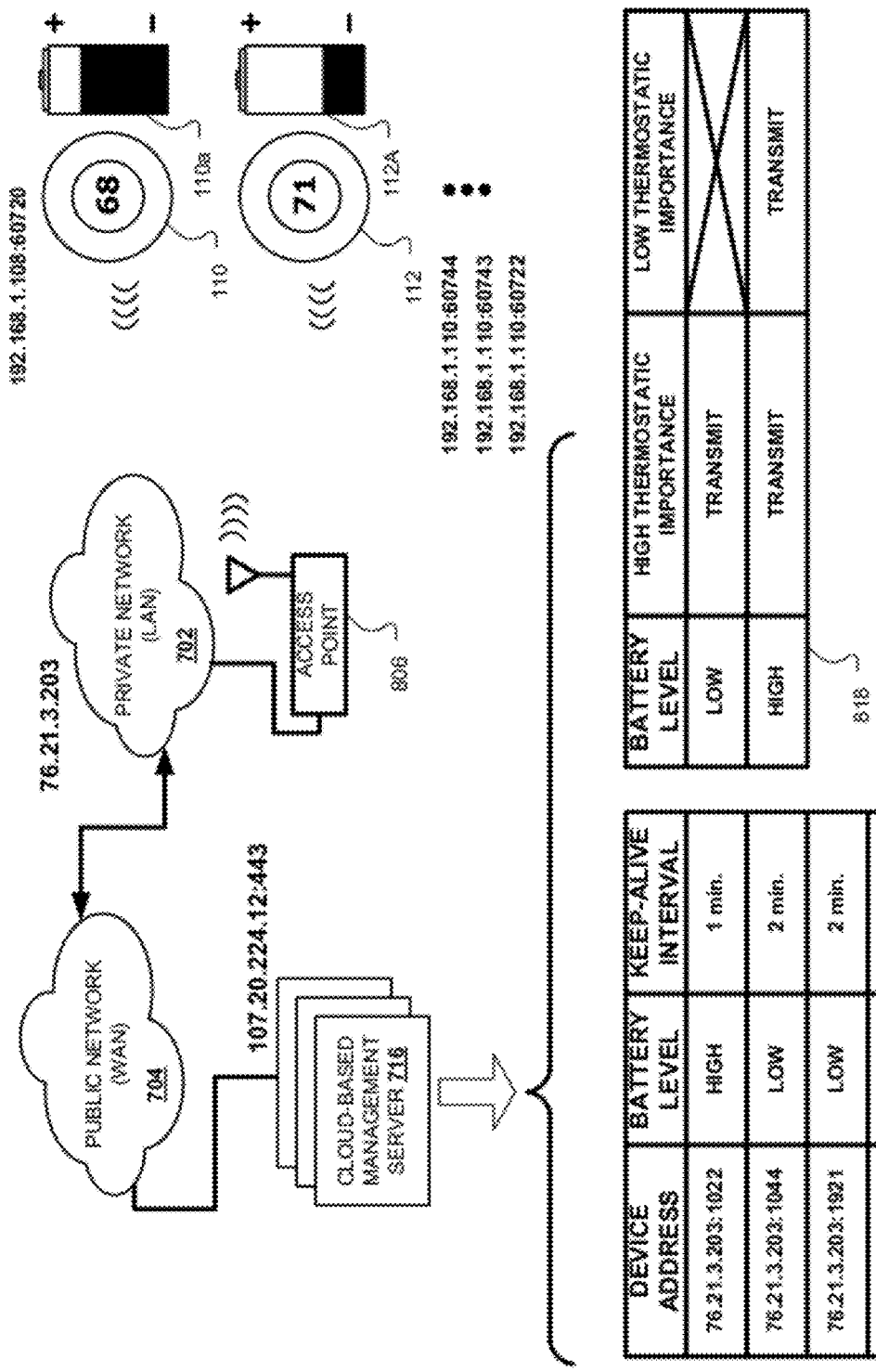
FIGS. 8A-8B illustrate an embodiment of a cloud-based management server and a power-supply level.

In one embodiment illustrated in FIG. 8A, cloud-based management server 716 monitors battery-levels on the thermostats and judiciously control the communications according to a priority assigned to the data. In some embodiments, cloud-based management server 716 implements aspects of the present invention however alternate embodiments may distribute functionality from cloud-based management server 716 to one or several servers within the system. In this example, thermostat 110 and thermostat 112 have initiated and established their respective communication channels with cloud-based management server 716 and the router on private network 702 has created NAT table 718 as previously illustrated in FIG. 7. To preserve battery-charge, the thermostats 110/112 may enter into a low power state while waiting for either (i) a local event that merits wake-up, such as a particular temperature threshold being detected by the temperature sensors, or a detected proximity of a user detected by the proximity sensors, or (ii) a next event or request from cloud-based management server 716 that merits wake-up.

Prior to entering into a low power state, each thermostat 110/112 sends a connection-opening long-polling packet to the thermostat communication server 820. When a response is not required for normal operational purposes (i.e., when the cloud-based management server 716 has no instructions or requests to render), cloud-based management server 716 maintains a long-polling communication with thermostats 110/112 allowing the communication channels to remain open even though the actual data exchanged may be infrequent or subject to long delays. This not only uses the battery-charge of the thermostats more efficiently but reduces the overhead and delay associated with reestablishing a communication channel for each data transmission. In one embodiment, cloud-based management server 716 maintains the long-polling communication in a manner that preserves the entry in NAT table 718 by sending a keep-alive priority packet at regular keep-alive intervals. In one embodiment, the keep-alive priority packet is consistent with a keep-alive facility built into a TCP/IP protocol stack. If no messages need to otherwise be sent to the thermostats 110/112 within the long-polling time interval, the protocol stack sends one or more "keep-alive" packets to the router on private network 702 at respective keep-alive intervals that are less than the long-polling time interval, thereby preserving the entry in NAT table 718. In one embodiment, the keep-alive intervals are substantially less than the interval over which many common routers might otherwise flush their NAT table with respect to that particular connection.

At a predetermined time interval or upon an event occurrence, thermostats 110 and 112 may wake from a low power state to check on their respective battery-levels and perform other administrative functions. In accordance with some embodiments, the battery-level is transmitted over a wireless connection from each thermostat 110 and 112 through an access point 806 on the private network and then stored for future reference by thermostat communication server 820. For example, battery image 110A appears about 80% charged representing the battery-level inside thermostat 110 to be almost fully charged while battery image 112A appears about 20% charged thus indicating that the battery inside of thermostat 112 is at a low level. One embodiment of cloud-based management server 716 updates this data in a device-battery-charge table 816 that includes a device address, a battery-level, and a keep-alive interval used for the corresponding communication channel. For example, device-battery-charge table 816 provides that device address 76.21.3.203:1022 (corresponding to thermostat 110 by way of NAT table 718) has a "high" battery-level and a keep-alive interval set to 5000 time units. In contrast, device addresses 76.21.3.203:1044, 76.21.3.203:1921, and 76.21.3.203:1758 (corresponding to thermostat 112 by way of NAT table 718) in device-battery-charge table 816 all have a "low" battery-level and a longer keep-alive interval set to 10000. Some embodiments of cloud-based management server 716 may set the keep-alive interval shorter if the battery-level is high to reduce the chance that an entry in the NAT table 718 will be flushed by the router. If the battery-level is "low", the keep-alive interval may be set to a maximum long-poll interval that represents a maximum time interval not likely to exceed a NAT time-out period of most router devices.

Some embodiments of cloud-based management server 716 may further use device-battery-charge table 816 to help determine when data should be communicated from cloud-based management server 716 to one or more thermostats. To implement, one embodiment further creates a power-priority table 818 that associates low and high battery-levels reported from each thermostat with high thermostatic importance data or low thermostatic importance data. In these embodiments, power-priority table 818 establishes a trade-off between the importance assigned to data being communicated compared with the drain on the current battery charge associated with the thermostat. For example, data communications with data classified as high thermostatic importance data may be filtered and transmitted even when the battery is low since the data is considered of higher importance to the overall operation of cloud-based management server 716 and the thermostat. In one embodiment, a low battery-level may be between 0 and 39% of charge capacity.

Data communications classified under a low thermostatic importance may not be transmitted when the battery level is low as indicated in power-priority table 818. Since the battery is not fully charged, low thermostatic importance data may not be transmitted in accordance with power-priority table 818 to preserve energy on the battery of the thermostat. Accordingly, low and high thermostatic importance data types are transmitted in accordance with some embodiments when the battery-level is detected as high or in a range from 80% to 100% charged.

Figure 8B:
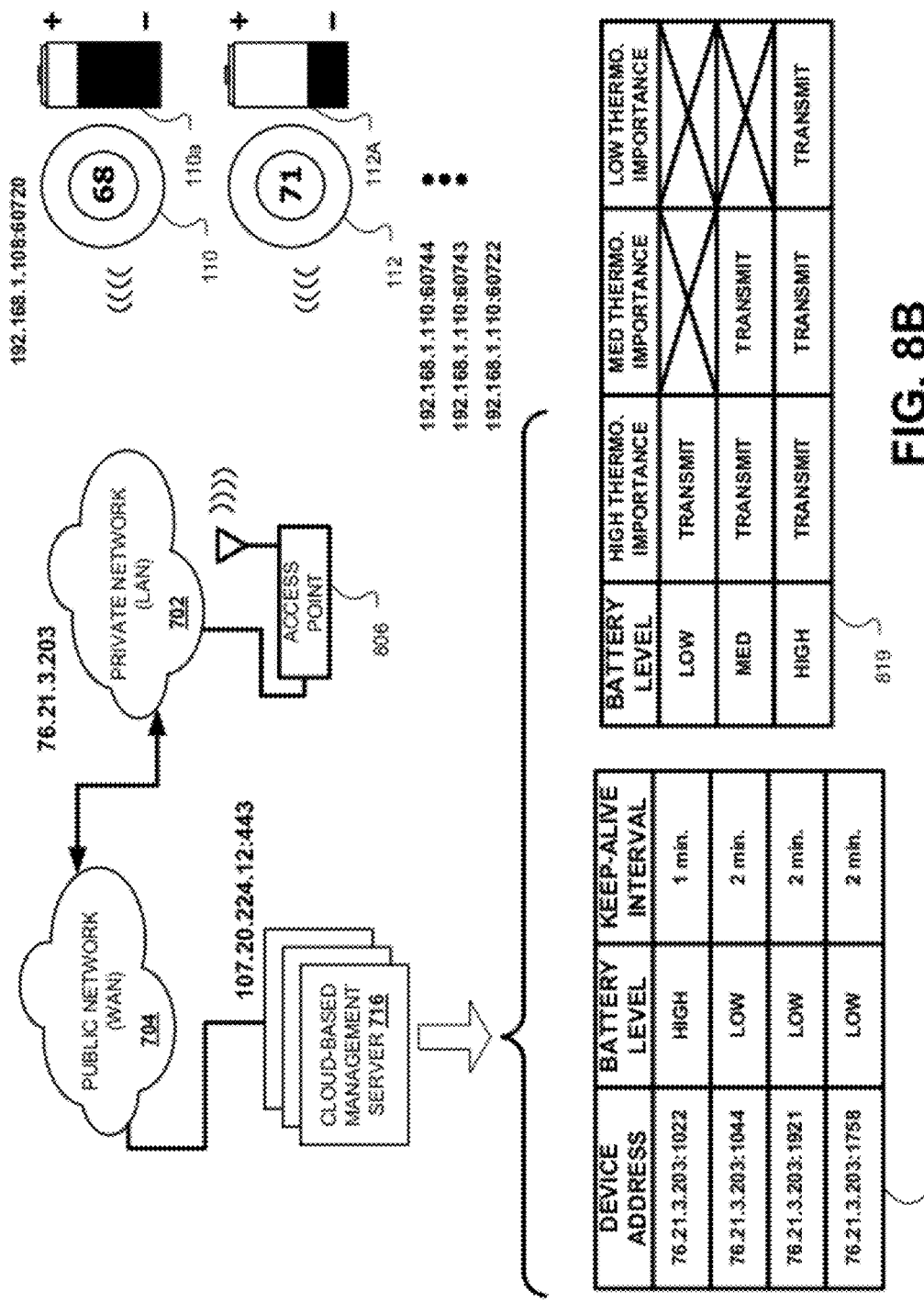

In an alternate embodiment illustrated in FIG. 8B, power-priority table 818 three batter levels and three levels of thermostatic importance. In the case of a low battery level, data consider to be high thermostatic importance is transmitted while medium and low thermostatic importance data is not sent. When the battery level is at a medium level, data considered of both high and medium thermostatic importance is transmitted. If the battery level is at least at a high level then data considered to be of low, medium and high thermostatic importance is transmitted. Further additional embodiments may also use more than three battery-levels and three data priority level types for the data as well depending on the particular design and implementation requirements. In addition, the percentage charge for low, medium and high battery-levels may include different ranges of charge that do not necessarily include the aforementioned 0-39% charge for a low battery-level, 40% to 79% for a medium battery-level, and 80% to 100% for a high battery-level.

In some embodiments, the data communications may be classified in a number of different ways and often will be determined based on the particular implementation requirements of the cloud-based management server 716 and performance requirements for the thermostats. In one implementation, a high-priority data type may include data communications actively requesting a thermostat perform some function. This may include a data communication from cloud-based management server 716 requesting thermostat 110 or 112 to change a temperature setpoint. Another high-priority data type may include a data communication requesting thermostat 110 or 112 to turn on or turn off a cooling function. In contrast, low-priority data types may include certain operations or functions deemed less critical for a thermostat to perform immediately. Downloading a software update from cloud-based management server 716 to a thermostat is one example of a low-priority communication as the software update is not required and likely does not affect the immediate operation of the thermostat. In addition, it may also be preferred to not download a software update when a thermostat has a low battery-level as a partially-completed update may render the thermostat inoperable.

Figure 9:
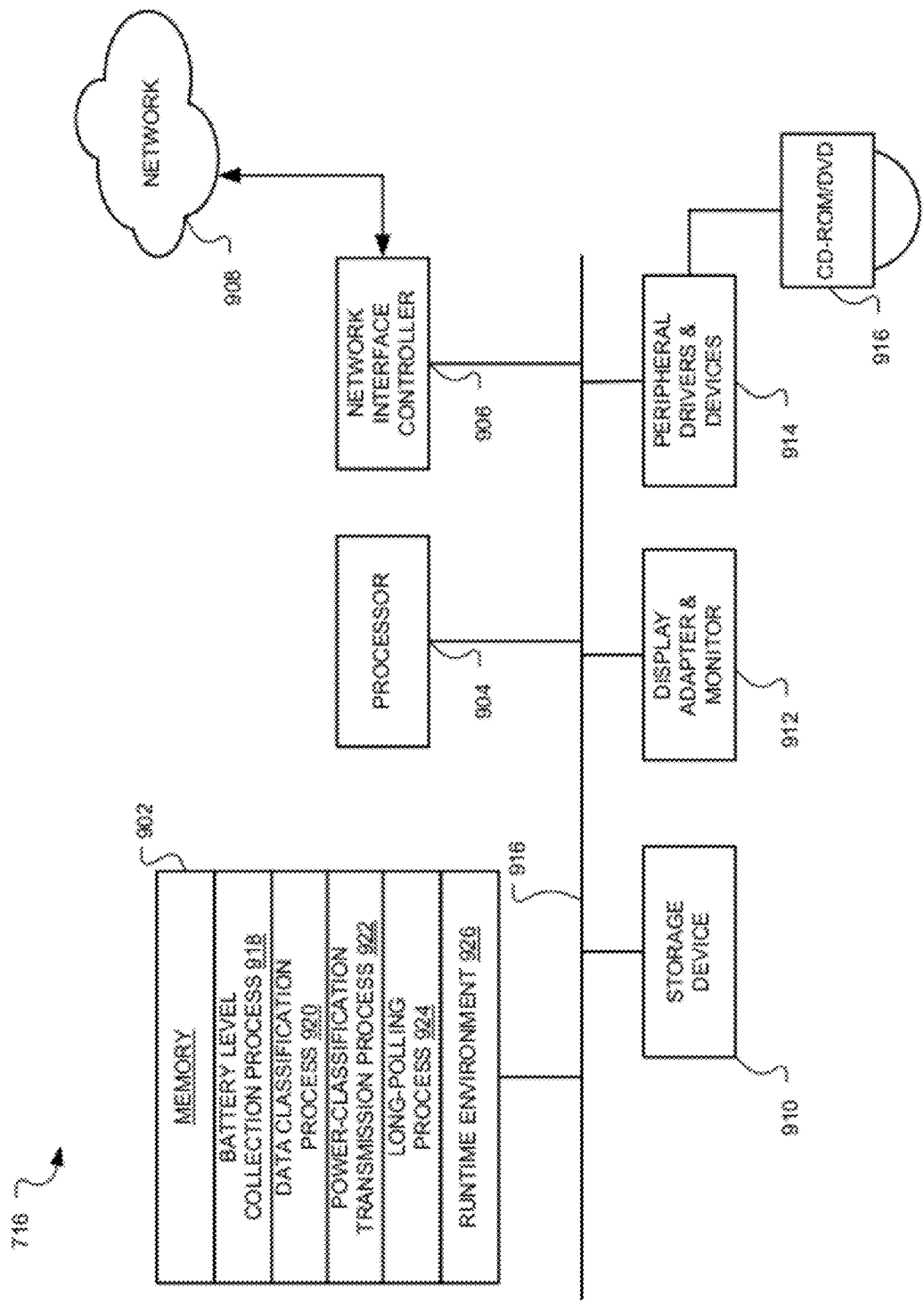
FIG. 9 illustrates a cloud-based management server that both conserves energy and promotes high-performance operation of thermostats in accordance with embodiments of the present invention.

FIG. 9 illustrates a cloud-based management server 716 that both conserves energy and promotes high-performance operation of thermostats designed in accordance with embodiments of the present invention. In this embodiment, cloud-based management server 716 includes a processor 904 configured to execute one or more instructions, a memory 902 holding instructions executable on the processor, a network interface controller 906 capable of communication over a network such as the Internet, a storage device 910, a display adapter and monitor 912 to display information from the server on the monitor, and peripheral drivers & devices 914 that includes keyboards, mice and other interfaces for controlling the server. For example, a CD-ROM/DVD device 916 with media may be attached to peripheral drivers & devices 914 holding various embodiments of the present invention tangibly embodied in a computer program product.

In one embodiment, processes in memory 902 may include a battery-level collection process 918 that stores a battery-level associated with the battery used to power a thermostat. As previously described, the battery-level in some embodiments is provided by the thermostat over a communication channel established over a network between the thermostat management system and the thermostat and provides an indication of remaining energy in the battery associated with the thermostat. The battery-level collection process is able to collect these battery-levels over a long period of time as a result of ongoing communications between the thermostat and the cloud-based management server 716, which includes the long-polling process that keeps the communication channels open between the cloud-based management server 716 and thermostats. In some embodiments, the battery-level data is stored in a device-battery-charge table 816 as illustrated in FIG. 8 and may be in a local storage area on cloud-based management server 716 or remotely accessed in a database or other remote storage area.

Some embodiments may further include a data priority process 920 in memory 902 that classifies and prioritizes one or more types of data to be transmitted to the thermostat over a communication channel. Depending on the implementation, data priority process 920 classifies the data transmission according to a data priority ranging from a low thermostatic importance data type to a high thermostatic importance data type. In some implementations, the low thermostatic importance data is of lesser importance to the operation of the thermostat management system and the thermostat. For example, a low thermostatic importance data type may include a software update as the software update may not be required for the thermostat to operate. In comparison, high thermostatic importance data types may include data of higher importance to the operation of the thermostat management system such as a request to change a setpoint in a thermostat or turn-on heating or cooling in the HVAC system.

Further embodiments may also include a power-classification transmission process 922 that transmits data to a thermostat depending on a classification of the data and the battery-level associated with the thermostat. As previously described, the data priority classification ranges from a low thermostatic importance data type to a high thermostatic importance data type depending on the importance of the data to the overall operation of cloud-based management server 716 and the thermostat. Consequently, low thermostatic importance data may not be transmitted when a battery-level is low in order to conserve the battery power remaining on the thermostat. However, the power-classification transmission process 922 may transmit all data classifications when the battery-level associated with a thermostat is fully-charged or "high".

Embodiments of the present invention may also include a long-polling process 924 in memory 902 to facilitate keeping the communication channel open with a thermostat. This long-polling process 924 initially receive receives a request over the network from a thermostat to establish the communication channel between the cloud-based management server 716 located on a public network and the thermostat located on a private network. In some embodiments, cloud-based management server 716 has a public network address registered on the Internet while the thermostat has a shared public network address provided through an entry in a NAT table from a router on a private network, such as NAT table 718 in FIG. 7. The long-polling process 924 further configures a network communication protocol, such as TCP/IP, to occasionally transmit a keep-alive packet from the thermostat management system back to the network-attached thermostat over the communication channel. In some implementations, the keep-alive packet sent to the thermostat acknowledges establishment of the communication channel but may not include a payload or data that needs processing. Long-polling process 924 may set the time interval for sending these keep-alive packets at maximum time interval not to exceed a NAT time-out period of a router device. The receipt of the keep-alive packet before the NAT time-out period keeps the entry in the NAT table current and the communication channel from being disconnected.

Figure 10A:
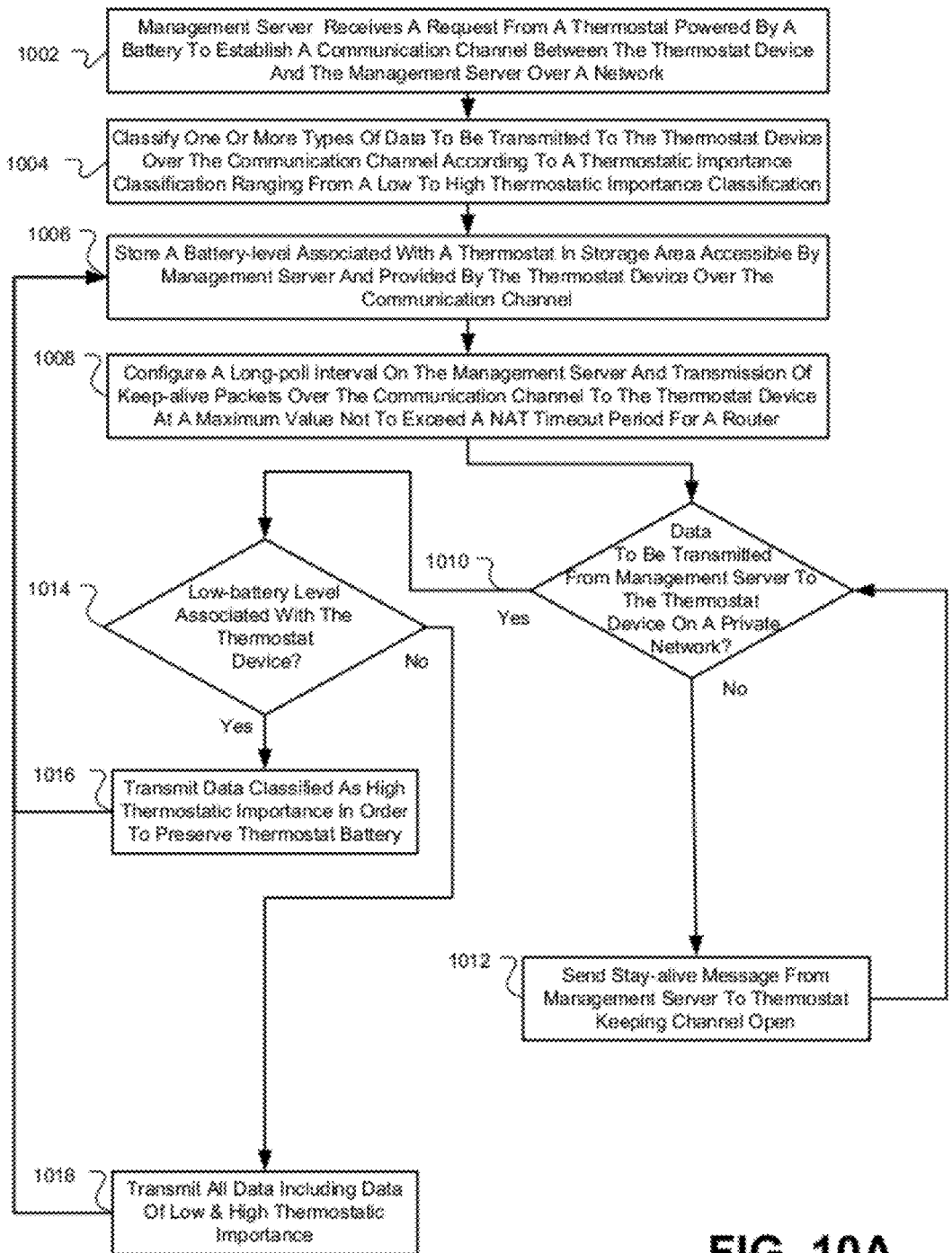
FIGS. 10A-10B illustrate diagrams of the operations of a thermostat communication server in accordance with some embodiments.

FIG. 10A illustrates a flowchart diagram of the operations that a thermostat communication server uses to coordinate communications with a battery powered thermostat that both conserves the energy of the battery and promotes performance of the thermostat. The thermostat communication server, such as cloud-based management server 716 in FIG. 8, receives a request from a thermostat powered by a battery to establish a communication channel between the thermostat and the thermostat communication server over a network. (1002) When the thermostat initiates the communication channel, a router places an entry in a NAT table, such as NAT table 718 in FIG. 7, allowing the thermostat on a private network behind a router to then communicate with thermostat communication server on the Internet, a public network. The entry in the NAT table will not be removed and the communication channel will remain open as long as any gap in communication from the thermostat communication server and the thermostat does not exceed a NAT time-out value associated with router.

Next, thermostat communication server classifies one or more types of data to be transmitted to the thermostat over the communication channel according to a thermostatic importance ranging from a low thermostatic importance to a high thermostatic importance classification. (1004) In one implementation, the low thermostatic importance data type includes data of lesser importance to the operation of the overall thermostat management system and thermostat. These may include optional functions to be performed on the thermostat such as software update or other maintenance. Conversely, the high thermostatic importance data type includes data of higher importance to the operation of the thermostat management system and the thermostat and generally includes requests to actively perform an action on the thermostat such as changing a setpoint, turning-on/off heating or cooling or checking ambient temperature in a residence or commercial location where the thermostat is located.

Next, thermostat communication server stores a battery-level associated with a thermostat in a storage area accessible by the thermostat communication server. (1006) In some embodiments, each thermostat periodically checks its own battery and provides the battery-level to the thermostat communication server over a communication channel established over the network. Battery-level information for each thermostat may be stored in a device-battery-charge table, such as device-battery-charge table 816 as illustrated in FIG. 8.

To keep the communication channel open, thermostat communication server may configure a long-poll interval for transmitting a keep-alive packet over the communication channel to the thermostat. (1008) In some embodiments, the thermostat communication server sets the long-poll interval to a maximum value not to exceed a NAT timeout period used by most routers, which is often approximately 100 minutes.

If no data passes between thermostat communication server and the thermostat (1010—No), a timer value, originally set to the long-poll interval, decreases over time within the communication protocol stack and the process continues. Eventually, if the long-poll interval runs out of time and the communication protocol stack on the thermostat communication server, such as TCP/IP, does not detect communication activity within the long-poll interval, the built-in keep-alive feature sends a packet to keep the NAT entry on the router and communication channel open. (1012) In some embodiments, the thermostat communication server may request to terminate the communication channel when the long-poll interval has elapsed and wait for new communication channel to be established by the thermostat.

Alternatively if there is data to be sent, the thermostat communication server checks the most recent battery-level of the thermostat before sending. (1010—Yes) One embodiment determines if there is a low battery-level associated with the thermostat (1014—Yes) that only data classified as high thermostatic importance data should be transmitted. (1016) This preserves some of the battery charge in the thermostat by not sending low thermostatic importance data. In some embodiments, thermostat communication server have predetermined classifications setup in advance according to a particular configuration requirement. If the data is of higher importance to the operation of the thermostat management system then the data is classified as a high thermostatic importance data type and should be sent even when there is a low battery-level. For example, high thermostatic importance data may include instructions sent to a thermostat actively requesting the thermostat change a temperature setpoint or other setting.

When the battery-level associated with the thermostat is not at a low level (1014—No), all data classified as low to high thermostatic importance will be transmitted as the battery on the thermostat is considered fully charged. (1018)

Figure 10B:
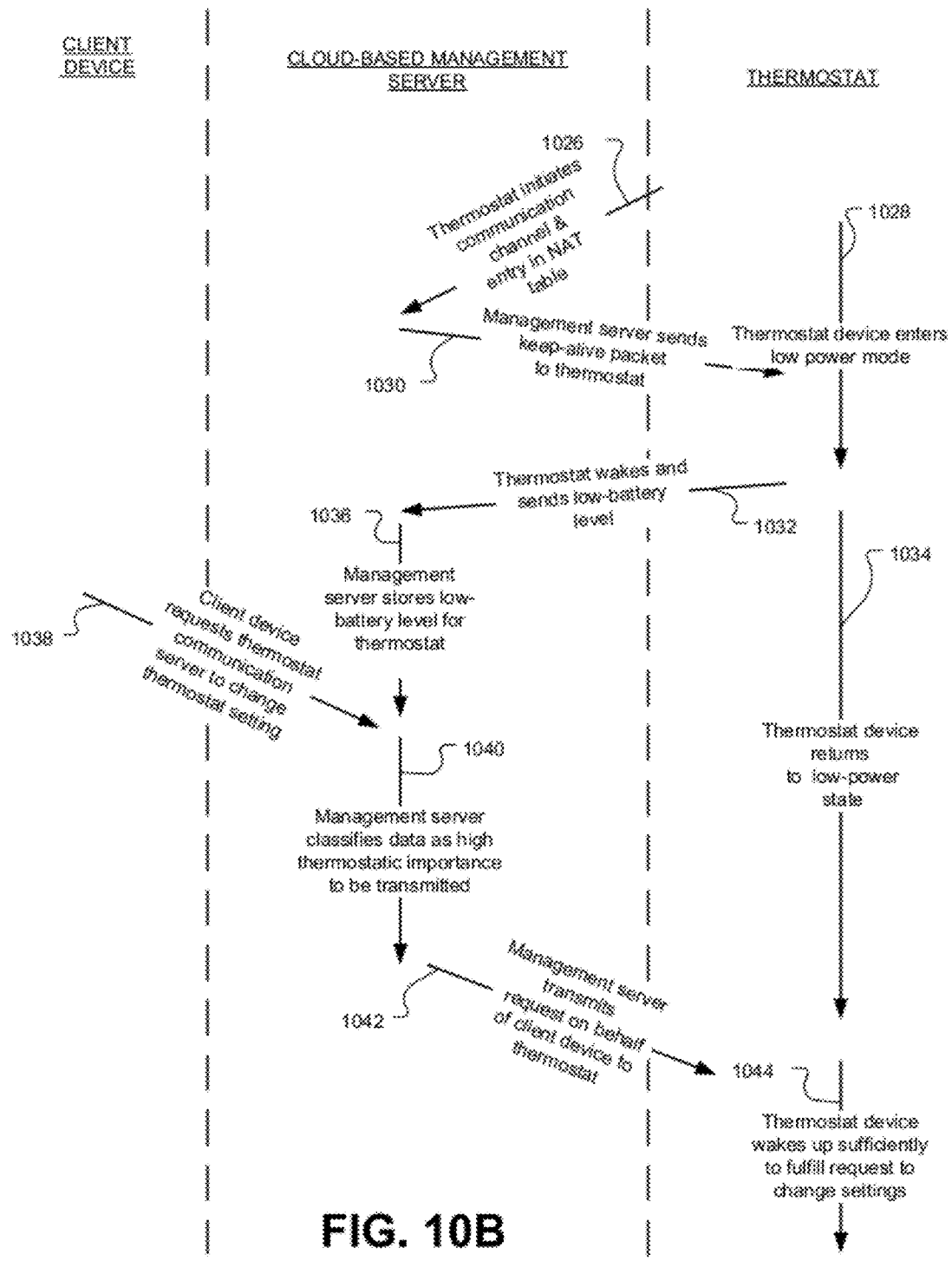

An example data flow chart in FIG. 10B illustrates the flow of data and events when thermostat communication server transmits data based on a battery-level of a thermostat and priority associated with the data. In this example, the thermostat initiates establishment of a communication channel with thermostat communication server causing a router to creates entry in the NAT table. (1026) To save energy, the thermostat enters a low power mode and waits for the next event. (1028). After a period of time, the management server sends a keep-alive packet before the NAT table entry is removed. (1030) In one embodiment, the thermostat wakes from the low power mode and sends a low battery-level to the thermostat communication server indicating the battery-level on the thermostat is nearly discharged (1032)—the thermostat then returns to a low power mode to conserve the battery use. (1034) Thermostat communication server associates the low battery level with the thermostat and stores the results in a storage area. (1036) At this point, a client device, such as tablet 706 running thermostat access client 714 in FIG. 7, requests thermostat communication server to change a thermostat setting. (1038) Thermostat communication server classifies request as a high thermostatic importance data type to be transmitted even though the battery on the thermostat is at a low level. (1040 and 1042) As a result, the thermostat receives the data transmission and fulfills the request to change the thermostat setting. (1044) Alternate implementations may use more than two battery levels and more than two corresponding thermostatic importance classifications for data such as a three classification system with low, medium, and high thermostatic importance classification data types.

Figure 11A:
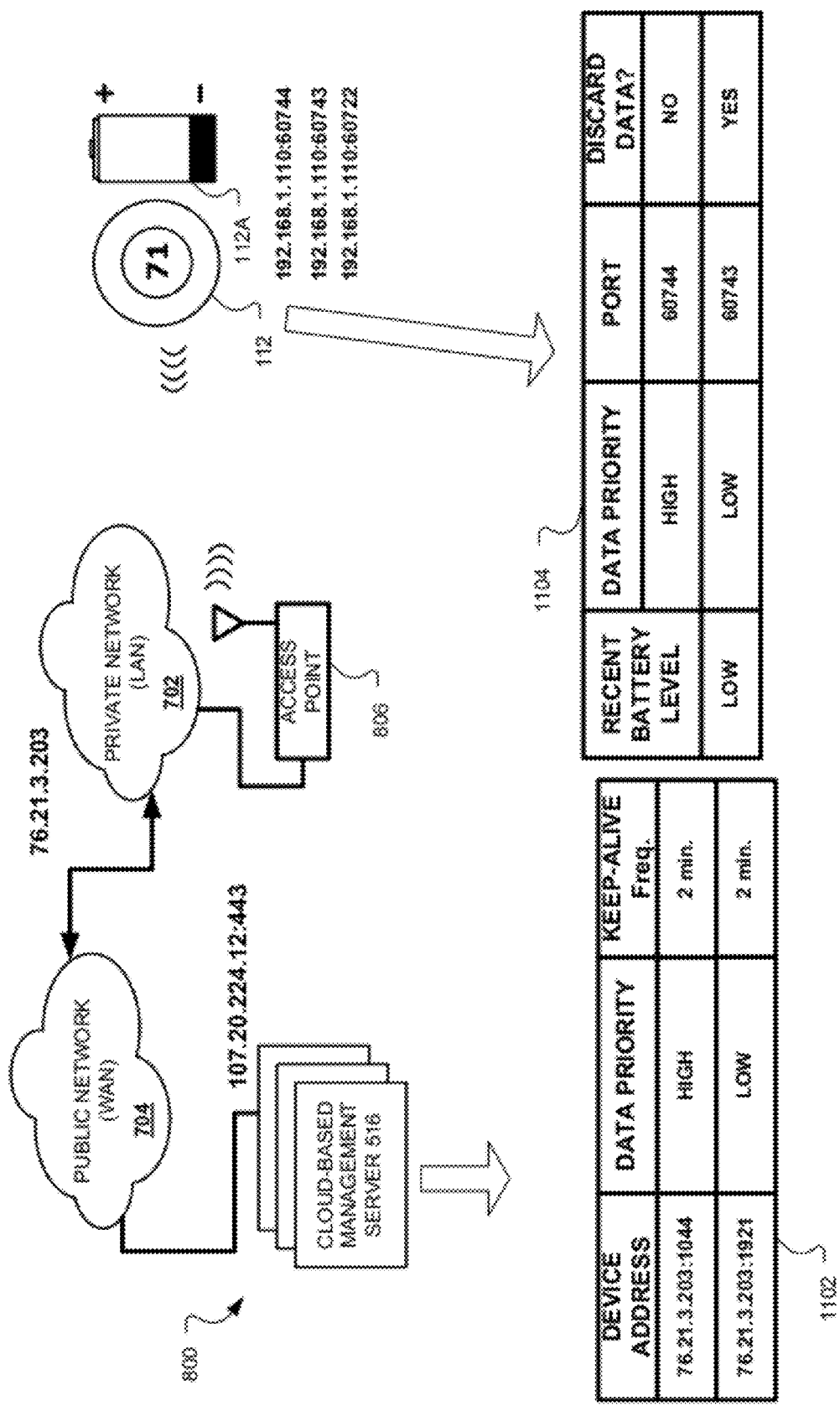
FIG. 11A illustrates a communication protocol using multiple channels according to one embodiment.

In an alternate embodiment, a battery powered thermostat and system illustrated in FIG. 11A uses a plurality of communication channels to exchange data classified with different priority in accordance with embodiments of the present invention. Accordingly, in this embodiment the thermostat 112 receives data of different priority from cloud-based management server 716 over corresponding different communication channels and, depending on the battery-level, may either process or discard the data received. Advantageously, the processing associated with this embodiment is distributed partly on cloud-based management server 716 and partly on thermostat 112. As one distinct advantage, thermostat 112 can determine the battery-level without polling or indirectly gathering data thus resulting in a more accurate processing of data packets received from thermostat communication server 820.

For example, thermostat 112 in FIG. 11A has established two wireless communication channels using private network address and port combinations 192.168.1.110:60744 and 192.168.1.110:60743. These private network addresses on thermostat 112 have corresponding entries in NAT table 718 in FIG. 7 identified with NAT port entries 1044 and 1921. Cloud-based management server 716 in FIG. 11A stores corresponding public addresses and port numbers 76.21.3.203:1044 and 76.21.3.203:1921 for thermostat 112 in a priority transmission table 102 and also associates a high and low-priority data type to each address as illustrated. In accordance with some embodiments, cloud-based management server 716 classifies data to be sent to the thermostat as being a low or high-priority data type and then sends over the appropriate communication channel or public address as indicated in priority transmission table 1102. Data passes over public network 704, private network 702, and wirelessly from access point 806 illustrated in FIG. 11A onto thermostat 112.

Settings within the Wi-Fi module (not shown) of thermostat 112 determine whether to process or discard the data depending on which communication channel the data is received. As a reflection of settings in the Wi-Fi module, a power-priority table 1104 identifies that the recent battery-level of thermostat 112 is at a low level, as illustrated by battery image 112A, and that ports 60744 and 60743 are used to process high and low data types respectively. Because the most recent battery-level was low, power-priority table 1104 also indicates in this example that the Wi-Fi module has been configured to ignore or discard low-priority data arriving on ports 60743 and process only high-priority data received over port 60744. Over time, thermostat 112 may update the configuration of the Wi-Fi module to accept or discard packets depending on the battery-level the thermostat 112 detects. If thermostat 112 later determines the battery-level is high, thermostat 112 reconfigures Wi-Fi module to subsequently process both low and high-priority data packets arriving over both ports. In alternate embodiments, Wi-Fi module may also be configured to use greater or fewer ports and process either greater or fewer data priority types. For example, three communication channels may be used to process either high-priority, medium-priority or low-priority data types rather than just either high-priority or low-priority data types.

Figure 11B:
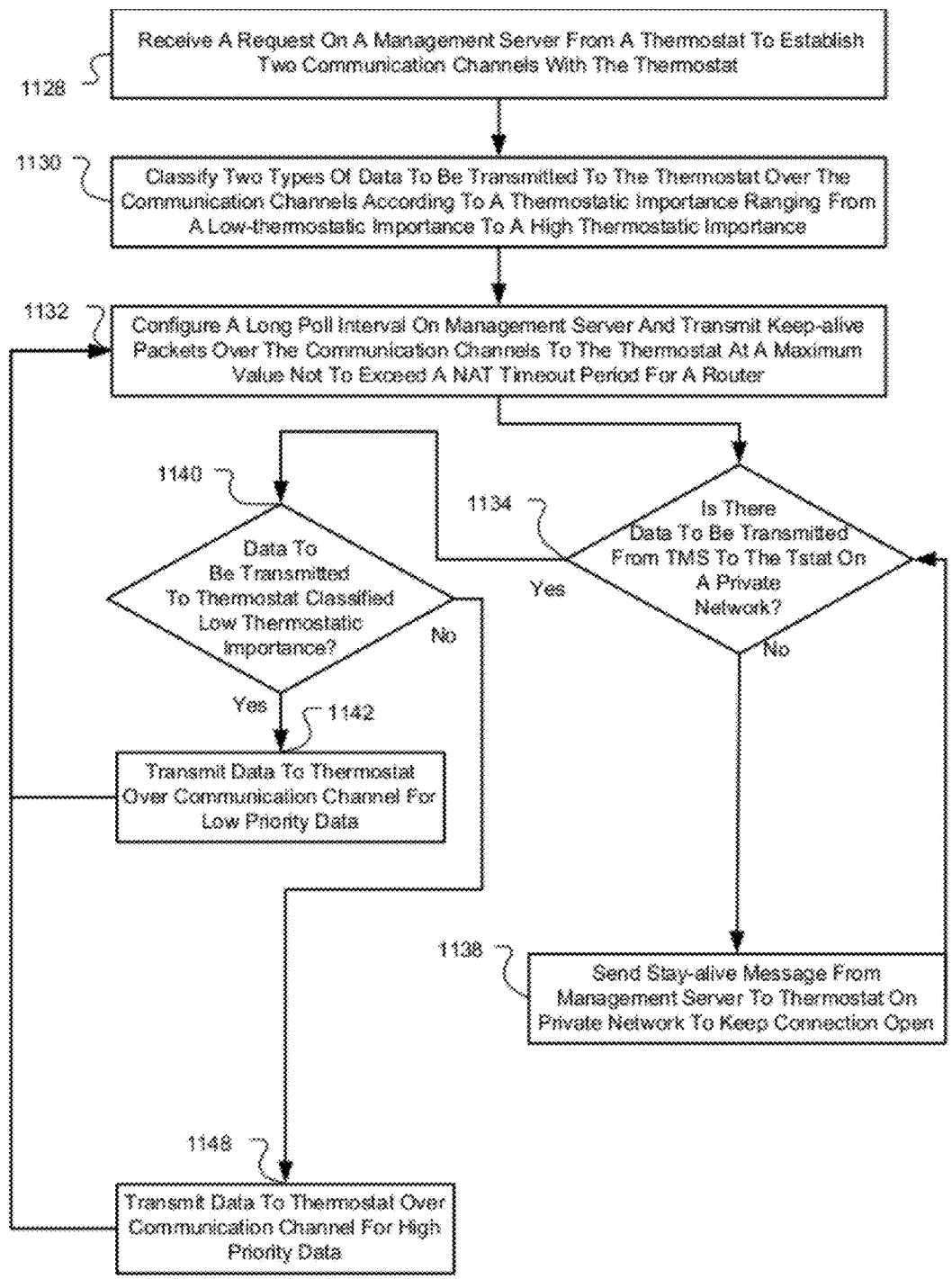
FIG. 11B-11D illustrate diagrams of the operations of a thermostat communication protocol in accordance with some embodiments.
Figure 11C:
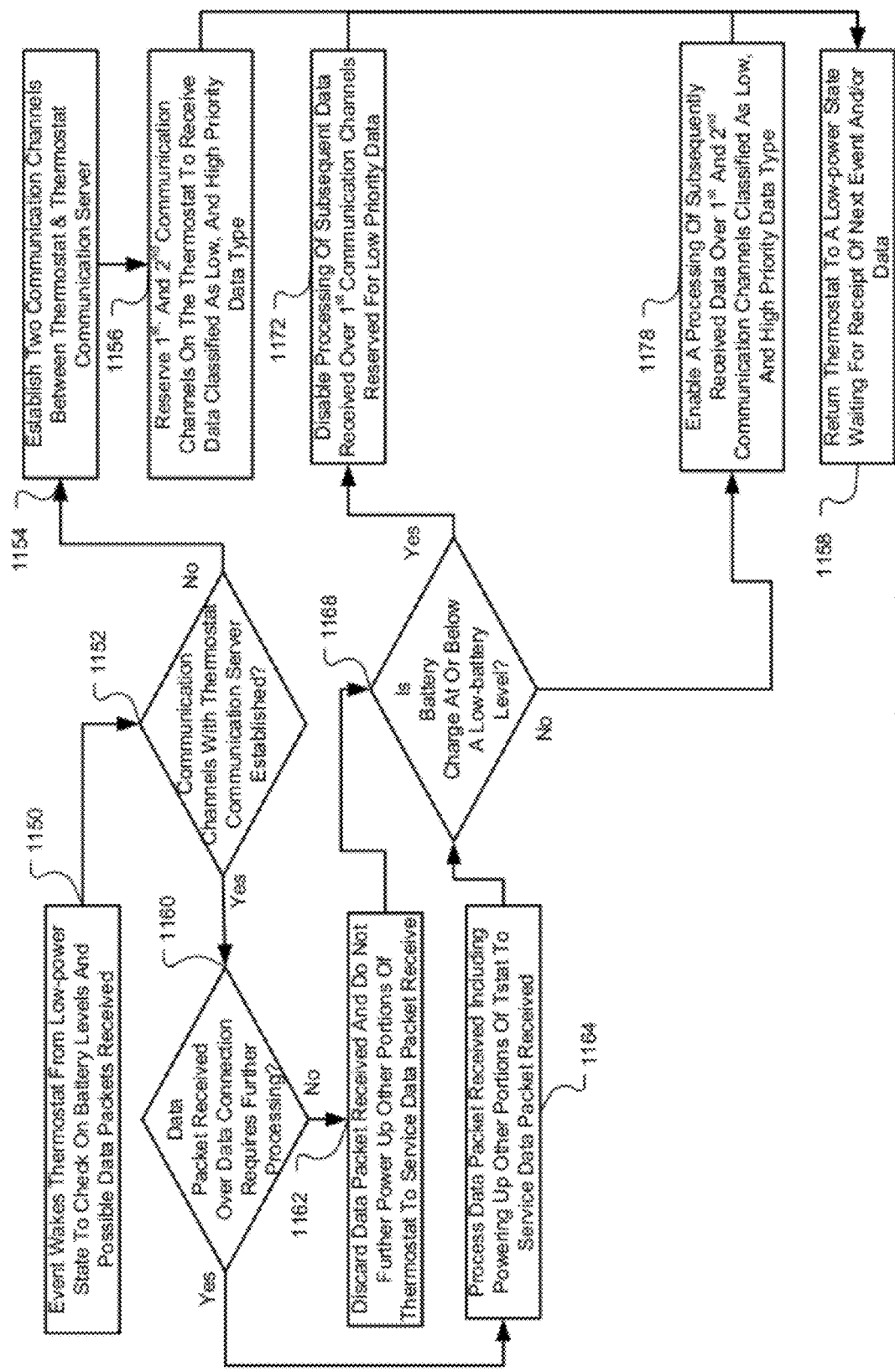

Flowchart diagram in FIGS. 11B-11C concern the operations on cloud-based management server 716 and thermostat 112 in accordance with embodiments of the present invention as illustrated in FIG. 3A and FIG. 11A. In one embodiment, flowchart diagram in FIG. 11B provides the operations used by a thermostat communication server to communicate over a plurality of communication channels with a battery powered thermostat. In this embodiment, thermostat communication server, such as cloud-based management server 716 in FIG. 11A, receives a request from a thermostat powered by a battery to establish a plurality of communication channel between the thermostat and the thermostat communication server over a network. (1128) When the thermostat initiates the communication channel, a router places a plurality of entries in a NAT table, such as NAT table 718 in FIG. 7, providing multiple communication channels for the thermostat to communicate with the thermostat communication server on the Internet, a public network. As previously described, these entries in the NAT table will not be removed and the communication channel will remain open as long as any gap in communication from the thermostat communication server and the thermostat does not exceed a NAT time-out value associated with the router.

Next, thermostat communication server classifies one or more types of data to be transmitted to the thermostat over the communication channel according to a data priority ranging from a low-priority data type to a high-priority data type. (1130) In one implementation, the low-priority data type includes data of lesser importance to the operation of the overall thermostat management system and thermostat. These may include optional functions to be performed on the thermostat such as software update or other maintenance. Conversely, the high-priority data type includes data of higher importance to the operation of the thermostat management system and the thermostat and generally includes requests to actively perform an action on the thermostat such as changing a setpoint, turning-on/off heating or cooling or checking ambient temperature in a residence or commercial location where the thermostat is located.

To keep the communication channel open, thermostat communication server may configure a long-poll interval for transmitting keep-alive packets over the plurality of communication channels to the thermostat. (1132) In some embodiments, the thermostat communication server sets the long-poll interval to a maximum value not to exceed a NAT timeout period used by most routers, which is often approximately 100 minutes.

If no data passes between thermostat communication server and the thermostat (1134—No), a timer, initially set to the long-poll interval, decreases over time within the communication protocol stack and the process continues. Eventually, if the long-poll interval runs out of time and the communication protocol stack on the thermostat communication server, such as TCP/IP, did not detect communication activity, the built-in keep-alive feature sends packets to keep the NAT entries on the router and the communication channels open. (1138) In some embodiments, the thermostat communication server may request the thermostat to terminate and reestablish the communication channel when the timer associated with the long-poll interval expires to help make sure the communication channel is available and operating properly.

Alternatively if there is data to be sent, the thermostat communication server checks the priority of the data and sends over the proper communication channel. Accordingly in one embodiment, if the data is classified as low-priority (1140—Yes), thermostat communication server sends the data over a communication channel reserved for low-priority data transmissions. (1142) Alternatively, if the data is classified as high-priority and not low-priority (1140—No), thermostat communication server sends the data over a communication channel reserved for high-priority data transmissions. (1148) In this embodiment, thermostat communication server segregates the data on different communication channels but allows the thermostat to determine whether to process or discard the data as it easy easier for the thermostat to obtain battery-level data and make a decisions. Generally, a determination may be made by the network-communication module (in this embodiment, the Wi-Fi module 312) that the a transmission is classified as a low-priority transmission at least in part because an indication that the power level of the power supply was below a threshold power level was sent to the server. In response, the transmission may be processed by the network-communication module while the processing function, or circuit, remains in the low-power mode.

FIG. 11C is a flowchart diagram of the complimentary operations performed on a thermostat to conserve battery energy yet process data at a high level of performance. In this embodiment, a thermostat, such as thermostat 112 in FIG. 11A, may wake from a low power state to check on battery-levels or possible data packets received over one or several communication channels. (1150) For example, a thermostat may wake from a low power state once every 100 ms to respond to a wireless strobe from an access point 324 and may also check on a battery-level. It is also possible that a wake-on-LAN event wakes the thermostat causing it to leave the low power state and process a data packet received over one or several communication channels reserved for different priority levels of data.

In some embodiments, the thermostat may determine that the communication channels with thermostat communication server, such as with thermostat communication server 820, have not been established. (1152—No) Accordingly, one embodiment of the present invention may request and establish two communication channels between the thermostat communication server and the thermostat. (1154) In accordance with some embodiments, the thermostat reserves the first and second communication channels on the thermostat to receive data classified as low and high-priority data types. The thermostat initially configures its Wi-Fi module, such as Wi-Fi module 312 in FIG. 3A, to receive low and high-priority data packets from each of the several communication channels using a built-in wake-on-LAN feature. (1156) To reduce power consumption, the thermostat may then return to a low power state waiting for the next event or receipt of data. (1158)

Alternatively, if the communication channels are established, (1152—Yes), the thermostat determines if a data packet has been received and requires further processing. (1160) In some embodiments, the Wi-Fi module on the thermostat may inspect the data packet header or payload and determine that the data packet needs no further processing and can be discarded. (1160—No) For example, the data packet may be discarded if it is a keep-alive packet meant to preserve the NAT table entries in the router or if the packet otherwise has no payload data associated with it. If the packet is discarded, the thermostat may conserve overall power consumed because other components in the thermostat, such as head unit processor 314 or backplate processor 316, can remain in a low power state. (1162)

If the packet does require further processing, (1160—Yes) then the thermostat may activate or power-up other portions of the thermostat to service the data packet received. (1164) In some embodiments, thermostat may activate head unit processor 314 to perform a change of a setpoint or other feature on the thermostat or may activate back plate processor 316 to gather sensor information as requested from thermostat communication server 820.

Once a packet has been processed or discarded, embodiments of the present invention check the current battery-level of the thermostat and adjust the communication channels to either accept or discard subsequent data packets. If the thermostat determines the battery charge is at or below a low battery-level, (1168—Yes) the Wi-Fi module is configured to discard subsequent data received over a first communication channel reserved to received low priority data. (1172) As previously described, some embodiments discard packets over a communication channel and port of the Wi-Fi module by turning off a wake-on-LAN feature for the channel. This causes subsequent low priority packets received on the channel to be ignored and discarded. In some implementations, the Wi-Fi module is configured to process packets on the second communication channel using a filter to locate the proper port number and enabling the wake-on-LAN feature for the selected filter. Lastly, if the battery charge is above the low battery-level (1168—No) then embodiments of the present invention enable processing of subsequently received packets over the first and second communication channels. (1178) For example, if the battery-level charge is high then embodiments of the present invention are adjusted to process more data and further improve the thermostat's performance and ability to respond to instructions and requests. After checking the battery-level and adjusting the Wi-Fi module, the thermostat returns to a low power state to conserve energy consumption and await the next event and/or data to be processed. (1158)

In another embodiment, a communication module, such as the Wi-Fi module, may be configured to establish one or more communication channels to a controller server through a gateway. The communication module may further be configured to utilize a communication protocol with the controller server, where the communication protocol includes a time interval that represents a time that the gateway is expected to maintain the one or more communication channels between transmissions. For example, this time may correspond to the time that a router is expected to maintain an address in an NAT table. After establishing the communication channels, the controller may receive a first transmission from the controller server through the communication channels while a processing function, such as the head unit processor 314 and/or the backplate processor 316, operates in a first mode, or a sleep mode. The controller may then determine that the first transmission was sent from the controller server to maintain one of the communication channels, and/or that the first transmission does not require the processing function to operate in the second mode. For example, the first transmission may comprise a header portion of information without a payload that requires processing by the processing functions. In addition to receiving the first transmission, the controller may also receive a second transmission from the controller server through the communication channels, where the second transmission includes information for controlling a property function associated with the controller. In this case, the second transmission may require processing by the processing function, and the controller may cause the processing function to operate in a second mode, or operating mode, after receiving the second transmission in order to process the second transmission.

Figure 11D:
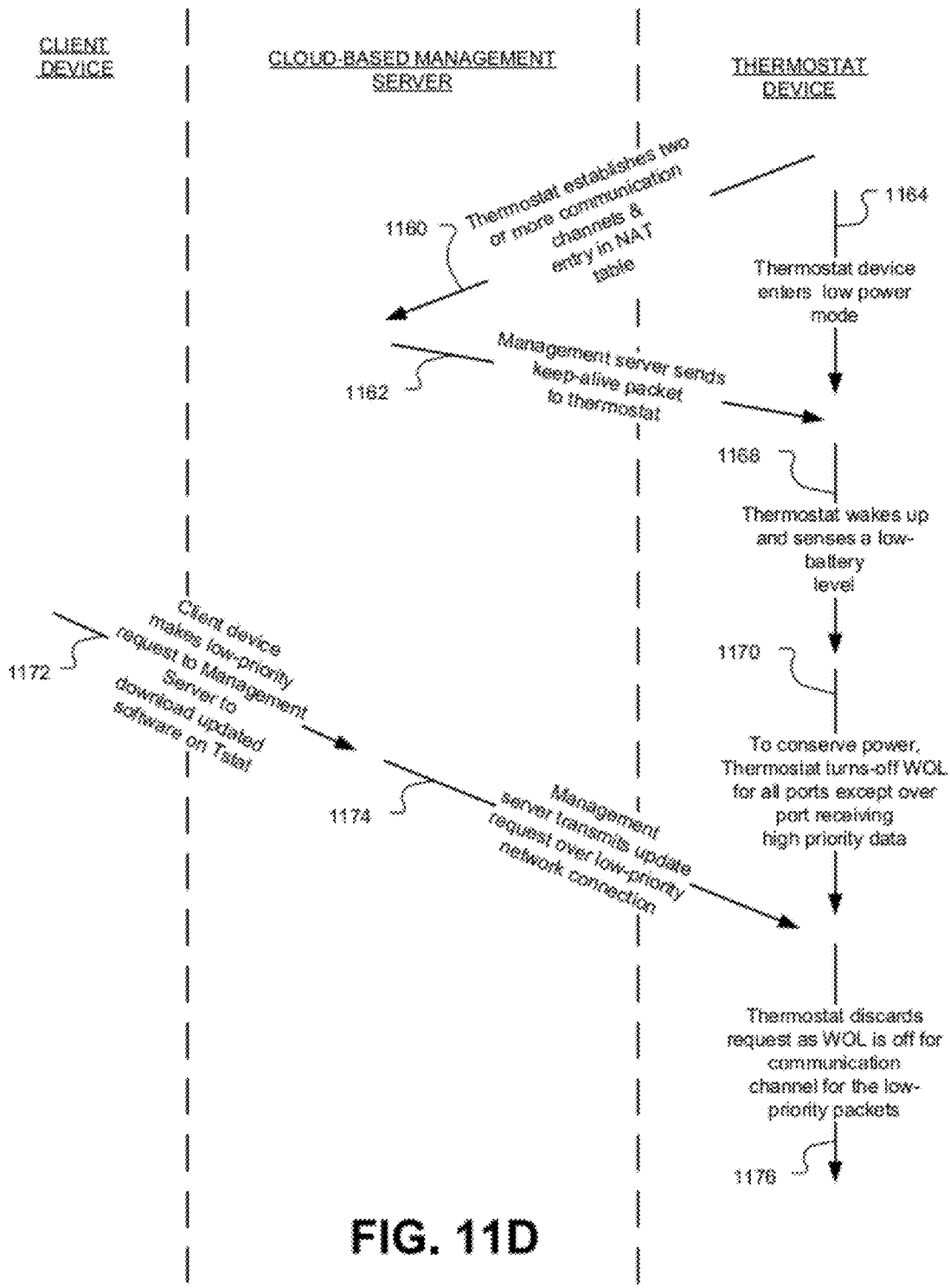

An example data flow chart in FIG. 11D illustrates the flow of data and events using a plurality of communication channels to transmit different priority levels of data. In this example, the thermostat initiates establishment of a plurality of communication channels with thermostat communication server causing a router to creates corresponding entries in a NAT table. (1160) In some embodiments, a first communication channel is reserved for low-priority types of data and a second communication channel is reserved for high-priority types of data. To conserve energy, the thermostat enters a low power mode and waits for the next event. (1164). After a period of time, a long-poll interval expires causing the thermostat communications server to send a keep-alive packet before the NAT table entry is removed. (1162) In one embodiment, the thermostat wakes from the low power mode and sensing a low battery-level and making note of the local condition. In this embodiment, the thermostat does not forward to the thermostat communication server since it is up to the thermostat to determine whether to process the received data packets. Instead, thermostat turns off a wake-on-LAN (WOL) feature for all ports except the port receiving high-priority types of data. (1170) For example, subsequently received packets received on the first communication channel may be discarded since the low-priority data is reserved for the first communication channel. At some later point in time, a client device, such as tablet 706 running thermostat access client 714 in FIG. 7, requests that thermostat communication server downloads a software update to the thermostat. (1172) Thermostat communication server classifies request as a low-priority data type and transmits over the first communication channel regardless of the battery-level on the thermostat. (1174) In some embodiments, thermostat communication server segregates different priority data types on different communication channels and lets the thermostat decide whether to discard or process the packets received. Eventually, the thermostat receives the software update request but discards the packets as the battery-level is low and the first communication channel is configured to ignore the low-priority data packets that it may receive. (1176).

Figure 12A:
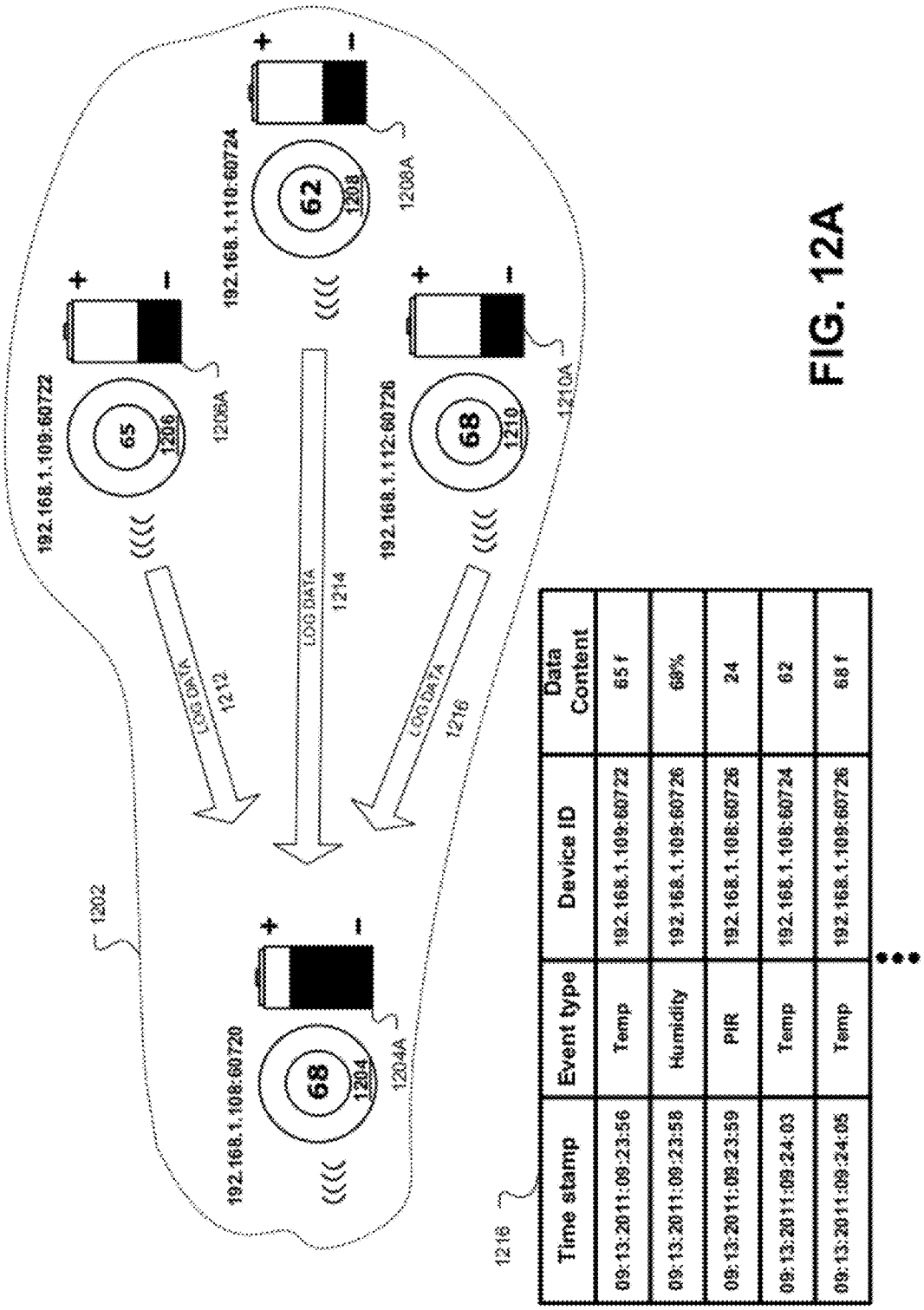
FIG. 12A illustrates a block diagram of a thermostat reporting group.
Figure 12B:
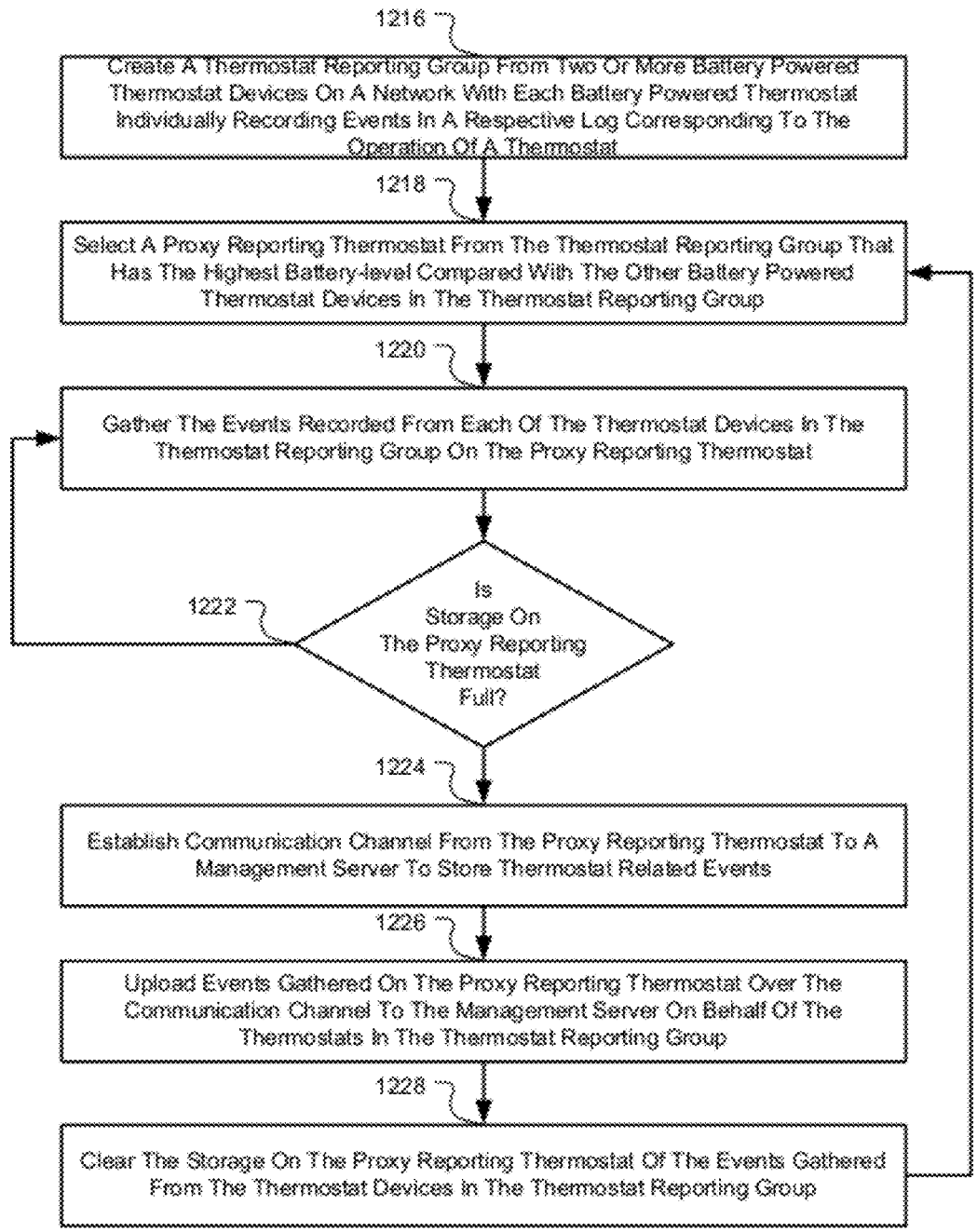
FIG. 12B illustrates a flowchart of a thermostat reporting group.

FIGS. 12A-12B provide a schematic block diagram and flowchart for creating a thermostat reporting group with multiple thermostats and gathering reporting events in a common event log. In FIG. 12A, a thermostat reporting group 1202 is formed from several thermostats in a network including thermostat 1204, thermostat 1206, thermostat 1208 and thermostat 1210 whereupon each thermostat has a current battery-level as represented by battery images 1204A, battery image 1206A, battery image 1208A and battery image 1210A respectively. To conserve energy, a proxy reporting thermostat is selected from the thermostat reporting group to receive the event log information from other members of the group and then upload over a network to a central server. In this example, thermostat 1204 is selected as the proxy reporting thermostat since the corresponding battery-level indicated by battery image 1204A is the highest within the thermostat reporting group.

Once selected, thermostat 1204 gathers log data over the network from other thermostats 1206, 1208 and 1210 through local transfers 1212, 1214, and 1216 respectively. These local transfers include the log data from each thermostat combined into a common log 1216 identifying a time stamp, event type, device ID and data content for each entry. After a period of time or when memory (not shown) in thermostat 1204 fills up, the common log 1216 is uploaded over a communication channel to a central server such as the cloud-based management server 716. This approach allows event log information to be gathered using fewer uploads than would be required if each thermostat was required to upload individually. It also allows thermostats having a low battery-level to preserve their battery charge while still allowing such data to be collected and analyzed on a server such as cloud-based management server 716 in FIG. 7.

FIG. 12B is a flowchart diagram of the operations associated with gathering reporting events on a proxy reporting thermostat and common event log in accordance with embodiments of the present invention. In one embodiment, a thermostat reporting group is created from a plurality of battery powered thermostats on a network. (1216). Each battery powered thermostat individually records events in a respective event log corresponding to the one or more operations and events occurring on a thermostat. In some cases, the events may include sensor information provided from humidity sensors, temperature sensors, passive infra-red sensors, ambient light sensors, active proximity sensors or other sensors incorporated into each thermostat. Event logs may also include information describing current or changed settings on a thermostat and the time stamp associated with when these settings were changed.

As previously described, embodiments of the present invention select a proxy reporting thermostat to represent the other thermostats. (1218). In some embodiments, the proxy reporting thermostat is selected based on having the highest battery-level compared with the other battery powered thermostats in the thermostat reporting group. For example, thermostat 1204 in FIG. 12A has the highest charged battery in the group and is thus selected as the proxy reporting thermostat.

Over time, the proxy reporting thermostat gathers events recorded from each of the thermostats in the thermostat reporting group. (1220) Proxy reporting thermostat may collect these events from each thermostat in the thermostat reporting group using a wireless ad-hoc connection or a wireless connection made available through a network access point or router. The proxy reporting thermostat generally continues to collect the data from the other thermostats until storage on the proxy reporting thermostat is full or has reached a maximum allocation for such logs. (1222) For example, a thermostat may have allocated 500 megabytes for storing the log information from multiple thermostats before triggering the upload process.

If the storage on the proxy reporting thermostat is full, one embodiment of the proxy reporting thermostat establishes a communication channel to a thermostat management system to store the thermostat events. (1224) For example, this may be connection over the Internet between the thermostat on a private network and the thermostat management system. Next, one embodiment uploads events gathered on the proxy reporting thermostat over the communication channel to the thermostat management system on behalf of the thermostats in the thermostat reporting group. (1226) Once the data in the common event log has been successfully uploaded, embodiments of the present invention clear the storage area on the proxy reporting thermostat of the events gathered from the thermostat reporting group. (1228). This makes way for storage of more events in the event log on the proxy reporting thermostat.

Figure 13:
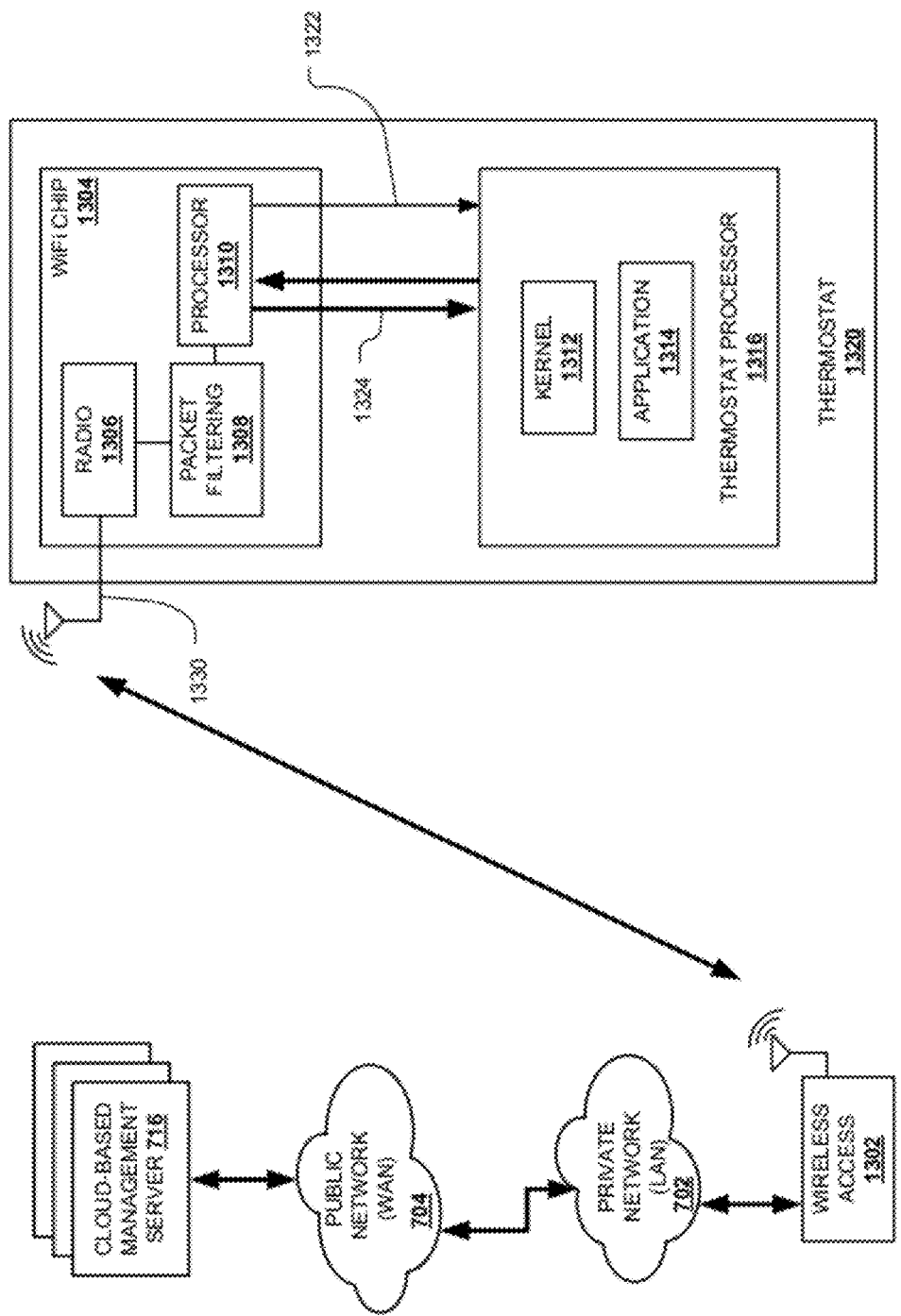
FIG. 13 illustrates a network communication module selectively filtering messages sent from a server, according to one embodiment.

In one embodiment, illustrated in FIG. 13, a network communication module may selectively filter messages sent from a server. In this embodiment, a cloud-based management server 716 may send messages through a public network 704. The messages may then be sent from the public network 704 to a private network 702 that communicates with a property controller, such as a thermostat. In some embodiments, the property controller may communicate with the private network 702 via a wireless access device 1302, such as a wireless router, an Internet hotspot, an ad hoc broadcast network, and/or the like.

According to one embodiment, the wireless access device 1302 may comprise a router. Many routers used in residential locations include a NAT table that translates public network addresses into private network addresses as described previously herein. Recall that the NAT may be flushed periodically by the router after a specified period of nonuse. In one embodiment, keep alive messages may be sent from the cloud-based management server 716 to the property controller in order to keep an entry in the NAT operation that is associated with the property controller.

According to one embodiment, the property controller may be a thermostat 1320. The thermostat 1320 may include, among other things, a Wi-Fi chip 1304 and a thermostat processor 1316. The thermostat processor 1316 may operate in at least two different modes. A first mode may be a low-power mode, or a sleep mode, where some of the functions of the thermostat processor 1316 are not fully operational in order to save power. A second mode may be a high-power mode, or operational mode, where some of the functions that were not fully operational in the low-power mode are operational to a greater extent. In one embodiment, a kernel 1312 (or other sub-components or sub-routines having equivalent background significance) may run while in the low-power mode, while an application 1314 may run while in the high-power mode. In one embodiment, when the thermostat processor 1316 is operating in the low-power mode, an interrupt 1322 may be received on a designated input of the thermostat processor 1316 to cause the thermostat processor 1316 to transition from the low-power mode to the high-power mode. In at least one embodiment, the thermostat processor 1316 may be implemented by the head unit processor 304 of FIG. 3A. In another embodiment, the thermostat processor 1316 may be implemented by the backplate processor 316 of FIG. 3A, or by a combination of the head unit processor 314 and the backplate processor 316.

In one embodiment, the Wi-Fi chip 1304 may include, among other things, a radio 1306, a packet filtering function 1308, and a processor 1310. In one embodiment, the packet filtering function 1308 is operated on separate circuitry from the processor 1310, while in another embodiment the packet filtering function 1308 is implemented using the processor 1310. The processor 1310, like the thermostat processor 1316, may operate in at least a high-power mode and a low-power mode, possibly a sleep state and an operating state. In order to save power, the Wi-Fi chip 1304 may operate in a low-power state until messages are received from the wireless access device 1302.

In one embodiment, when the radio 1306 receives a message, it may pass the message to the packet filtering function 1308 prior to waking up the processor 1310. The packet filtering function 1308 may examine one or more fields within the message to determine whether the processor 1310 should wake up. In some cases, the radio 1306 may receive any messages that are electronically receivable by an antenna 1330 communicatively coupled to the radio 1306. The data filtering function 1308 may check the address of the messages to determine whether or not they are intended for the thermostat 1320. Messages that are not for the thermostat 1320 may be discarded without waking the processor 1310. Messages that are properly addressed to the thermostat 1320 may require further processing.

In one embodiment, some of the messages properly addressed to the thermostat 1320 may also be discarded in a similar fashion to messages that were not properly addressed to the thermostat 1320. For example, keep-alive messages sent from the cloud-based management server 716 that are merely intended to maintain an entry in the NAT of the wireless access device 1302 may be discarded without requiring additional processing. A keep-alive message will generally be addressed to the thermostat 1320; however, the packet filtering function 1308 may examine additional fields in addition to the address fields of the message in order to determine whether the message is a keep-alive message. In one embodiment, a single bit may represent a flag signifying a keep-alive message. If the packet filtering function 1308 determines that a message is not a keep-alive message and is properly addressed, the packet filtering function 1308 may wake up the processor 1310 for further processing. In one embodiment, the packet filtering function 1308 may be implemented using a simple mask that is compared bit by bit to one or more fields in a received message.

In one embodiment, the processor 1310 may examine one or more fields within the message to determine whether it should wake up the thermostat processor 1316. In some cases, this may mean causing the thermostat processor to transition from the low-power state to the high-power state by sending an interrupt 1322. The processor 1310 may also communicate with the thermostat processor 1316 via data communication lines 1324. The data communication lines 1324 may be implemented using any data communication protocol, such as SDIO, USB, I²C, RS-232, and/or the like. In one embodiment, the processor 1310 may determine whether the message contains information of high thermostatic importance or information critical to the operation of the thermostat 1320. Messages of high thermostatic importance may be passed to the thermostat processor 1320, while messages of low thermostatic importance may be discarded and/or saved until the thermostat processor 1316 is awakened for other reasons.

In addition to discarding keep-alive messages, the packet filtering function 1308 may additionally filter messages based on the port number. For example, a plurality of communication channel may be established, and the packet filtering function 1308 may discard messages based on the communication channel by which they were received. In another embodiment, the packet filtering function 1308 may pass these messages to the processor 1310, which may then determine whether to discard the message based on the communication channel by which it was received. In light of this disclosure it will be understood that combinations of these methods for preserving power in the thermostat 1320 by selectively processing messages received from the wireless access device 1302 may be used depending on the particular application. For example, keep alive messages may be filtered, along with messages based on thermostatic importance and/or messages based on port number.

Figure 14:
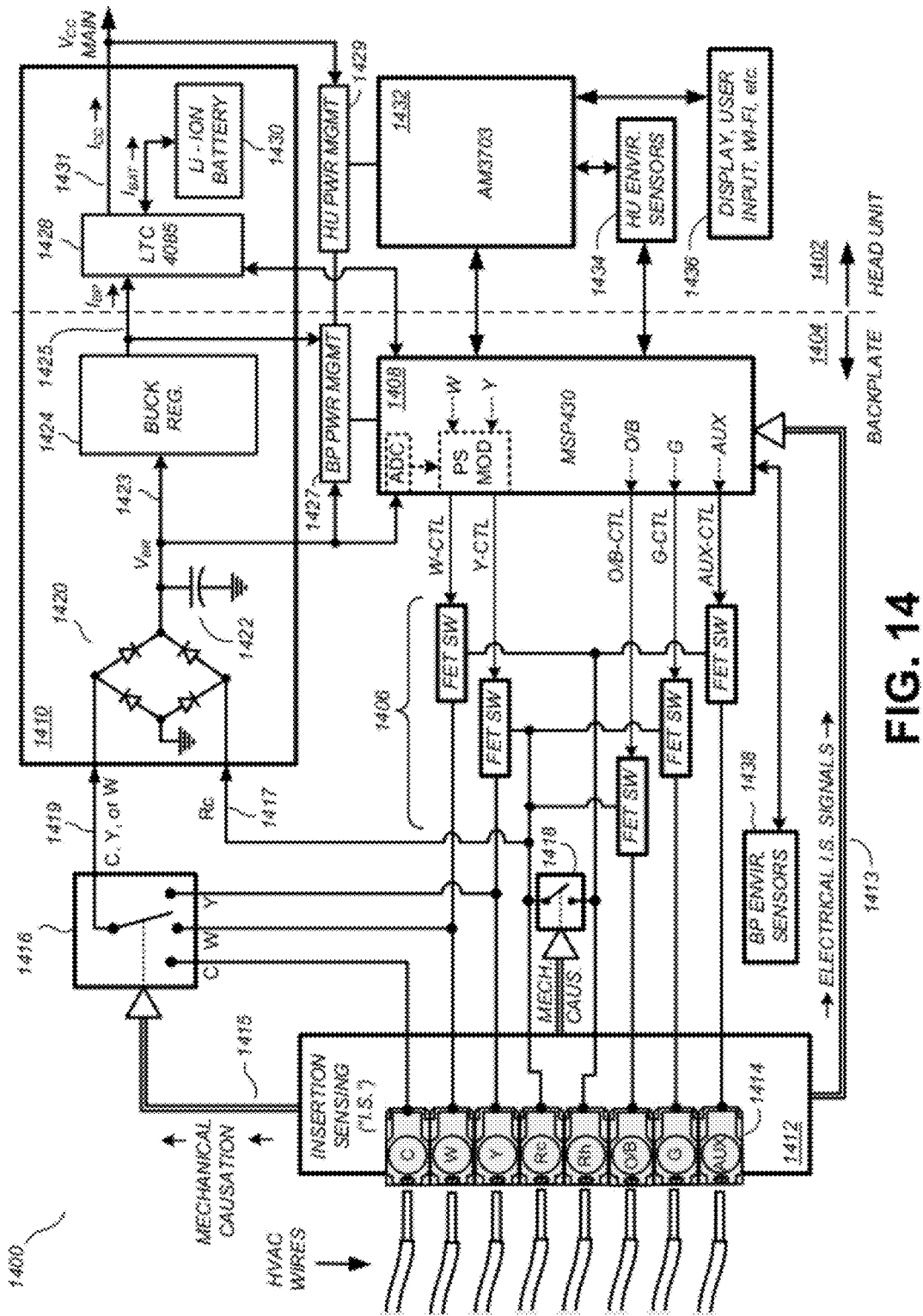
FIG. 14 illustrates a thermostat according to an embodiment.

FIG. 14 illustrates a thermostat 1400 according to a preferred embodiment, the thermostat 1400 comprising selected feature combinations that have been found to be particularly advantageous for the facilitation of do-it-yourself thermostat installation, the accommodation of a variety of different practical installation scenarios (including scenarios where a "C" power wire is not available), the provisioning of relatively power-intensive advanced interfaces and functionalities (e.g., a large visually pleasing electronic display, a relatively powerful general purpose microprocessor, and a reliable Wi-Fi communications chip) even where a "C" power wire is not available, the facilitation of operational robustness and durability, compact device size, quietness of operation, and other advantageous characteristics described in the instant disclosure and/or the commonly assigned incorporated applications. In the discussion that follows, the following HVAC wiring shorthand notations are used: W (heat call relay wire); Y (cooling call relay wire); Rh (heat call relay power); Rc (cooling call relay power); G (fan call relay wire); O/B (heat pump call relay wire); AUX (auxiliary call relay wire); and C (common wire).

The Rh wire, which leads to one side of the HVAC power transformer (or simply "HVAC transformer") that is associated with a heating call relay, can go by different names in the art, which can include heating call switch power wire, heat call power return wire, heat return wire, return wire for heating, or return for heating. The Rc wire, which leads to one side of the HVAC transformer that is associated with a cooling call relay, can likewise go by different names including cooling call switch power wire, cooling call power return wire, cooling return wire, return wire for cooling, or return for cooling. In the case of single-HVAC-transformer systems having both heating and cooling functions, it is one and the same HVAC power transformer that is associated with both the heating call relay and cooling call relay, and in such cases there is just a single wire, usually labeled "R", leading back to one side of that HVAC transformer, which likewise can go by different names in the art including call switch power wire, call relay power wire, call power return wire, power return wire, or simply return wire.

As illustrated generally in FIG. 14, the thermostat 1400 comprises a head unit 1402 and a backplate 1404. The backplate 1404 comprises a plurality of FET switches 1406 used for carrying out the essential thermostat operations of connecting or "shorting" one or more selected pairs of HVAC wires together according to the desired HVAC operation. The details of FET switches 1406, each of which comprises a dual back-to-back FET configuration, can be found elsewhere in the instant disclosure and/or in the commonly assigned U.S. Ser. No. 13/034,674, supra. The operation of each of the FET switches 1406 is controlled by a backplate microcontroller 1408 which can comprise, for example, an MSP430 16-bit ultra-low power RISC mixed-signal microprocessor available from Texas Instruments.

Thermostat 1400 further comprises powering circuitry 1410 that comprises components contained on both the backplate 1404 and head unit 1402. Generally speaking, it is the purpose of powering circuitry 1410 to extract electrical operating power from the HVAC wires and convert that power into a usable form for the many electrically-driven components of the thermostat 1400. Thermostat 1400 further comprises insertion sensing components 1412 configured to provide automated mechanical and electrical sensing regarding the HVAC wires that are inserted into the thermostat 1400. Thermostat 1400 further comprises a relatively high-power head unit microprocessor 1432, such as an AM3703 Sitara ARM microprocessor available from Texas Instruments, that provides the main general governance of the operation of the thermostat 1400. Thermostat 1400 further comprises head unit/backplate environmental sensors 1434/1438 (e.g., temperature sensors, humidity sensors, active IR motion sensors, passive IR motion sensors, ambient visible light sensors, accelerometers, ambient sound sensors, ultrasonic/infrasonic sound sensors, etc.), as well as other components 1436 (e.g., electronic display devices and circuitry, user interface devices and circuitry, wired communications circuitry, wireless communications circuitry such as Wi-Fi and/or ZigBee chips) that are operatively coupled to the head unit microprocessor 1432 and/or backplate microprocessor 1408 and collectively configured to provide the functionalities described in the instant disclosure and/or the commonly assigned incorporated applications.

The insertion sensing components 1412 include a plurality of HVAC wiring connectors 1414, each containing an internal springable mechanical assembly that, responsive to the mechanical insertion of a physical wire thereinto, will mechanically cause an opening or closing of one or more dedicated electrical switches associated therewith. Exemplary configurations for each of the HVAC wiring connectors 1414 can be found in the commonly assigned U.S. 13/034,666, supra. With respect to the HVAC wiring connectors 1414 that are dedicated to the C, W, Y, Rc, and Rh terminals, those dedicated electrical switches are, in turn, networked together in a manner that yields the results that are illustrated in FIG. 14 by the blocks 1416 and 1418. For clarity of presentation in FIG. 14, the block 1416 is shown as being coupled to the internal sensing components 1412 by virtue of double lines termed "mechanical causation," for the purpose of denoting that the output of block 1416 is dictated solely by virtue of the particular combination of HVAC wiring connectors 1414 into which wires have been mechanically inserted. More specifically, the output of block 1416, which is provided at a node 1419, is dictated solely by virtue of the particular combination of C, W, and Y connectors into which wires have been mechanically inserted. Still more specifically, the output of block 1416 at node 1419 is provided in accordance with the following rules: if a wire is inserted into the C connector, then the node 1419 becomes the C node regardless of whether there are any wires inserted into the Y or W connectors; if no wire is inserted into the C connector and a wire is inserted into the Y connector, then the node 1419 becomes the Y node regardless of whether there is a wire inserted into the W connector; and if no wire is inserted into either of the C or Y connectors, then the node 1419 becomes the W node. Exemplary configurations for achieving the functionality of block 1416 (as combined with components 1412 and wiring connectors 1414) can be found elsewhere in the instant disclosure and/or in the commonly assigned U.S. Ser. No. 13/034,678, supra. It is to be appreciated that, although mechanical causation for achieving the functionality of block 1416 (as combined with components 1412 and wiring connectors 1414) has been found to be particularly advantageous for simplicity and do-it-yourself ("DIY") foolproofing, in other embodiments there can be similar functionalities carried out electrically, magnetically, optically, electro-optically, electro-mechanically, etc. without departing from the scope of the present teachings. Thus, for example, similar results could be obtained by using optically, electrically, and/or magnetically triggered wire insertion sensing components that are coupled to relays or electronic switches that carry out the functionality of block 1416 (as combined with components 1412 and wiring connectors 1414) without departing from the scope of the present teachings.

Likewise, for clarity of presentation in FIG. 14, the block 1418 is also shown as being coupled to the internal sensing components 1412 by virtue of double lines termed "mechanical causation," for the purpose of denoting that its operation, which is either to short the Rc and Rh nodes together or not to short the Rc and Rh nodes together, is dictated solely by virtue of the particular combination of HVAC wiring connectors 1414 into which wires have been mechanically inserted. More specifically, whether the block 1418 will short, or not short, the Rc and Rh nodes together is dictated solely by virtue of the particular combination of Rc and Rh connectors into which wires have been mechanically inserted. Still more specifically, the block 1418 will keep the Rc and Rh nodes shorted together, unless wires have been inserted into both the Rc and Rh connectors, in which case the block 1418 will not short the Rc and Rh nodes together because a two-HVAC-transformer system is present. Exemplary configurations for achieving the functionality of block 1418 (as combined with components 1412 and wiring connectors 1414) can be found elsewhere in the instant disclosure and/or in the commonly assigned U.S. Ser. No. 13/034,674, supra. It is to be appreciated that, although mechanical causation for achieving the functionality of block 1418 (as combined with components 1412 and wiring connectors 1414) has been found to be particularly advantageous for simplicity and do-it-yourself ("DIY") foolproofing, in other embodiments there can be similar functionalities carried out electrically, magnetically, optically, electro-optically, electro-mechanically, etc., in different combinations, without departing from the scope of the present teachings. Thus, for example, similar results could be obtained by using optically, electrically, and/or magnetically triggered wire insertion sensing components that are coupled to relays or electronic switches that carry out the functionality of block 1418 (as combined with components 1412 and wiring connectors 1414) without departing from the scope of the present teachings.

As illustrated in FIG. 14, the insertion sensing circuitry 1412 is also configured to provide electrical insertion sensing signals 1413 to other components of the thermostat 1400, such as the backplate microcontroller 1408. Preferably, for each of the respective HVAC wiring terminal 1414, there is provided at least two signals in electrical form to the microcontroller 1408, the first being a simple "open" or "short" signal that corresponds to the mechanical insertion of a wire, and the second being a voltage or other level signal (in analog form or, optionally, in digitized form) that represents a sensed electrical signal at that terminal (as measured, for example, between that terminal and an internal thermostat ground node). Exemplary configurations for providing the sensed voltage signal can be found elsewhere in the instant disclosure and/or in the commonly assigned U.S. Ser. No. 13/034, 674, supra. The first and second electrical signals for each of the respective wiring terminals can advantageously be used as a basis for basic "sanity checking" to help detect and avoid erroneous wiring conditions. For example, if there has been a wire inserted into the "C" connector, then there should be a corresponding voltage level signal sensed at the "C" terminal, and if that corresponding voltage level signal is not present or is too low, then an error condition is indicated because there should always be a voltage coming from one side of the HVAC power transformer (assuming that HVAC system power is on, of course). As another example, if there has been a wire inserted into the "O/B" connector (heat pump call relay wire) but no wire has been inserted into the "Y" connector (cooling call relay wire), then an error condition is indicated because both of these wires are needed for proper heat pump control. Exemplary ways for conveying proper and/or improper wiring status information to the user can be found elsewhere in the instant disclosure and/or in the commonly assigned U.S. Ser. No. 13/269,501, supra.

Basic operation of each of the FET switches 1406 is achieved by virtue of a respective control signal (OFF or ON) provided by the backplate microcontroller 1408 that causes the corresponding FET switch 1406 to "connect" or "short" its respective HVAC lead inputs for an ON control signal, and that causes the corresponding FET switch 1406 to "disconnect" or "leave open" or "open up" its respective HVAC lead inputs for an OFF control signal. For example, the W—Rh FET switch keeps the W and Rh leads disconnected from each other unless there is an active heating call, in which case the W—Rh FET switch shorts the W and Rh leads together. As a further example, the Y-Rc FET switch keeps the Y and Rc leads disconnected from each other unless there is an active cooling call, in which case the Y-Rc FET switch shorts the Y and Rc leads together. (There is one exception to this basic operation for the particular case of "active power stealing" that is discussed in more detail infra, in which case the FET switch corresponding to the HVAC lead from which power is being stolen is opened up for very brief intervals during an active call involving that lead. Thus, if power-stealing is being performed using the Y lead, then during an active cooling call the Y-Rc FET switch is opened up for very brief intervals from time to time, these brief intervals being short enough such that the Y HVAC relay does not un-trip.)

Advantageously, by virtue of the above-described operation of block 1418, it is automatically the case that for single-transformer systems having only an "R" wire (rather than separate Rc and Rh wires as would be present for two-transformer systems), that "R" wire can be inserted into either of the Rc or Rh terminals, and the Rh—Rc nodes will be automatically shorted to form a single "R" node, as needed for proper operation. In contrast, for dual-transformer systems, the insertion of two separate wires into the respective Rc and Rh terminals will cause the Rh—Rc nodes to remain disconnected to maintain two separate Rc and Rh nodes, as needed for proper operation. The G-Rc FET switch keeps the G and Rc leads disconnected from each other unless there is an active fan call, in which case the G-Rc FET switch shorts the G and Rc leads together (and, advantageously, the proper connection will be achieved regardless of whether the there is a single HVAC transformer or dual HVAC transformers because the Rc and Rh terminals will be automatically shorted or isolated accordingly). The AUX-Rh FET switch keeps the AUX and Rh leads disconnected from each other unless there is an active AUX call, in which case the AUX-Rh FET switch shorts the AUX and Rh leads together (and, advantageously, the proper connection will be achieved regardless of whether the there is a single HVAC transformer or dual HVAC transformers because the Rc and Rh terminals will be automatically shorted or isolated accordingly). For heat pump calls, the O/B-Rc FET switch and Y-Rc FET switch are jointly operated according to the required installation-dependent convention for forward or reverse operation (for cooling or heating, respectively), which convention can advantageously be determined automatically (or semi-automatically using feedback from the user) by the thermostat 1400 as described further in the commonly assigned PCT/US12/30084, supra.

Referring now to the powering circuitry 1410 in FIG. 14, advantageously provided is a configuration that automatically adapts to the powering situation presented to the thermostat 1400 at the time of installation and thereafter in a manner that has been found to provide a good combination of robustness, adaptability, and foolproofness. The powering circuitry 1410 comprises a full-wave bridge rectifier 1420, a storage and waveform-smoothing bridge output capacitor 1422 (which can be, for example, on the order of 30 microfarads), a buck regulator circuit 1424, a power-and-battery (PAB) regulation circuit 1428, and a rechargeable lithium-ion battery 1430. In conjunction with other control circuitry including backplate power management circuitry 1427, head unit power management circuitry 1429, and the microcontroller 1408, the powering circuitry 1410 is configured and adapted to have the characteristics and functionality described hereinbelow. Description of further details of the powering circuitry 1410 and associated components can be found elsewhere in the instant disclosure and/or in the commonly assigned U.S. Ser. No. 13/034,678, supra, and U.S. Ser. No. 13/267,871, supra.

By virtue of the configuration illustrated in FIG. 14, when there is a "C" wire presented upon installation, the powering circuitry 1410 operates as a relatively high-powered, rechargeable-battery-assisted AC-to-DC converting power supply. When there is not a "C" wire presented, the powering circuitry 1410 operates as a power-stealing, rechargeable-battery-assisted AC-to-DC converting power supply. As illustrated in FIG. 14, the powering circuitry 1410 generally serves to provide the voltage Vcc MAIN that is used by the various electrical components of the thermostat 1400, and that in one embodiment will usually be about 4.0 volts. As used herein, "thermostat electrical power load" refers to the power that is being consumed by the various electrical components of the thermostat 1400. Thus, the general purpose of powering circuitry 1410 is to judiciously convert the 24 VAC presented between the input leads 1419 and 1417 to a steady 4.0 VDC output at the Vcc MAIN node to supply the thermostat electrical power load. Details relating to bootstrap circuitry (not shown), whose purpose is to provide a kind of cruder, less well-regulated, lower-level electrical power that assists in device start-up and that can act as a kind of short term safety net, are omitted from the present discussion for purposes of clarity of description, although further information on such circuitry can be found in U.S. U.S. Ser. No. 13/034,678, supra.

Operation of the powering circuitry 1410 for the case in which the "C" wire is present is now described. Although the powering circuitry 1410 may be referenced as a "power-stealing" circuit in the general sense of the term, the mode of operation for the case in which the "C" wire is present does not constitute "power stealing" per se, because there is no power being "stolen" from a wire that leads to an HVAC call relay coil (or to the electronic equivalent of an HVAC call relay coil for some newer HVAC systems). For the case in which the "C" wire is present, there is no need to worry about accidentally tripping (for inactive power stealing) or untripping (for active power stealing) an HVAC call relay, and therefore relatively large amounts of power can be assumed to be available from the input at nodes 1419/1417. When the 24 VAC input voltage between nodes 1419 and 1417 is rectified by the full-wave bridge rectifier 1420, a DC voltage at node 1423 is present across the bridge output capacitor 1422, and this DC voltage is converted by the buck regulator 1424 to a relatively steady voltage, such as 4.45 volts, at node 1425, which provides an input current $I_{BP}$ to the power-and-battery (PAB) regulation circuit 1428.

The microcontroller 1408 controls the operation of the powering circuitry 1410 at least by virtue of control leads leading between the microcontroller 1408 and the PAB regulation circuit 1428, which for one embodiment can include an LTC4085-3 chip available from Linear Technologies Corporation. The LTC4085-3 is a USB power manager and Li-Ion/Polymer battery charger originally designed for portable battery-powered applications. The PAB regulation circuit 1428 provides the ability for the microcontroller 1408 to specify a maximum value $I_{BP}(max)$ for the input current $I_{BP}$. The PAB regulation circuit 1428 is configured to keep the input current at or below $I_{BP}(max)$, while also providing a steady output voltage Vcc, such as 4.0 volts, while also providing an output current Icc that is sufficient to satisfy the thermostat electrical power load, while also tending to the charging of the rechargeable battery 1430 as needed when excess power is available, and while also tending to the proper discharging of the rechargeable battery 1430 as needed when additional power (beyond what can be provided at the maximum input current $I_{BP}(max)$) is needed to satisfy the thermostat electrical power load. If it is assumed for the sake of clarity of explanation that the voltages at the respective input, output, and battery nodes of the PAB regulation circuit 1428 are roughly equal, the functional operation of the PAB regulation circuit 1428 can be summarized by relationship $I_{BP}=Icc+I_{BAT}$, where it is the function of the PAB regulation circuit 1428 to ensure that $I_{BP}$ remains below $I_{BP}(max)$ at all times, while providing the necessary load current Icc at the required output voltage Vcc even for cases in which Icc is greater than $I_{BP}(max)$. The PAB regulation circuit 1428 is configured to achieve this goal by regulating the value of $I_{BAT}$ to charge the rechargeable battery 1430 ($I_{BAT}>0$) when such charge is needed and when Icc is less than $I_{BP}(max)$, and by regulating the value of $I_{BAT}$ to discharge the rechargeable battery 1430 ($I_{BAT}<0$) when Icc is greater than $I_{BP}(max)$.

For one embodiment, for the case in which the "C" wire is present, the value of $I_{BP}(max)$ for the PAB regulation circuit 1428 is set to a relatively high current value, such as 100 mA, by the microcontroller 1408. Assuming a voltage of about 4.45 volts at node 1425, this corresponds to a maximum output power from the buck regulator 1424 of about 445 mW. Advantageously, by virtue of the rechargeable battery-assisted operation described above, the powering circuitry 1410 can provide instantaneous thermostat electrical power load levels higher than 445 mW on an as-needed basis by discharging the rechargeable battery, and then can recharge the rechargeable battery once the instantaneous thermostat electrical power load goes back down. Generally speaking, depending especially on the instantaneous power usage of the large visually pleasing electronic display (when activated by the user coming close or manipulating the user interface), the high-powered microprocessor 1432 (when not in sleep mode), and the Wi-Fi chip (when transmitting), the instantaneous thermostat electrical power load can indeed rise above 445 mW by up to several hundred additional milliwatts. For preferred embodiments in which the rechargeable battery 1430 has a capacity in the several hundreds of milliamp-hours (mAh) at or near the nominal Vcc voltage levels (e.g., 560 mAh at 3.7 volts), supplying this amount of power is generally not problematic, even for extended time periods (even perhaps up to an hour or more), provided only that there are sufficient periods of lower-power usage below 445 mW in which the rechargeable battery 1430 can be recharged. The thermostat 1400 is configured such that this is easily the case, and indeed is designed such that the average power consumption is below a much lower threshold power than this, as discussed further below in the context of "active power stealing."

Operation of the powering circuitry 1410 for the case in which the "C" wire is not present is now described. For such case, in accordance with the above-described operation of insertion sensing components/switches 1412/1416, it will be the Y-lead that is connected to the node 1419 if a "Y" wire has been inserted, and it will otherwise be the W-lead that is connected to the node 1419 if no "Y" wire has been inserted. Stated differently, it will be the Y-lead from which "power is stolen" if a "Y" wire has been inserted, and it will otherwise be the W-lead from which "power is stolen" if no "Y" wire has been inserted. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place.

Operation of the powering circuitry 1410 for "inactive power stealing" is now described. In the description that follows it will be assumed that the "Y" wire has been inserted and therefore that power is to be stolen from the Y-lead, with it being understood that similar counterpart operation based on the "W" lead applies if no "Y" wire has been inserted and power is to be stolen from the W-lead. During inactive power stealing, power is stolen from between the "Y" wire that appears at node 1419 and the Rc lead that appears at node 1417. As discussed previously, the Rc lead will be automatically shorted to the Rh lead (to form a single "R" lead) for a single-HVAC transformer system, while the Rc lead will be automatically segregated from the Rh lead for a dual-HVAC transformer system. In either case, there will be a 24 VAC HVAC transformer voltage present across nodes 1419/1417 when no cooling call is in place (i.e., when the Y-Rc FET switch is open). For one embodiment, the maximum current $I_{BP}$(max) is set to a relatively modest value, such as 20 mA, for the case of inactive power stealing. Assuming a voltage of about 4.45 volts at node 1425, this corresponds to a maximum output power from the buck regulator 1424 of about 90 mW. The power level of 90 mW has been found to be a generally "safe" power stealing level for inactive power stealing, where the term "safe" is used to indicate that, at such power level, all or virtually all HVAC cooling call relays that are installed in most residential and commercial HVAC systems will not accidentally trip into an "on" state due to the current following through the cooling call relay coil. During this time period, the PAB regulator 1428 operates to discharge the battery 1430 during any periods of operation in which the instantaneous thermostat electrical power load rises above 90 mW, and to recharge the battery (if needed) when the instantaneous thermostat electrical power load drops below 90 mW. Provided that the rechargeable battery 1430 is selected to have sufficient capacity (such as 560 mAh at 3.7 volts as discussed above), supplying power at above 90 mW (even several hundred milliwatts more) is generally not problematic even for extended time periods (even perhaps up to an hour or more), provided only that there are sufficient periods of lower-power usage below 90 mW in which the rechargeable battery 1430 can be recharged. The thermostat 1400 is configured such that the average power consumption is well below 90 mW, and indeed for some embodiments is even below 10 mW on a long term time average.

According to one embodiment, the powering circuitry 1410 is further monitored and controlled during inactive power stealing by the microcontroller 1408 by virtue of monitoring the voltage $V_{BR}$ across the bridge output capacitor 1422 at node 1423 that leads into the buck regulator 1424. For the embodiment of FIG. 14, the voltage VBR is monitored directly by virtue of an analog to digital converter ("ADC") that is built into the microcontroller 1408. According to an embodiment, the voltage $V_{BR}$ across the bridge output capacitor 1422 can be monitored, either on a one-time basis, a periodic basis, or a continuous basis to assess a general "strength" of the HVAC system with respect to the power that can be safely provided during inactive power stealing. This assessment can then be used to adjust a determination for the maximum "safe" amount of power that can be provided at the output of buck regulator 1424 during inactive power stealing, which can in turn be implemented by the microcontroller 1408 by setting the maximum input current $I_{BP}$(max) of the PAB regulator 1428 for inactive power stealing. In one particularly advantageous embodiment, at the outset of an inactive power stealing period (either on a one-time basis after thermostat installation or on ongoing basis as desired), the microcontroller 1408 initially sets the maximum current $I_{BP}$(max) to zero and measures the resultant voltage $V_{BR}$. This "open-circuit" value of $V_{BR}$ will typically be, for example, somewhere around 30 volts. The microcontroller 1408 then sets the maximum current $I_{BP}$(max) to 20 mA and measures the resultant voltage $V_{BR}$. If the value of $V_{BR}$ when $I_{BP}$(max)= 20 mA remains roughly the same as its open-circuit value (less than a predetermined threshold difference, for example), then it is determined that the HVAC system is "strong enough" at the Y-lead to accommodate a higher value for the maximum current $I_{BP}$(max), and the microcontroller 1408 increases the maximum current $I_{BP}$(max) to 40 mA (corresponding to a maximum "safe" power stealing level of about 180 mW assuming 4.45 volts). On the other hand, if the value of $V_{BR}$ when $I_{BP}$(max)=20 mA tends to sag relative to its open-circuit value (greater than the predetermined threshold difference, for example), then it is determined that the HVAC system is not "strong enough" at the Y-lead to accommodate an increased maximum current $I_{BP}$(max), and its value will remain fixed at 20 mA. Optionally, this process can be repeated to further increase the maximum current $I_{BP}$(max) to successively higher levels, although care should be taken to ensure by empirical testing with a target population of HVAC systems that the cooling call relay will not be tripped at such higher levels during inactive power stealing. For one embodiment, the process stops when $I_{BP}(max)=40$ mA, to avoid accidental cooling call relay tripping across a very large population of HVAC systems.

Operation of the powering circuitry 1410 for "active power stealing" is now described. In the description that follows it will be assumed that the "Y" wire has been inserted and therefore that power is to be stolen from the Y-lead, with it being understood that similar counterpart operation based on the "W" lead applies if no "Y" wire has been inserted. During an active cooling call, it is necessary for current to be flowing through the HVAC cooling call relay coil sufficient to maintain the HVAC cooling call relay in a "tripped" or ON state at all times during the active cooling call. In the absence of power stealing, this would of course be achieved by keeping the Y-Rc FET switch 1406 in ON state at all times to short the Y and Rc leads together. To achieve active power stealing, the microcontroller 1408 is configured by virtue of circuitry denoted "PS MOD" to turn the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 1420 to keep the bridge output capacitor 1422 to a reasonably acceptable operating level. For one embodiment, this is achieved in a closed-loop fashion in which the microcontroller 1408 monitors the voltage $V_{BR}$ at node 1423 and actuates the signal Y-CTL as necessary to keep the bridge output capacitor 1422 charged. By way of example, during active power stealing operation, the microcontroller 1408 will maintain the Y-Rc FET switch in an ON state while monitoring the voltage $V_{BR}$ until it drops below a certain lower threshold, such as 8 volts. At this point in time, the microcontroller 1408 will switch the Y-Rc FET switch into an OFF state and maintain that OFF state while monitoring the voltage $V_{BR}$, which will rise as an inrush of rectified current charges the bridge capacitor 1422. Then once the voltage $V_{BR}$ rises above a certain upper threshold, such as 10 volts, the microcontroller 1408 will turn the Y-Rc FET switch back into in an ON state, and the process continues throughout the active power stealing cycling. Although the scope of the present teachings is not so limited, the microcontroller 1408 is preferably programmed to keep the maximum current $I_{BP}(max)$ to a relatively modest level, such as 20 mA (corresponding to a maximum "safe" power stealing level of about 90 mW assuming 4.45 volts) throughout the active power stealing cycle. The circuit elements are designed and configured such that the ON-OFF cycling of the Y-Rc FET switch occurs at a rate that is much higher than 60 Hz and generally has no phase relationship with the HVAC power transformer, whereby the specter of problems that might otherwise occur due to zero crossings of the 24 VAC voltage signal are avoided. By way of example and not by way of limitation, for some embodiments the time interval required for charging the bridge output capacitor 1422 from the lower threshold of 8 volts to the upper threshold of 10 volts will be on the order 10 to 100 microseconds, while the time that it takes the bridge output capacitor 1422 to drain back down to the lower threshold of 8 volts will be on the order of 1 to 10 milliseconds. It has been found that, advantageously, at these kinds of rates and durations for the intermittent "OFF" state of the Y-Rc FET switch 1406, there are very few issues brought about by accidental "un-tripping" of the HVAC cooling call relay during active power stealing across a wide population of residential and commercial HVAC installations.

According to one embodiment, it has been found advantageous to introduce a delay period, such as 60-90 seconds, following the instantiation of an active cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 1400. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided. Preferably, the microcontroller 1408 implements the above-described instantiation delays for both active and inactive power stealing by setting the maximum current $I_{BP}(max)$ to zero for the required delay period. In some embodiments, the operation of the buck regulator circuit 1424 is also shut down for approximately the first 10 seconds of the delay period to help ensure that the amount of current being drawn by the powering circuitry 1410 is very small. Advantageously, the rechargeable-battery-assisted architecture of the powering circuitry 1410 readily accommodates the above-described instantiation delays in that all of the required thermostat electrical power load can be supplied by the rechargeable battery 1430 during each of the delay periods.

While examples and embodiments have been described, they should not serve to limit any aspect of the present invention. Accordingly, various modifications may be made without departing from the spirit and scope of the invention. Indeed, various methods and system for communicating and operating thermostats, HVACSs and other devices have been provided yet the methods and systems are meant to be illustrative and not limiting as to the scope of the overall invention. It is to be appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. A thermostat, comprising:
   a plurality of heating, ventilation, and air conditioning (HVAC) connectors including a common wire connector and at least one call relay wire connector;
   a rechargeable battery;
   a power stealing circuit configured to provide electrical power for use by the thermostat and for charging the rechargeable battery at least in part by stealing power from at least one call relay wire coupled to said at least one call relay wire connector such that said electrical power can be provided and said rechargeable battery can be recharged without requiring a common wire to be coupled to said common wire connector;
   a processor powered at least in part by the rechargeable battery, wherein:
   the processor is configured to operate in a low-power state; and the processor is configured to operate in a high-power state;
a wireless communication module operatively coupled to the processor and configured to:
establish and maintain wireless communications with a router, including receiving transmissions from the router;
process the transmissions from the router by discriminating between a first type of transmission and a second type of transmission, wherein:
the first type of transmission comprises keep-alive messages associated with a communication channel between a remote thermostat-controller server and the thermostat, and
the second type of transmission comprises information associated with controlling the HVAC system;
in response to identifying a transmission of the second type during a time period in which the processor is operating in the low-power state, causing the processor to transition from the low-power state to the high-power state;
whereby the processor can operate in the low-power state for an extended period of time while a Natural Address Translation (NAT) table entry in the router that is associated with said communication channel between the processor and the remote thermostat-controller server remains maintained during said extended period of time.

2. The thermostat of claim 1, wherein causing the processor to transition from the low-power state to the high-power state comprises the wireless communication module sending an interrupt to the processor.

3. The thermostat of claim 1, wherein discriminating between the first type of transmission and the second type of transmission is based at least in part on one or more entries in a filter table of the wireless communication module, wherein the one or more entries are sent from the processor to the wireless communication module.

4. The thermostat of claim 1, wherein the power stealing circuit comprises:
a power extraction circuit configured to extract electrical power from one or more of the plurality of HVAC connectors up to a first level of electrical power; and
a power control circuit coupled to the power extraction circuit, the rechargeable battery, and the processor, wherein the power control circuit is configured such that:
during a first time period in which an electrical load power required by the processor is less than said first level of electrical power, the power control circuit supplies the electrical load power required by the processor and charges the rechargeable battery, if needed, using power from the power extraction circuit; and
during a second time period in which the electrical load power required by the thermostat processing and control circuit is greater than said first level of electrical power, the power control circuit discharges the rechargeable battery and supplies the electrical load power required by the processor using both power from the power extraction circuit and power from the rechargeable battery.

5. The thermostat of claim 1, wherein the wireless communication module is configured to receive the first type of transmission according to at least a first time interval, wherein the first time interval is less than a second time interval, and wherein the second time interval is determined by a maximum time that the router is expected to allow an idle communication channel to persist.

6. The thermostat of claim 1, wherein the processor operating in the low-power state requires less than 100 mW, and wherein the processor operating in the high-power state requires more than 200 mW.

7. The thermostat of claim 1, wherein the wireless communication module operatively is further configured to:
receive transmissions through a second communication channel;
receive an indication that an energy stored in the rechargeable battery is below a threshold;
receive third transmissions through the second communication channel; and
process the third transmissions while the processor is in the low-power state based on the indication that the energy stored in the rechargeable battery is below the threshold.

8. The thermostat of claim 1, wherein transmissions are classified according to a data priority ranging from a low-priority data type to a high-priority data type, wherein the low-priority data type includes data of lesser thermostatic importance, and wherein the high-priority data type includes data of higher thermostatic importance; and the wireless communication module is further configured to:
receive a third transmission from the remote thermostat-controller server, wherein the third transmission includes data for controlling the HVAC system; and
determine that the third transmission is classified as the low-priority data type, and that the third transmission should not require the processor to transition to the high-power state.

9. A method of controlling a thermostat, the method comprising:
providing a plurality of heating, ventilation, and air conditioning (HVAC) connectors including a common wire connector and at least one call relay wire connector;
stealing power from at least one call relay wire coupled to said at least one call relay wire connector such that electrical power can be provided to the thermostat and a rechargeable battery can be recharged without requiring a common wire to be coupled to said common wire connector;
powering a processor at least in part with energy from the rechargeable battery, wherein:
the processor is configured to operate in a plurality of modes, and the plurality of modes is comprised of:
a low-power mode; and
a high-power mode;
establishing one or more communication channels with a remote thermostat-controller server through a router;
communicating with the remote thermostat-controller server using a protocol, wherein the protocol comprises:
a time interval that represents a time that the router is expected to maintain the one or more communication channels between transmissions;
a first type of transmission sent from the remote thermostat-controller server at least in part to maintain one of the one or more communication channels at the router, and
a second type of transmission comprising data for controlling an environmental condition;
discriminating between transmissions of the first type and transmissions of the second type;
in response to identifying a transmission of the first type during a time period in which the processor is operating in the low-power mode; allowing the processor to continue operating in the low-power mode; and in response to identifying a transmission of the second type during a time period in which the processor is operating in the low-power mode, causing the processor to transition from the low-power mode to the high-power mode, and initiating a change in the environmental condition according to the transmission of the second type.

10. The method of claim 9, wherein the one or more communication channels comprises a first channel and a second channel.

11. The method of claim 10, further comprising:
receiving the transmission of the second type from the remote thermostat-controller server through the first channel;
determining that the transmission of the second type is classified as a high-priority transmission at least in part because it was received through the first channel.

12. The method of claim 9, further comprising sending, to the server, an indication that a power level of the rechargeable battery is below a threshold power.

13. The method of claim 12, wherein a time interval between transmissions that are received to maintain one of the one or more communication channels is adjusted based on the power level of the rechargeable battery.

14. The method of claim 12, further comprising:
receiving, from the remote thermostat-controller server, a second transmission of the second type through the one or more communication channels;
determining that the second transmission of the second type is classified as a high-priority transmission at least in part because the indication that the power level of the rechargeable battery was below the threshold power was sent to the remote thermostat-controller server; and
in response determining that the second transmission of the second type is classified as a high-priority transmission during a time period in which the processor is operating in the low-power mode, causing the processor to transition from the low-power mode to the high-power mode.

15. A system for controlling one or more property functions, the system comprising:
a power manager configured to provide up to a first power for use by the system, comprising:
a power-storage module; and
a power input configured to harvest power from an external source and provide up to a second power, wherein the second power is less than the first power, wherein the power manager is capable of storing excess energy in said power-storage module during time intervals in which the system requires less than said second power, and wherein the power manager is capable of releasing stored power from the power storage module during times in which the system requires more than said second power;
a processing function configured to:
control the one or more property functions; and
operate in a plurality of modes, wherein the plurality of modes is comprised of:
a first mode, wherein:
the processing function uses a third power; and
the third power is less than the second power; and
a second mode, wherein:
the processing function uses a fourth power;
the fourth power is higher than the second power; and
the fourth power is not greater than the first power; and a network-communication module configured to:
establish one or more communication channels to a controller server through a gateway;
utilize a communication protocol with the controller server, wherein the communication protocol includes a time interval that represents a time that the gateway is expected to maintain the one or more communication channels between transmissions;
receive a first transmission from the controller server through the one or more communication channels while the processing function operates in the first mode;
determine that the first transmission was sent from the controller server to maintain one of the one or more communication channels, and that the first transmission does not require the processing function to operate in the second mode;
receive a second transmission from the controller server through the one or more communication channels, wherein the second transmission includes information for controlling the one or more property functions; and
cause the processing function to operate in the second mode after receiving the second transmission.

16. The system of claim 15, wherein the processing function is further configured to process the second transmission, and then to return to operating in the first mode.

17. The system of claim 15, wherein the network-communication module is further configured to:
receive an indication from the power manager of a stored energy level in the power-storage module;
receive a third transmission from the controller server through the one or more communication channels, wherein the third transmission includes data for controlling the one or more property functions; and
determine whether the third transmission should require the processing function to operate in the second mode based on the stored energy level in the power-storage module.

18. The system of claim 15, wherein the second transmission is classified according to a data priority ranging from a low-priority data type to a high-priority data type, wherein the low-priority data type includes data of lesser importance to controlling the one or more property functions, and wherein the high-priority data type includes data of higher importance to controlling the one or more property functions.

19. The system of claim 18, wherein the network-communication module is further configured to:
receive a third transmission from the controller server through the one or more communication channels, wherein the third transmission includes data for controlling the one or more property functions; and
determine, if the third transmission is classified as the low-priority data type, that the third transmission should not require the processing function to operate in the second mode.

20. The system of claim 15, wherein the network-communication module is further configured to:
operate in a first network mode;
operate in a second network mode, wherein the network-communication module uses more power in the second network mode than in the first network mode; and
transition from the first network mode to the second network mode when a transmission is received.

* * * * *